(12) United States Patent
Hosokawa

(10) Patent No.: US 7,944,619 B2
(45) Date of Patent: May 17, 2011

(54) ZOOM OPTICAL SYSTEM AND IMAGE PICKUP APPARATUS PROVIDED WITH THE SAME

(75) Inventor: Kazuyuki Hosokawa, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/657,474

(22) Filed: Jan. 19, 2010

(65) Prior Publication Data

US 2010/0226018 A1 Sep. 9, 2010

Related U.S. Application Data

(62) Division of application No. 11/524,788, filed on Sep. 20, 2006, now Pat. No. 7,679,834.

(30) Foreign Application Priority Data

Sep. 21, 2005 (JP) ................................. 2005-273951

(51) Int. Cl.
    *G02B 15/14* (2006.01)
(52) U.S. Cl. .......................................... 359/678; 359/686
(58) Field of Classification Search .................. 359/684, 359/686, 715, 676, 678
    See application file for complete search history.

(56) References Cited

U.S. PATENT DOCUMENTS

| 6,985,301 | B2  | 1/2006  | Mihara |
|-----------|-----|---------|--------|
| 7,321,469 | B2* | 1/2008  | Ohno ............................ 359/686 |
| 7,679,834 | B2* | 3/2010  | Hosokawa ..................... 359/686 |
| 2003/0007255 | A1 | 1/2003 | Akiyama et al. |
| 2003/0160902 | A1 | 8/2003 | Mihara et al. |
| 2004/0130647 | A1 | 7/2004 | Kuba |
| 2004/0201902 | A1 | 10/2004 | Mihara et al. |
| 2005/0018313 | A1 | 1/2005 | Kuba |
| 2005/0073751 | A1 | 4/2005 | Mihara |

FOREIGN PATENT DOCUMENTS

| JP | 2003-043354 | 2/2003 |
|----|-------------|--------|
| JP | 2003-107356 | 4/2003 |

* cited by examiner

*Primary Examiner* — Alicia M Harrington
(74) *Attorney, Agent, or Firm* — Kenyon & Kenyon LLP

(57) ABSTRACT

An zoom optical system comprises a prism component which comprises in order from an object side, an entrance surface having negative refracting power, and a reflecting surface, and movable groups which are movable when either of zooming or focusing is carried out. An image pickup apparatus is provided with the zoom optical system. Thereby, thinning of the image pickup apparatus can be attained sufficiently, and it is possible to shorten the full length of the optical system furthermore, while keeping a moderate zooming ratio.

30 Claims, 42 Drawing Sheets

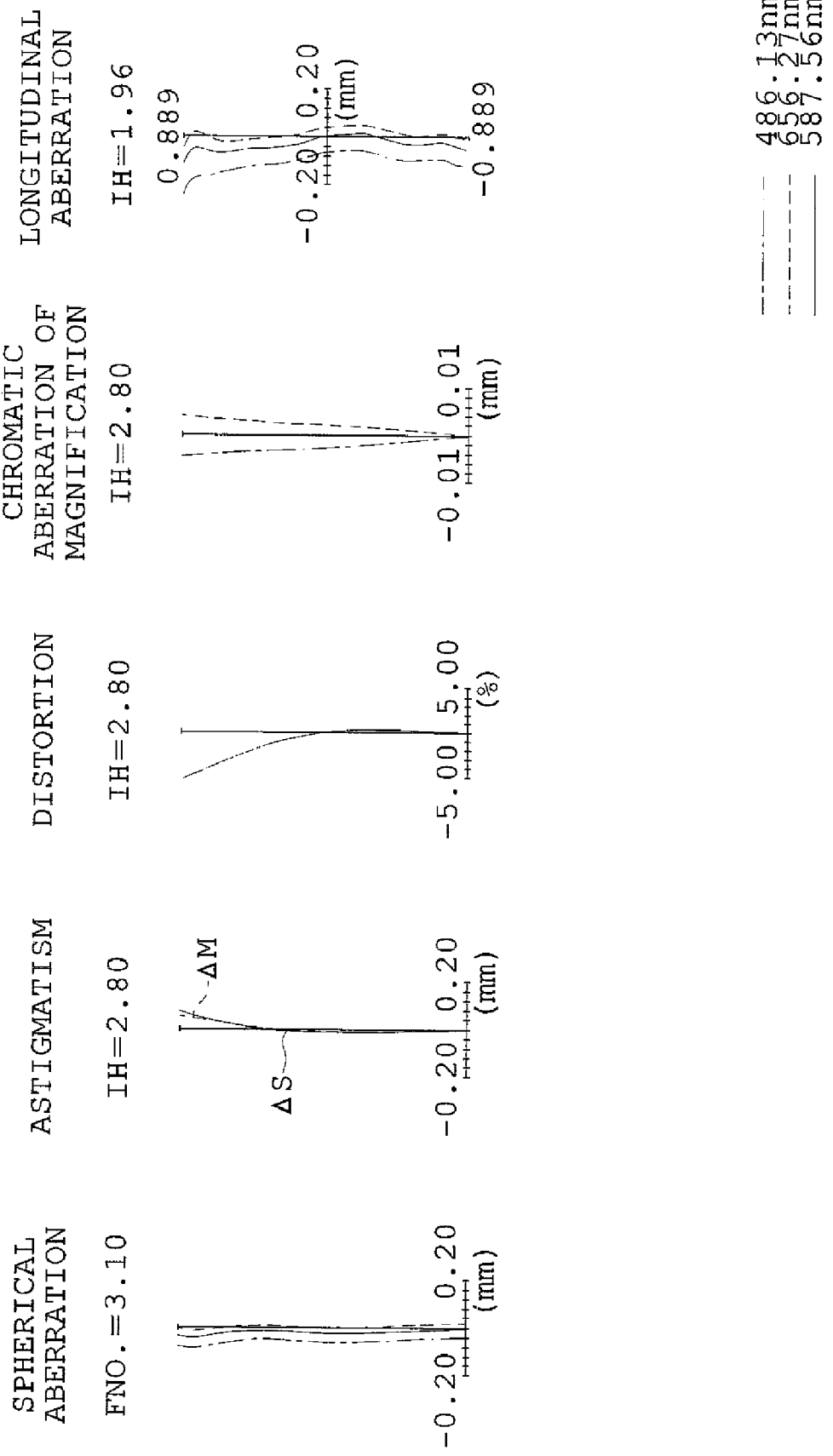

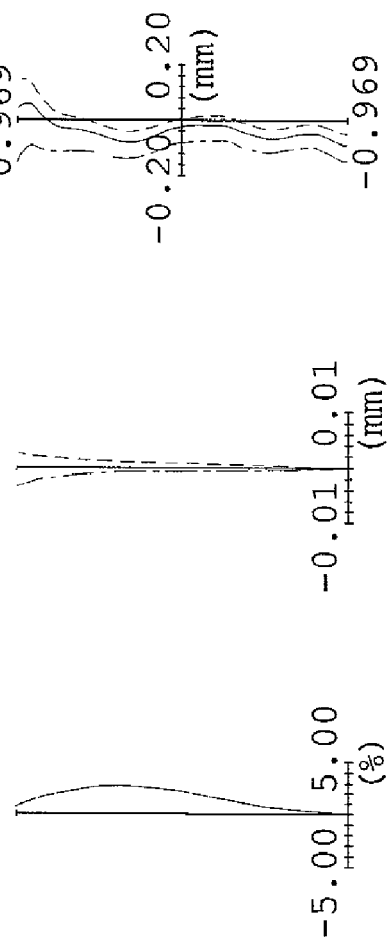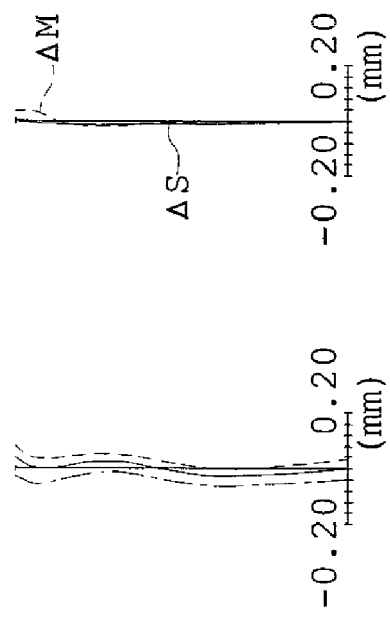

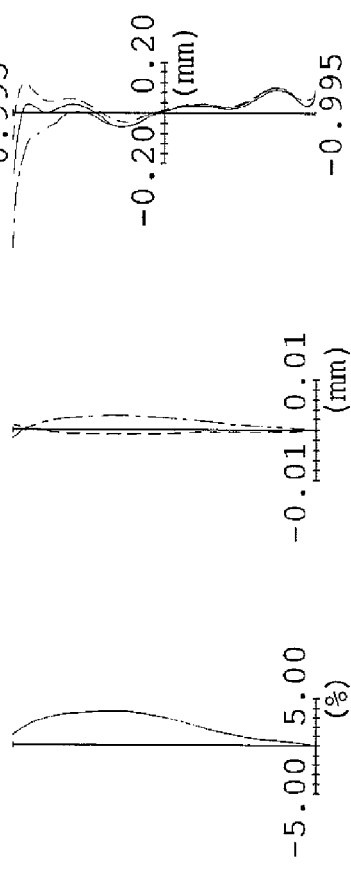

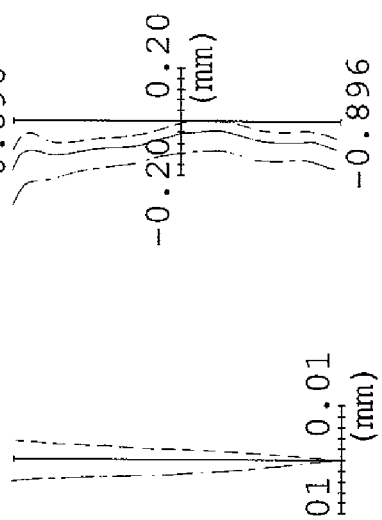
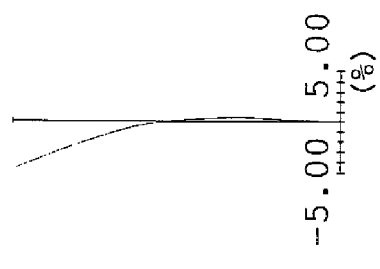
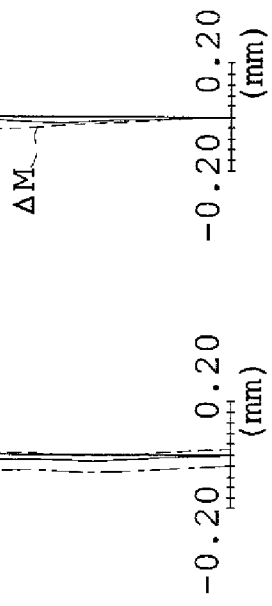
FIG.3A FIG.3B FIG.3C FIG.3D FIG.3E
SPHERICAL ASTIGMATISM DISTORTION CHROMATIC LONGITUDINAL
ABERRATION ABERRATION OF ABERRATION
MAGNIFICATION

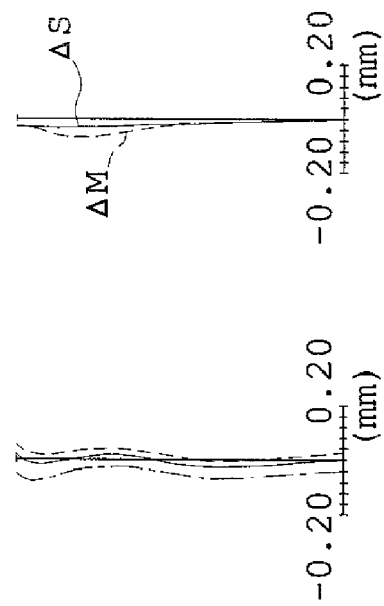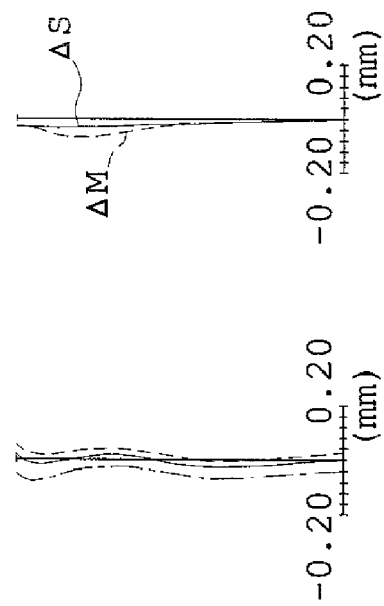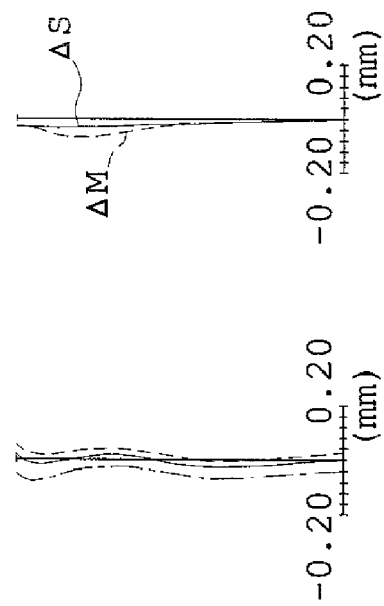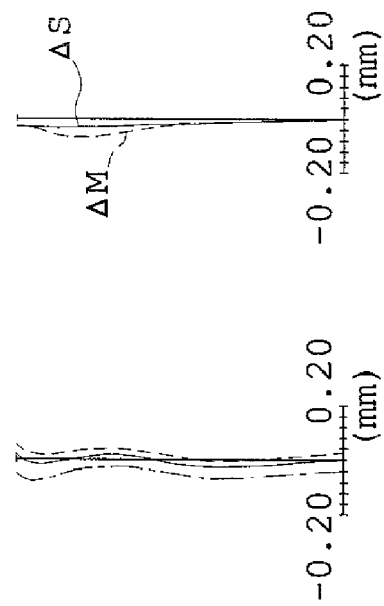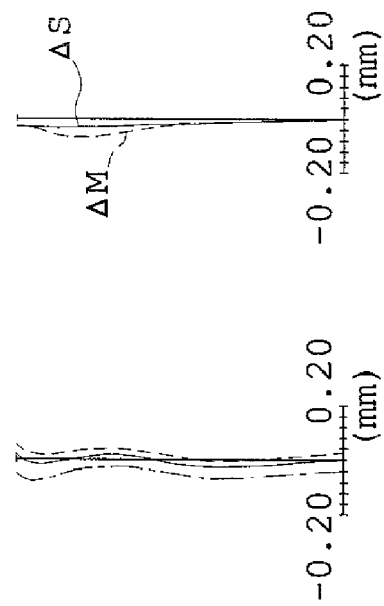

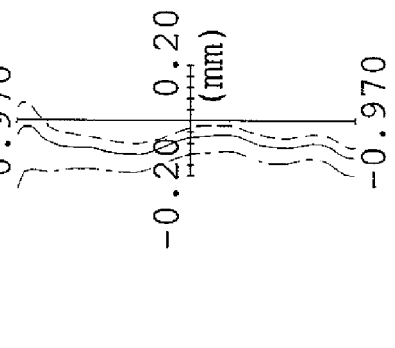
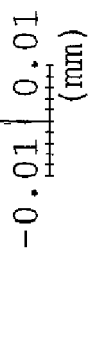
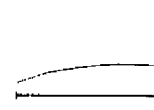

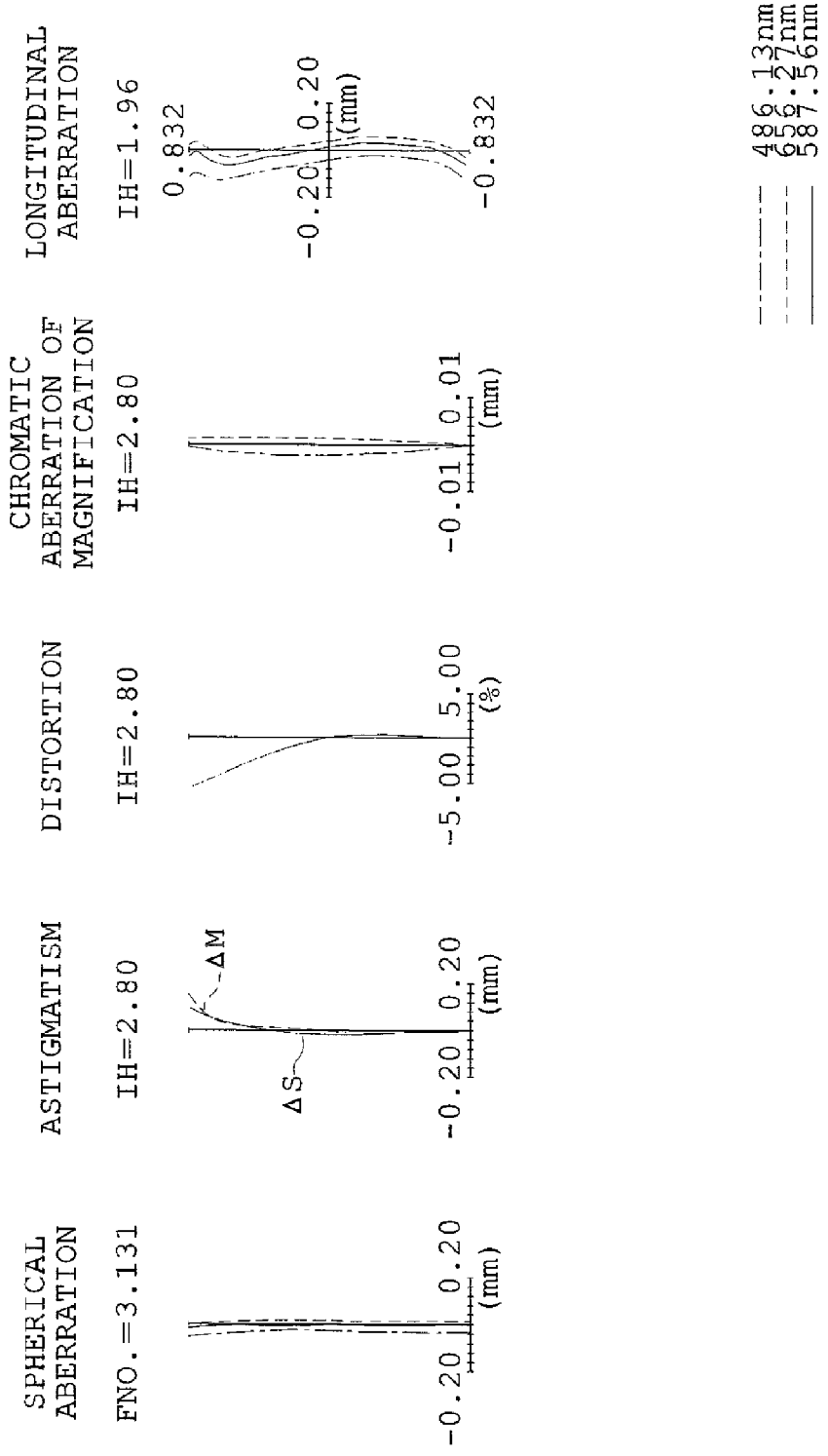

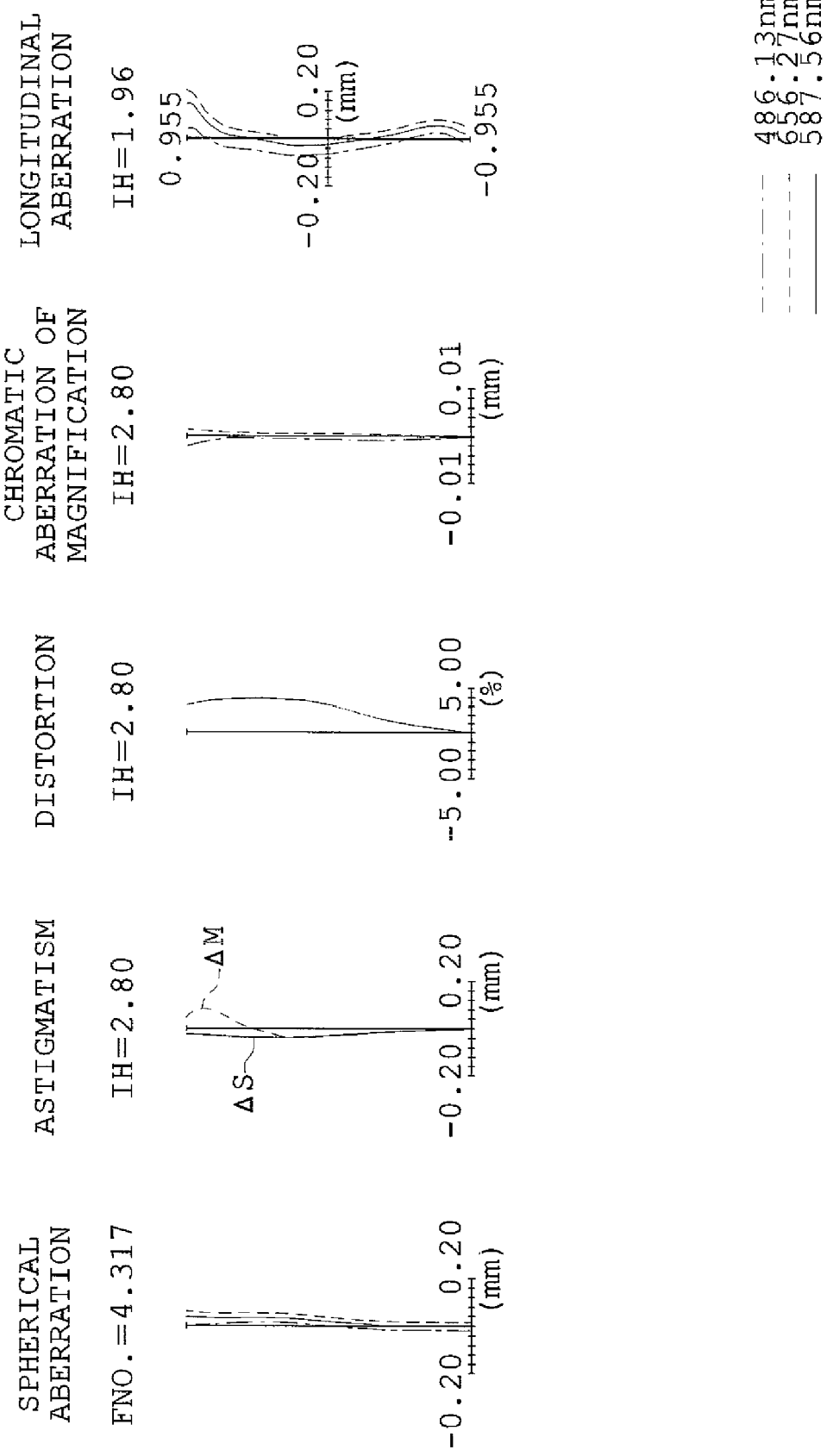

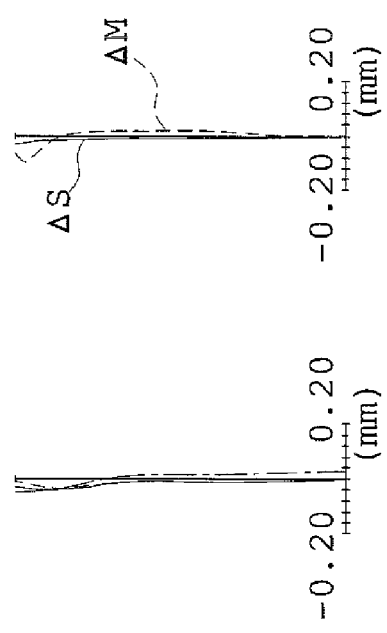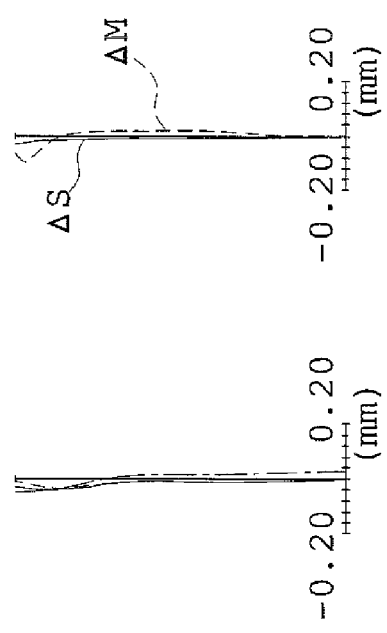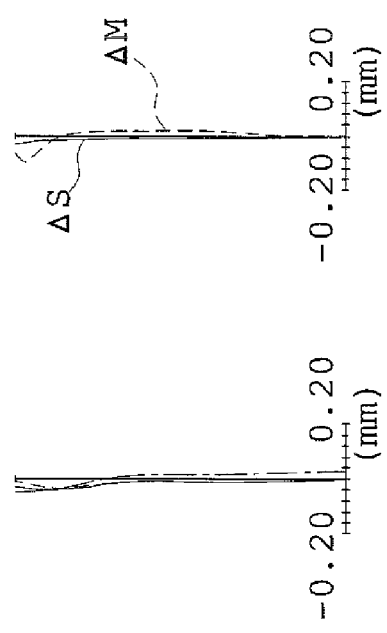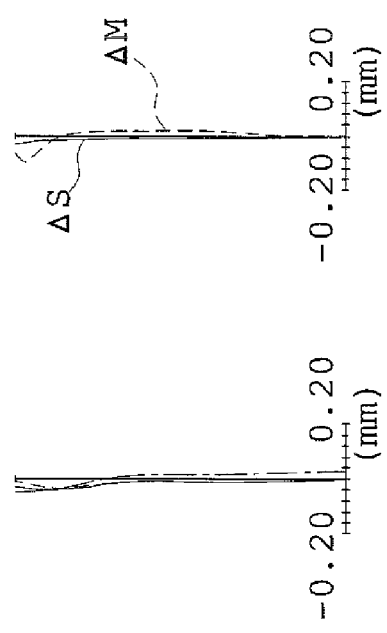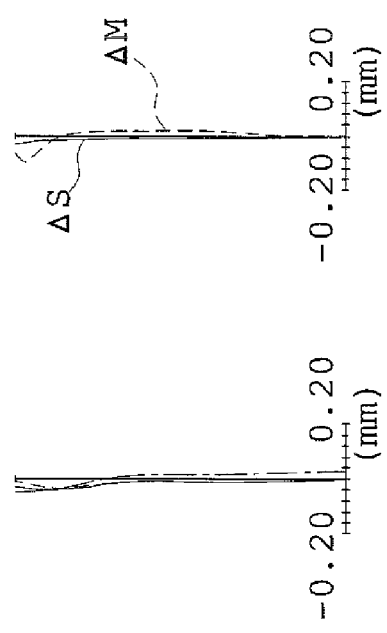

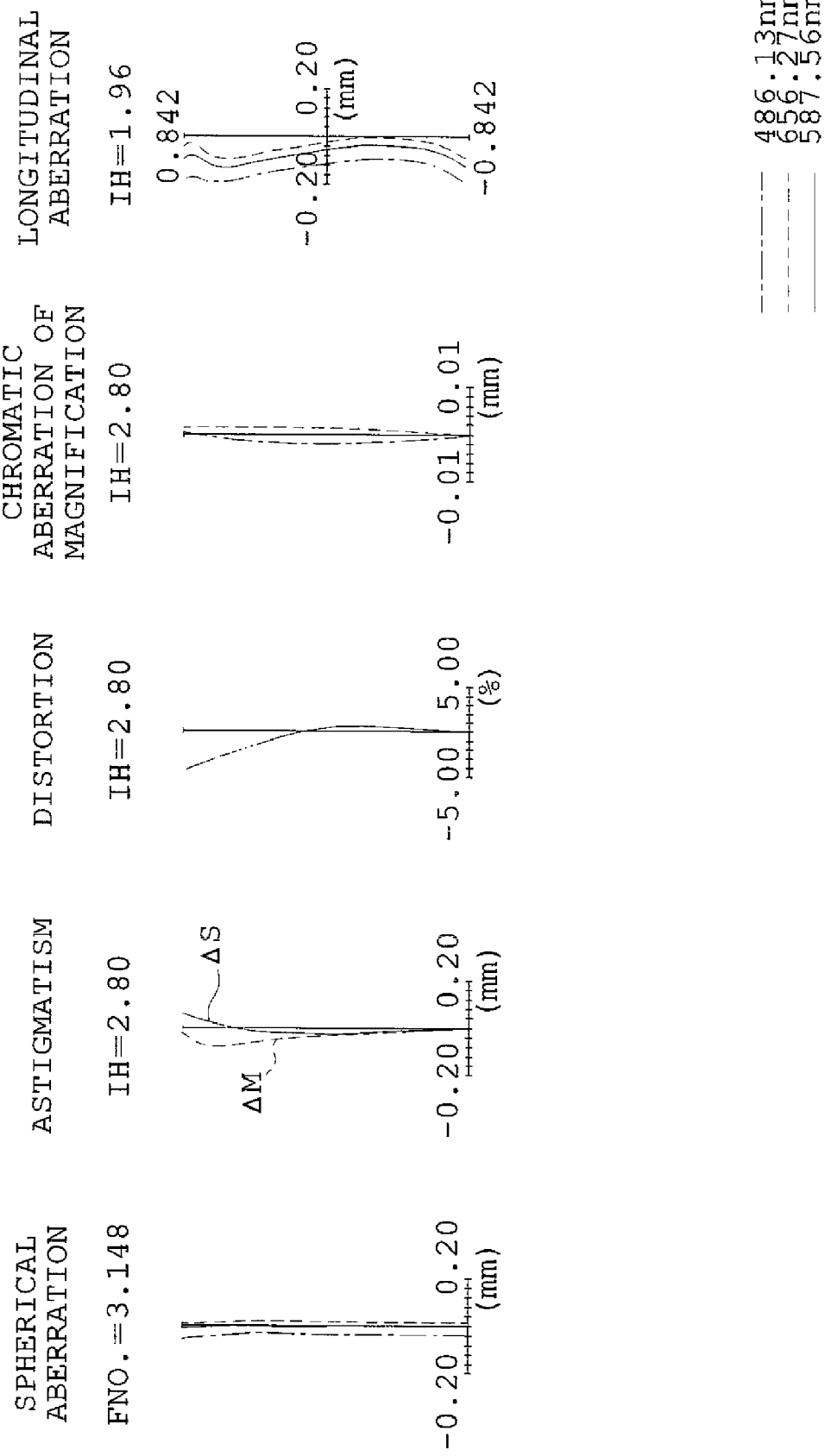

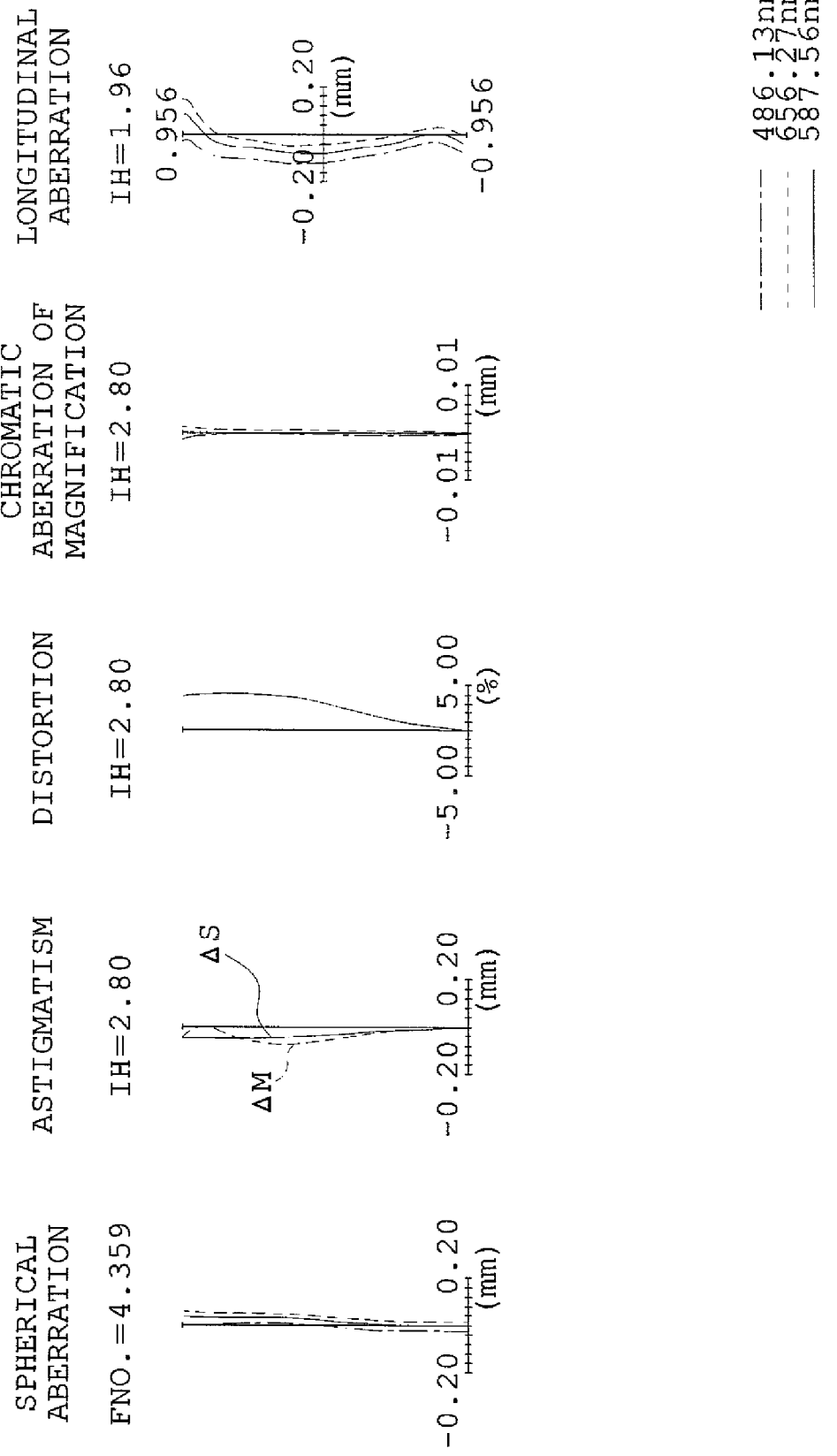

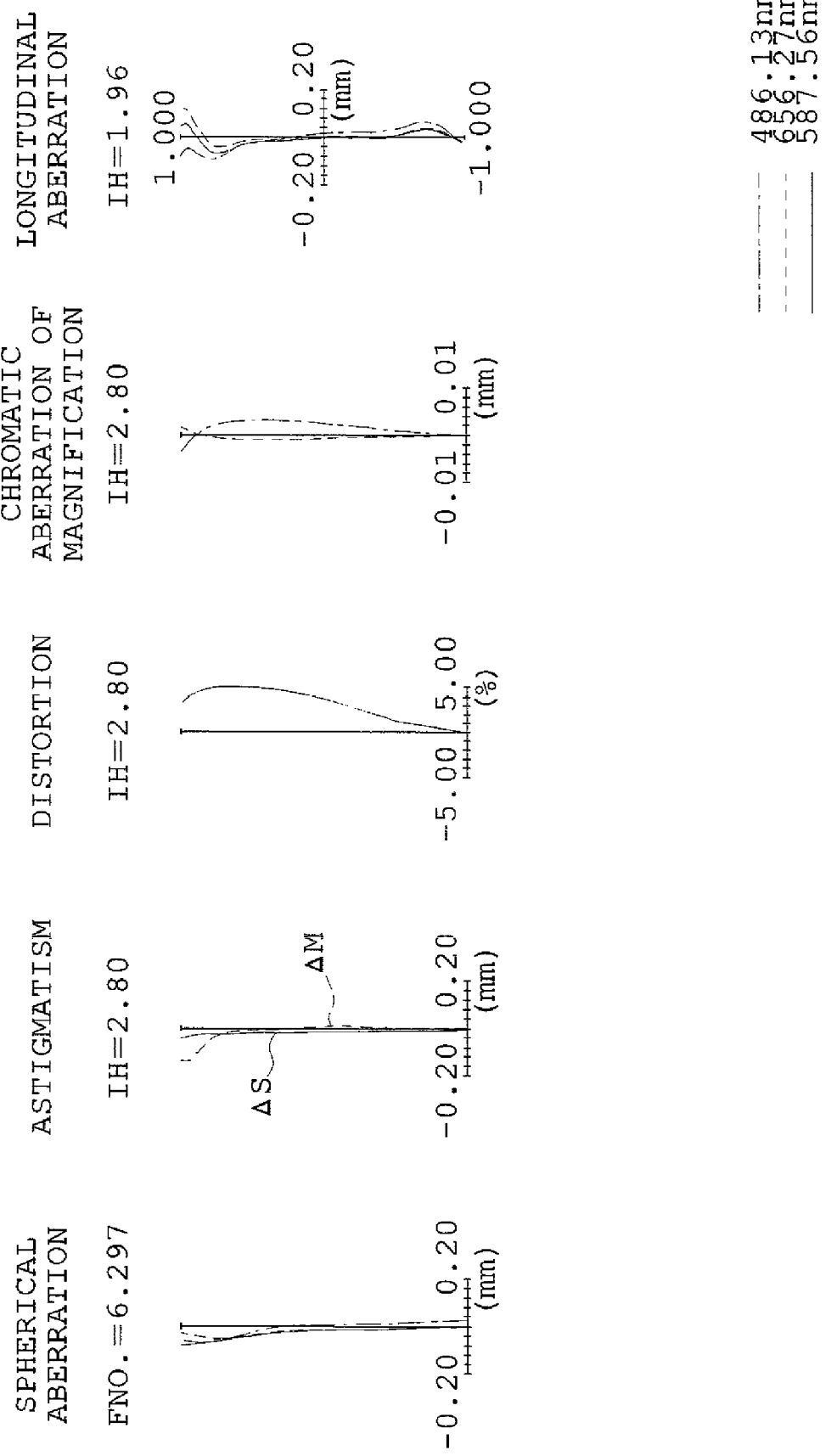

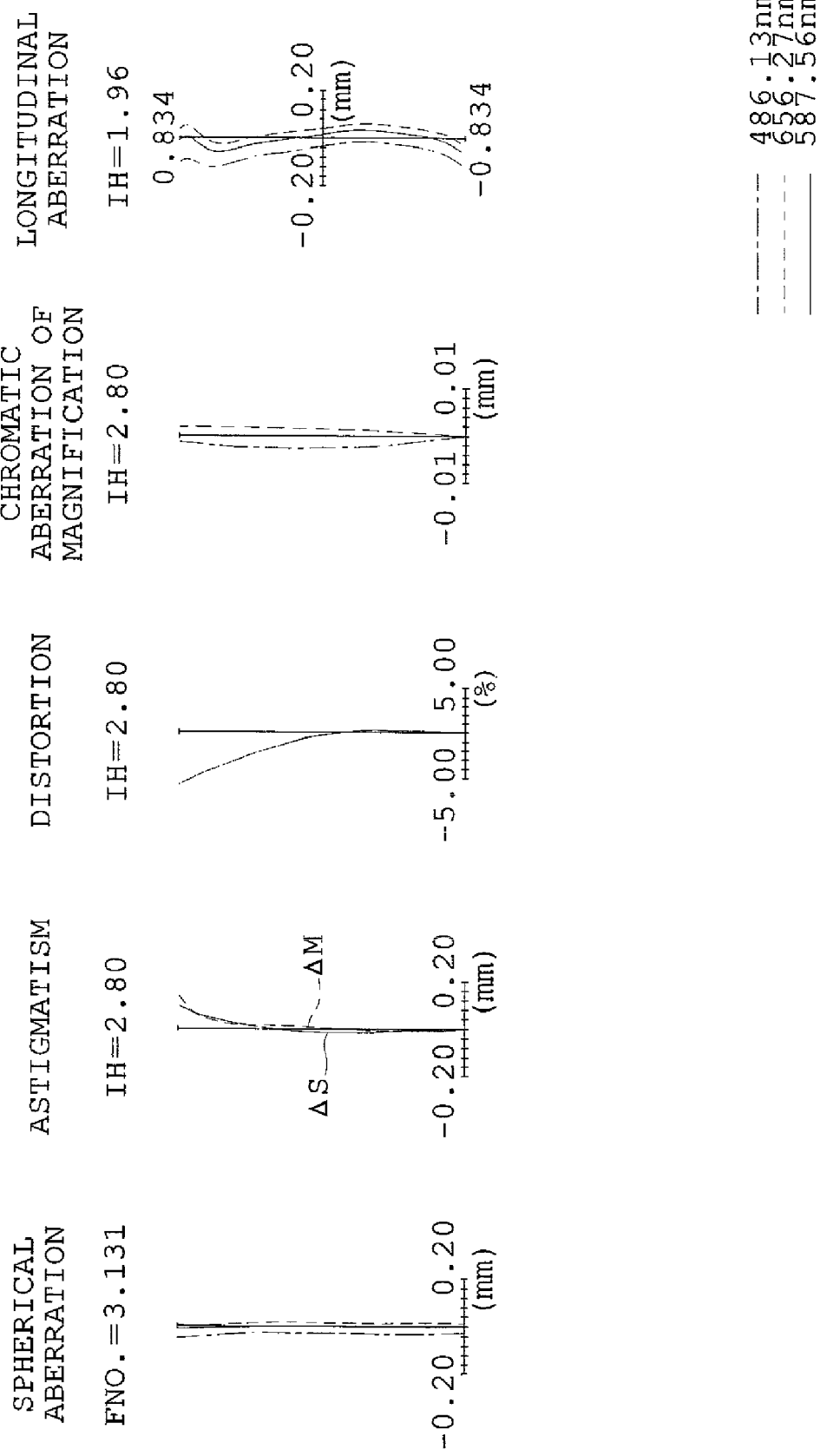

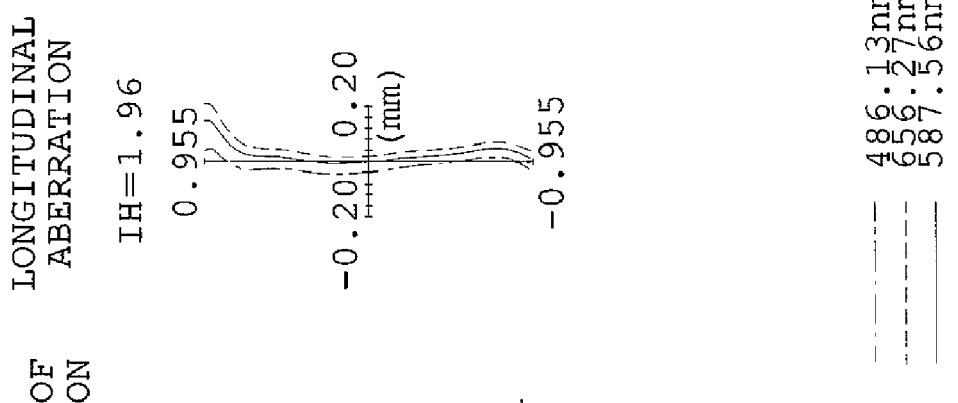
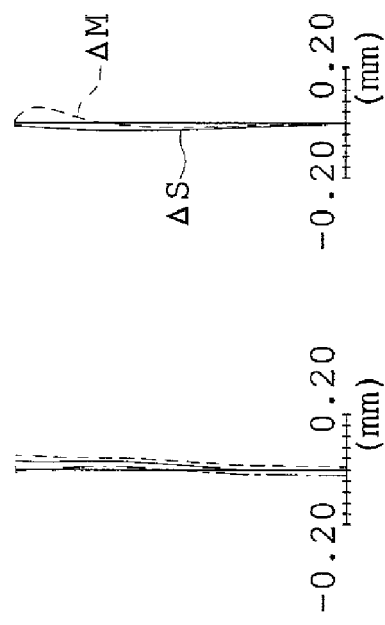
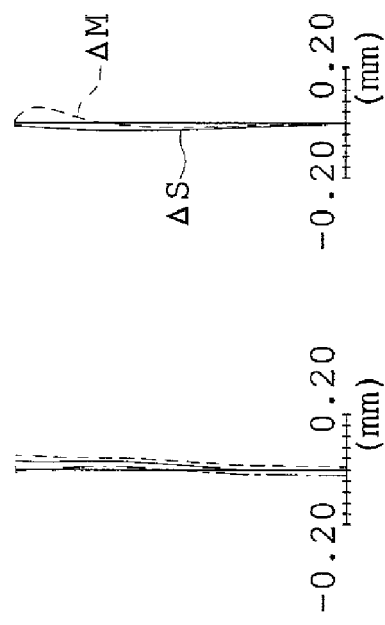
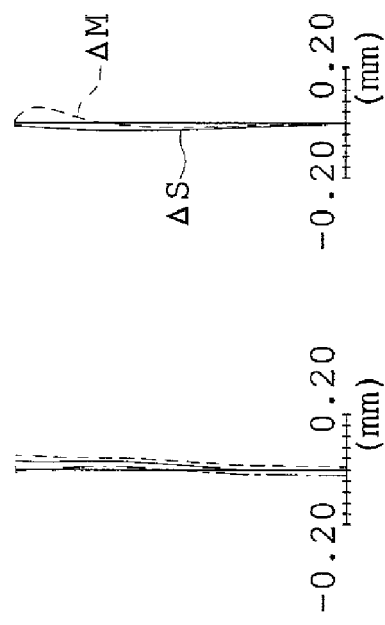
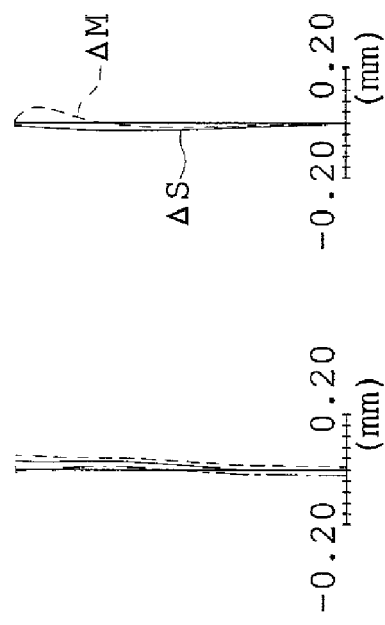
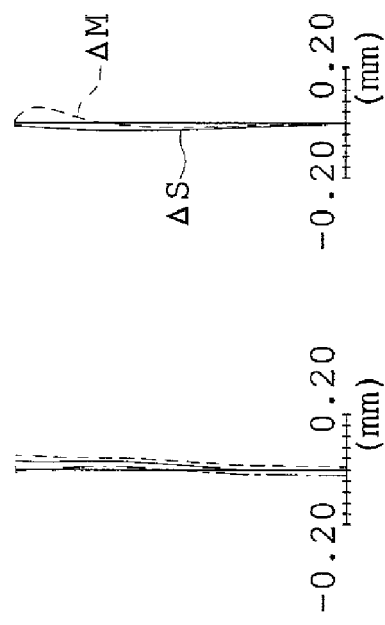
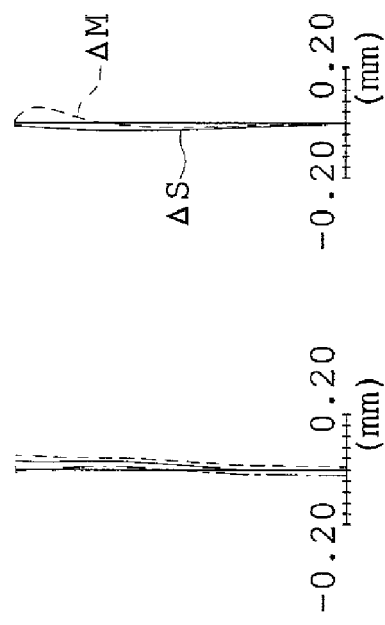

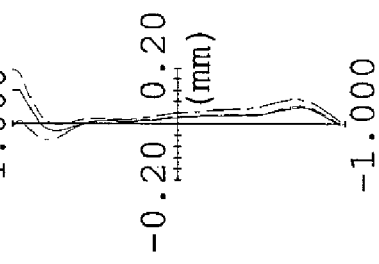

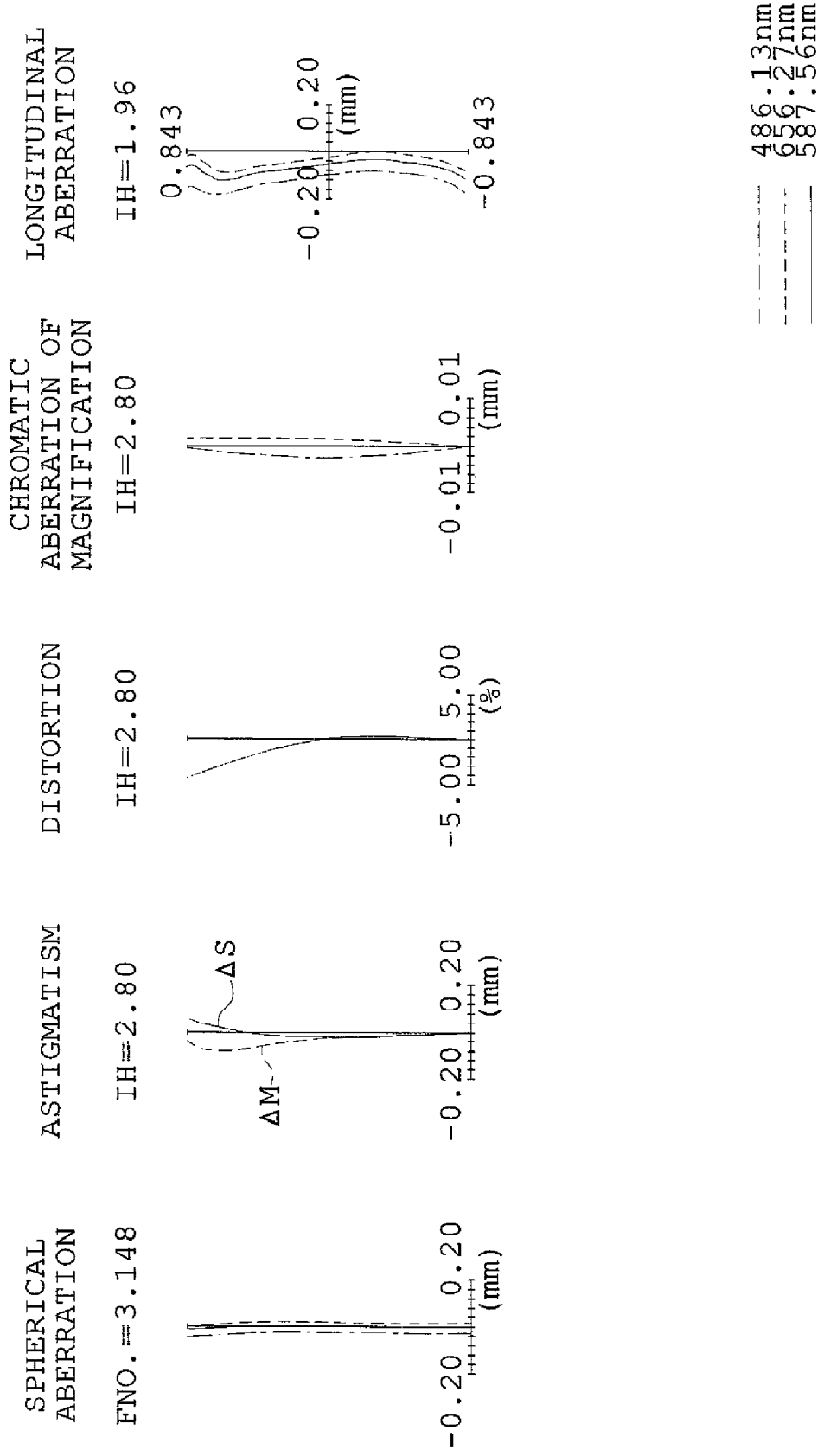

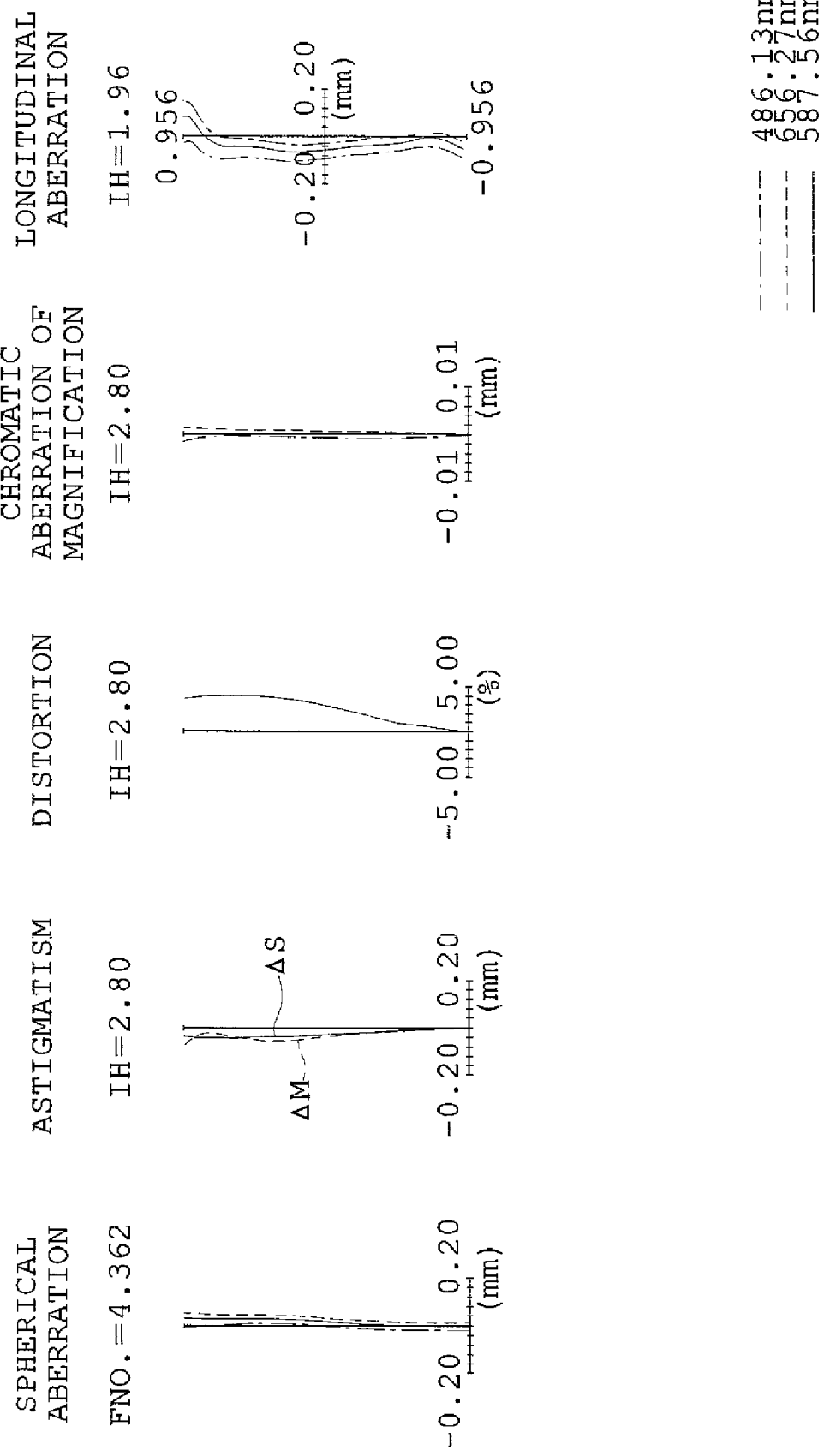

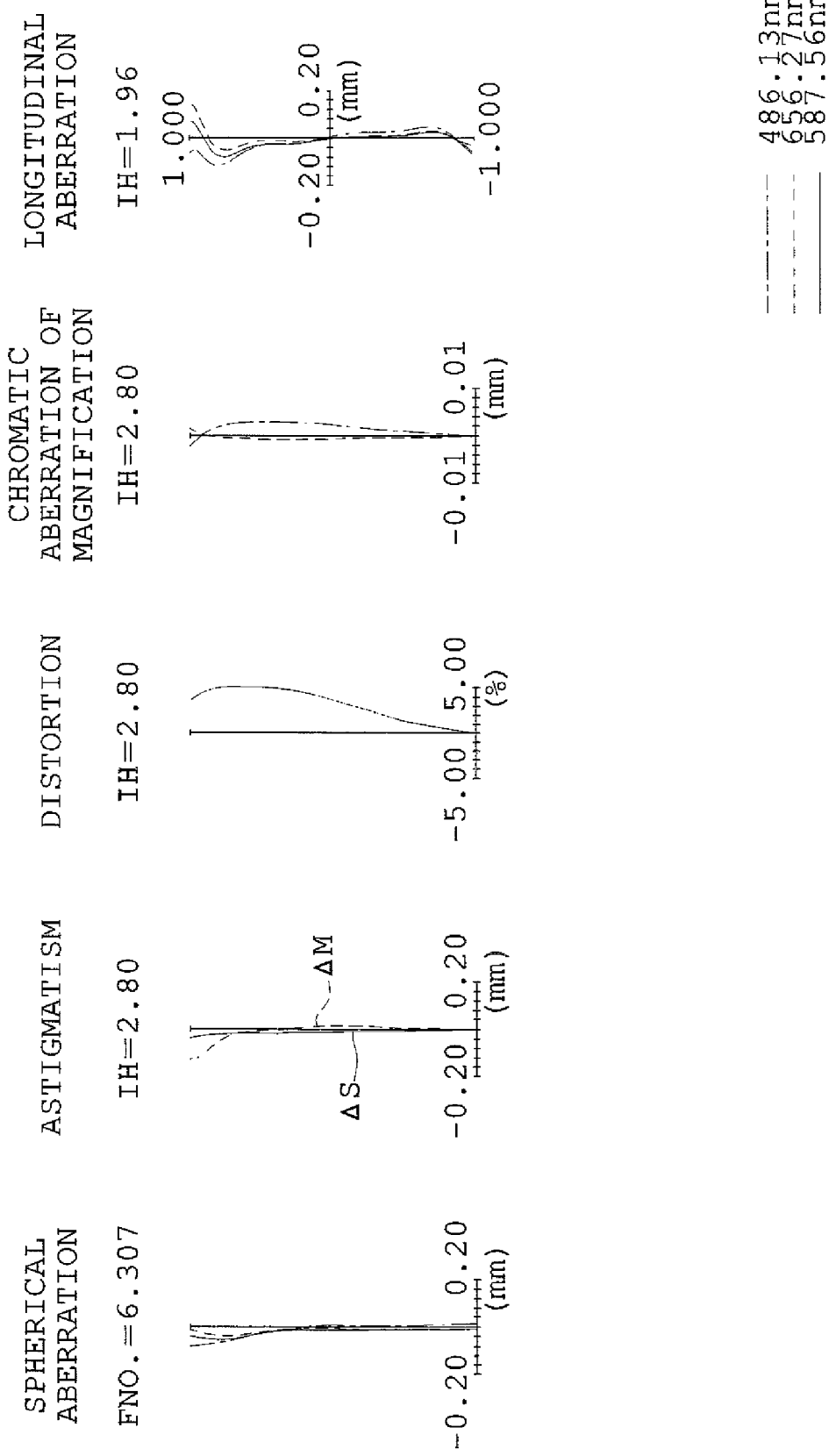

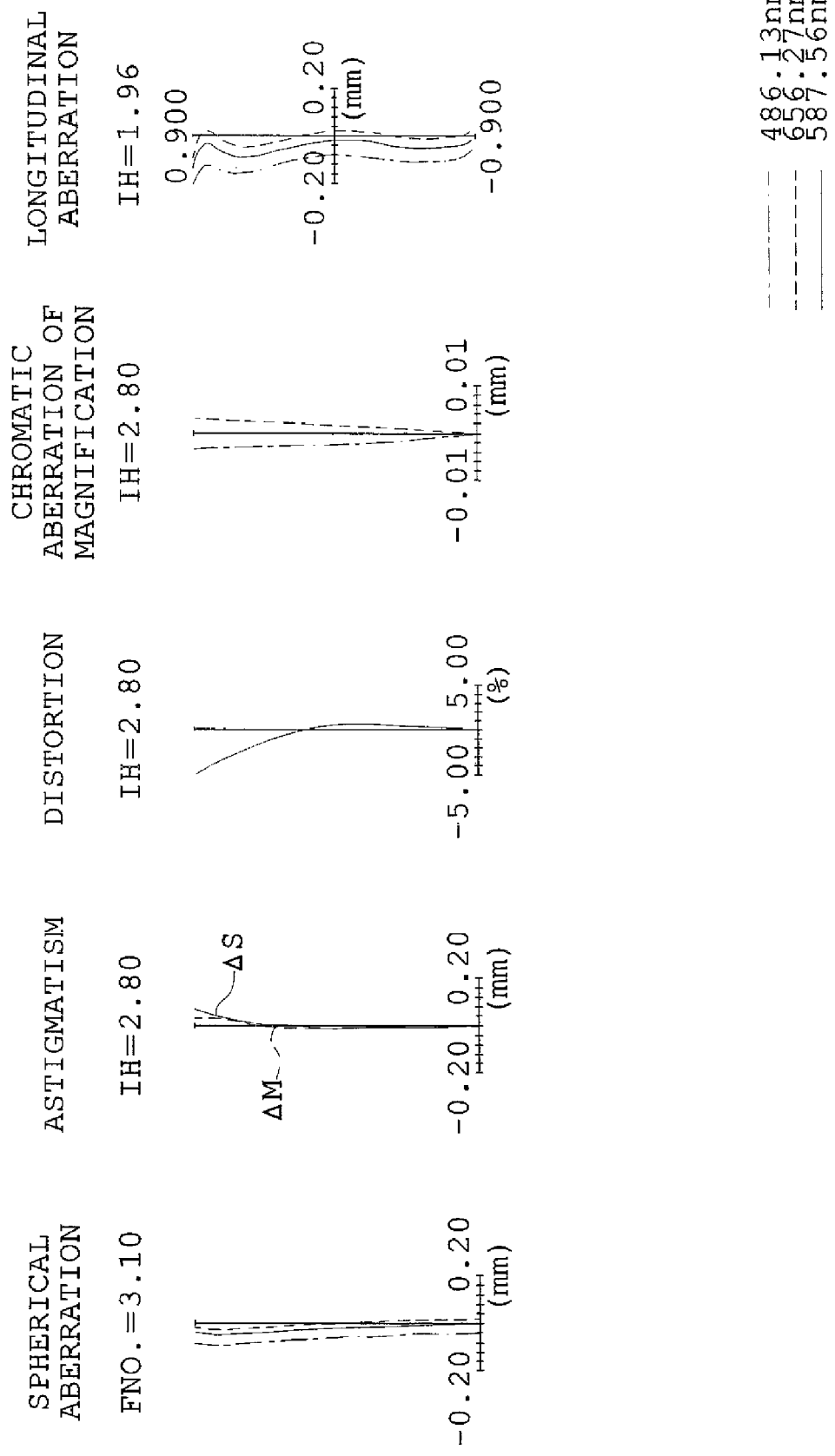

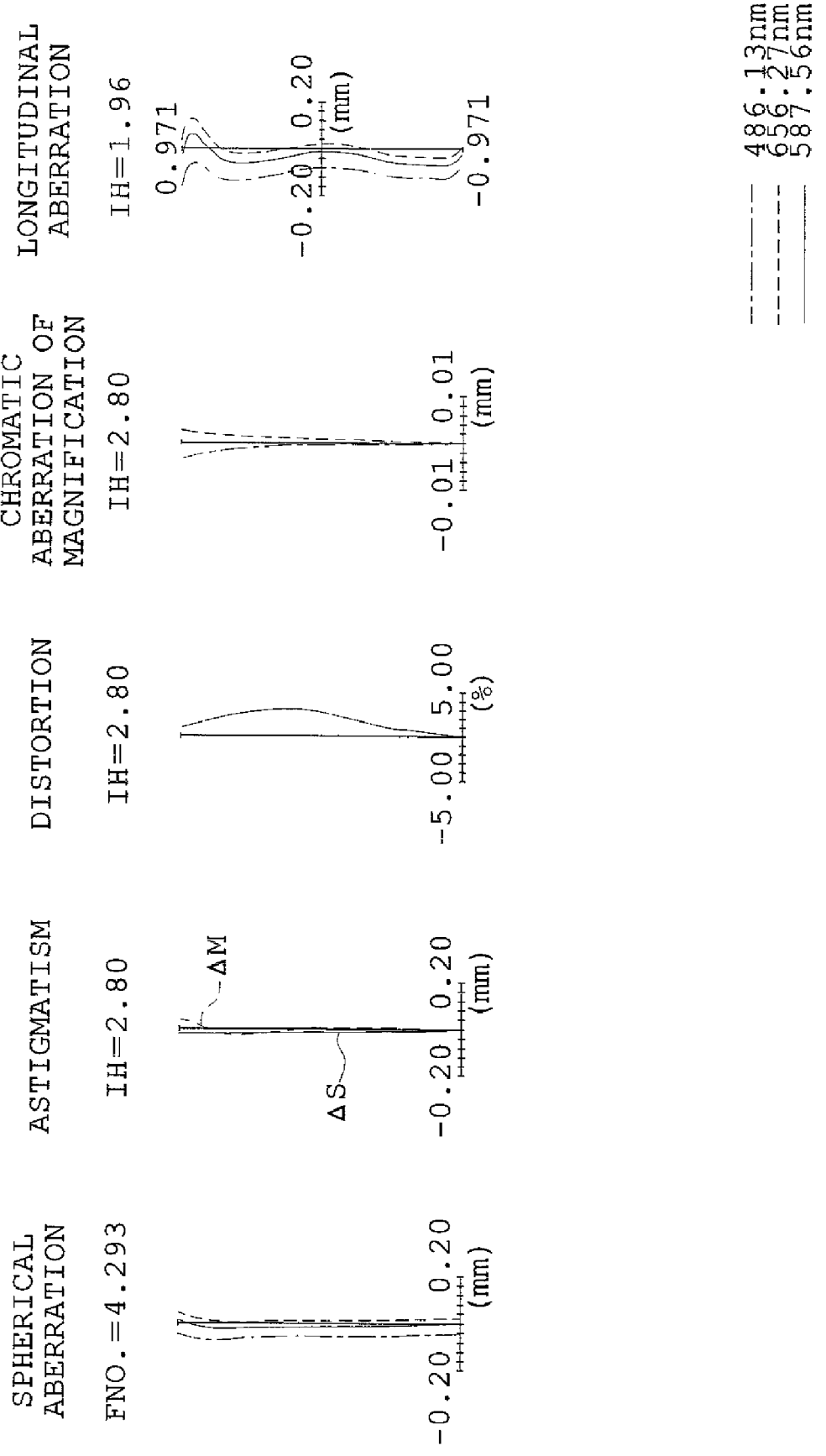

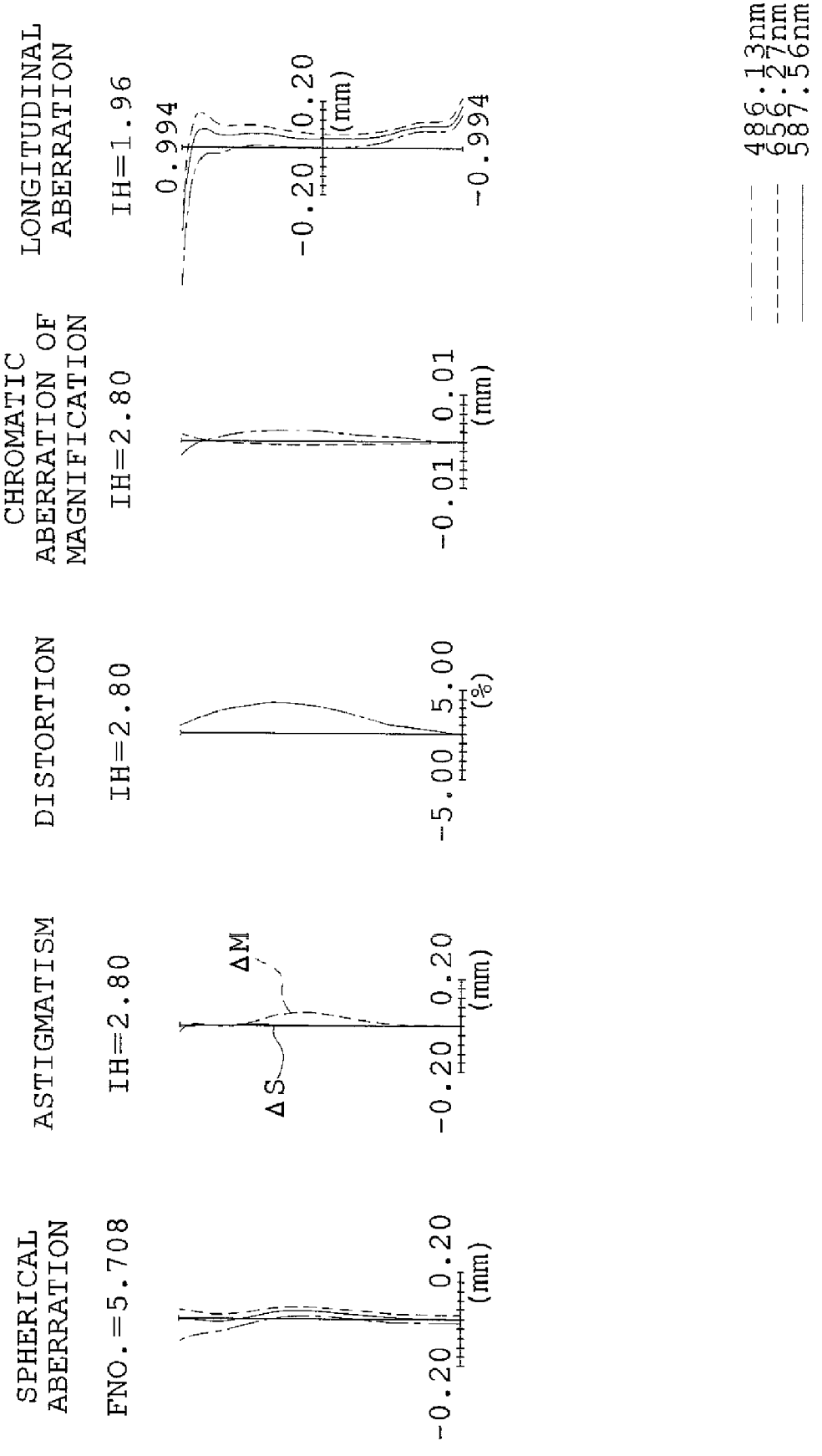

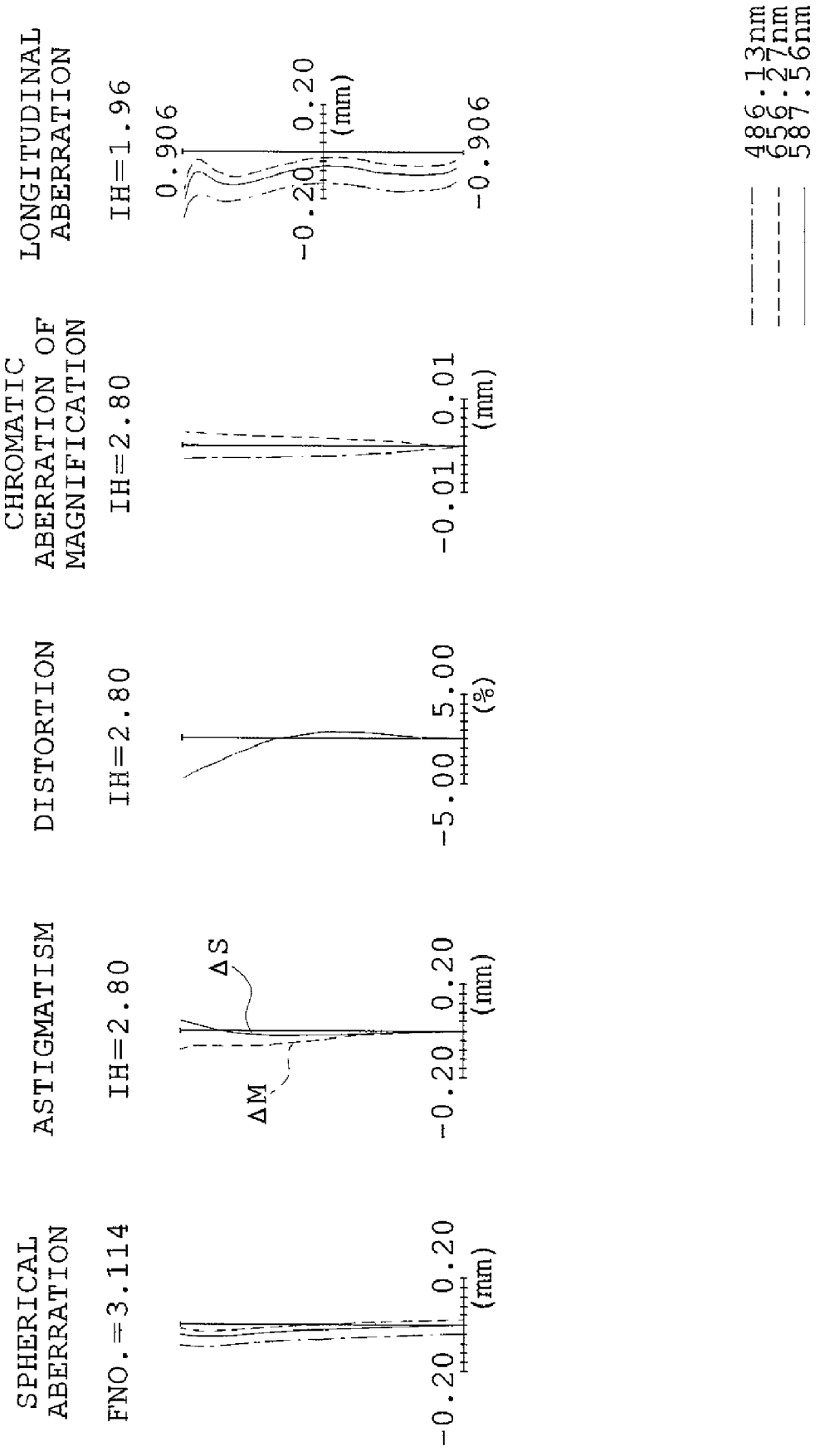

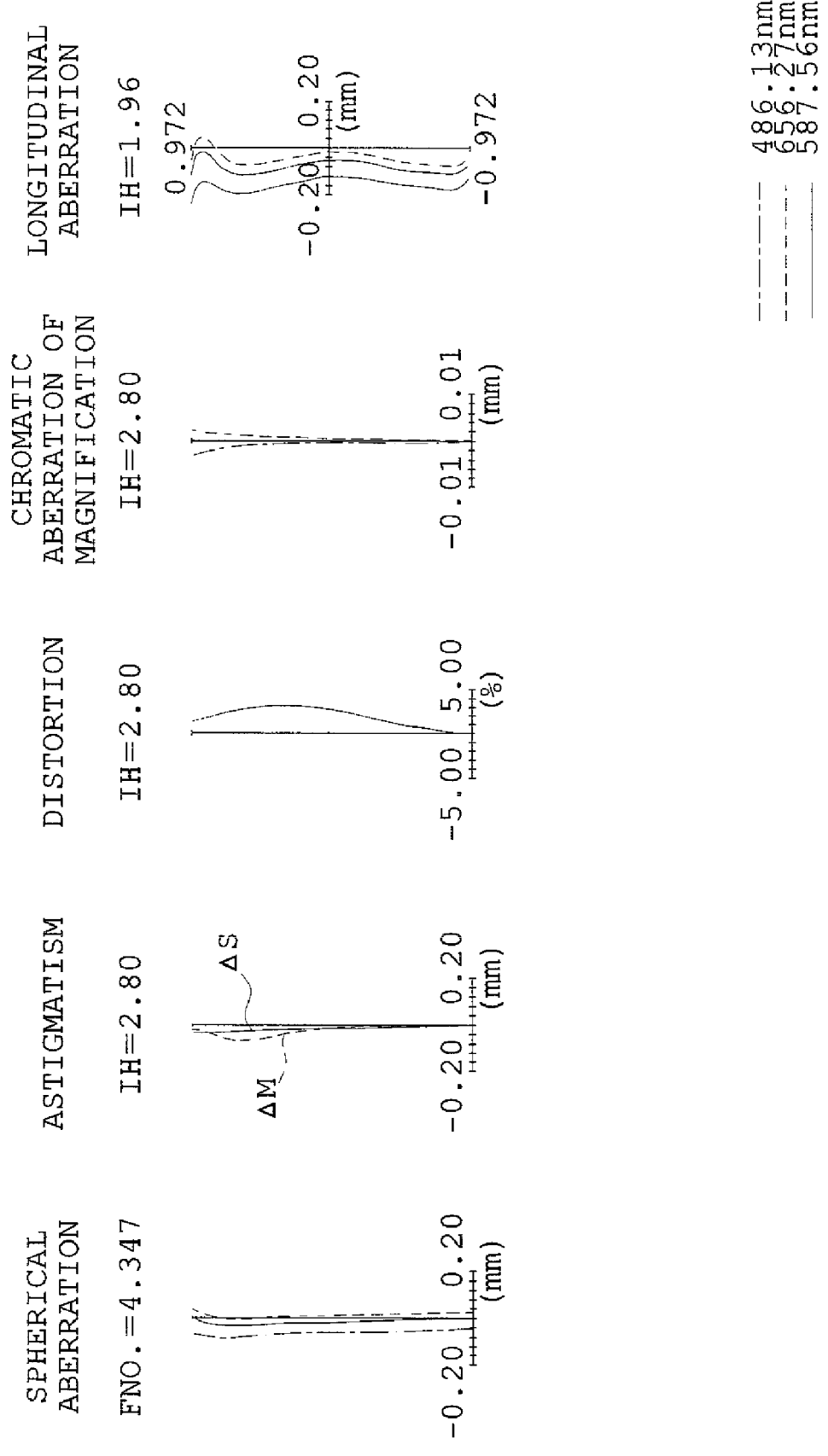

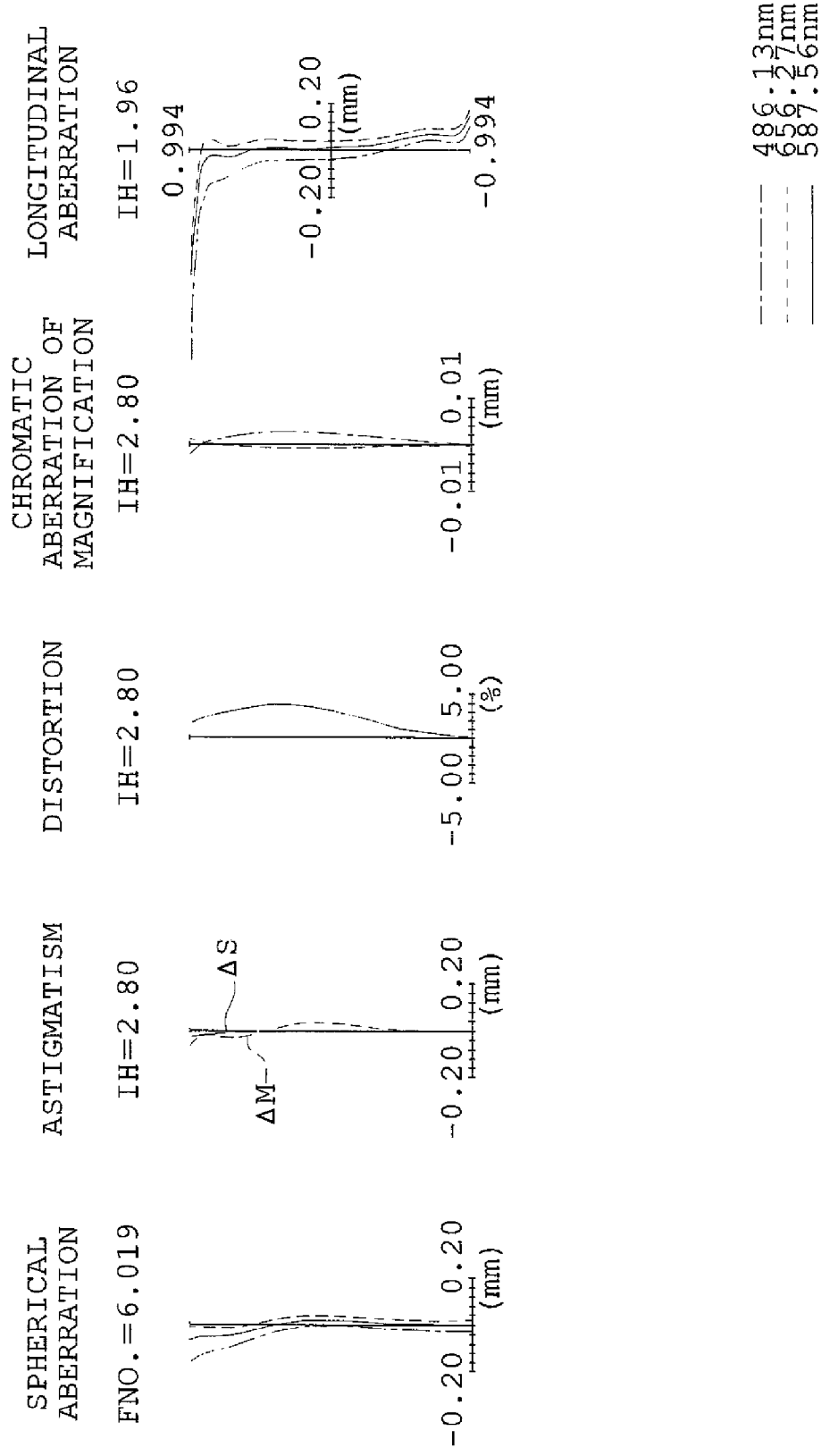

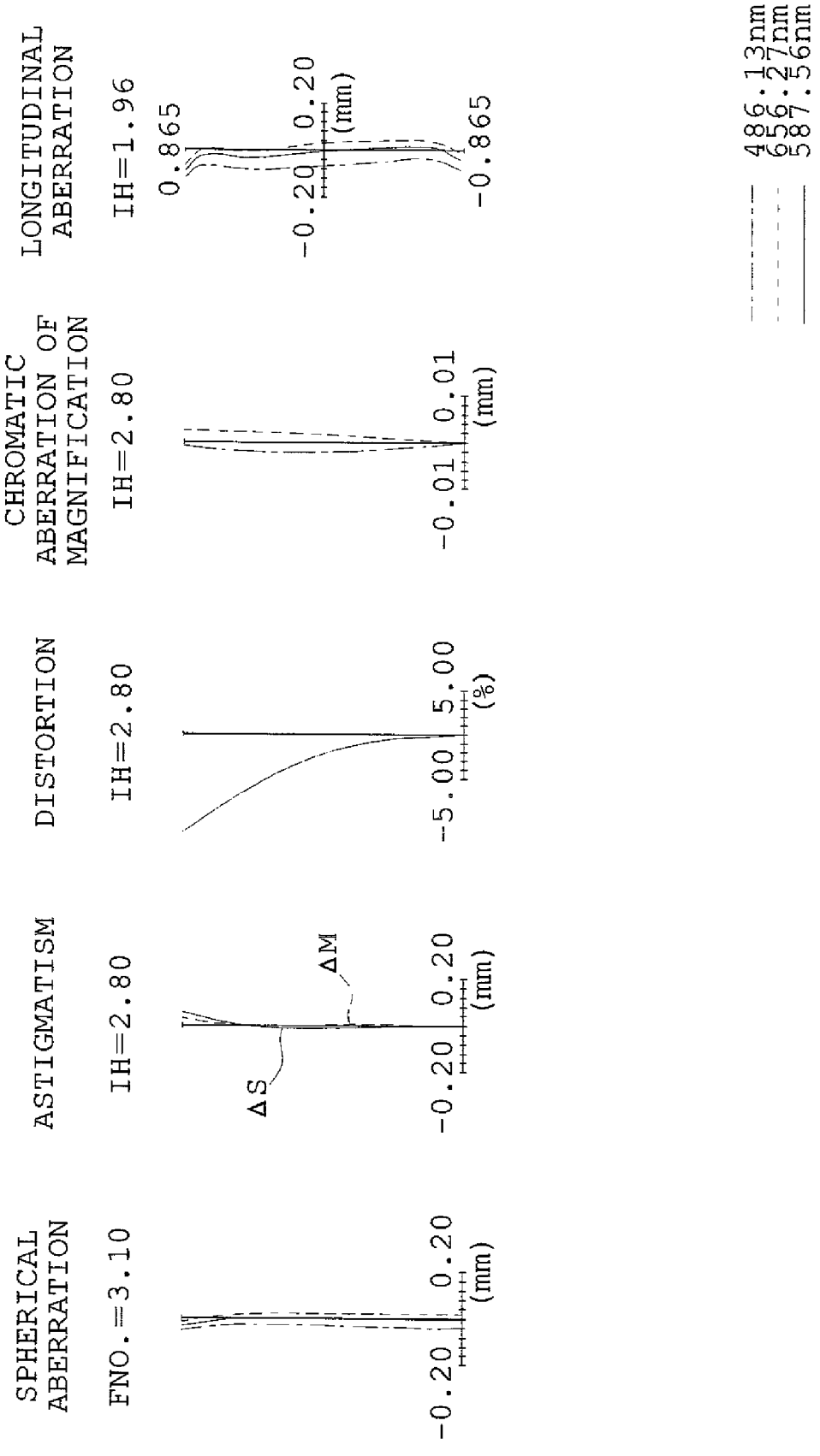

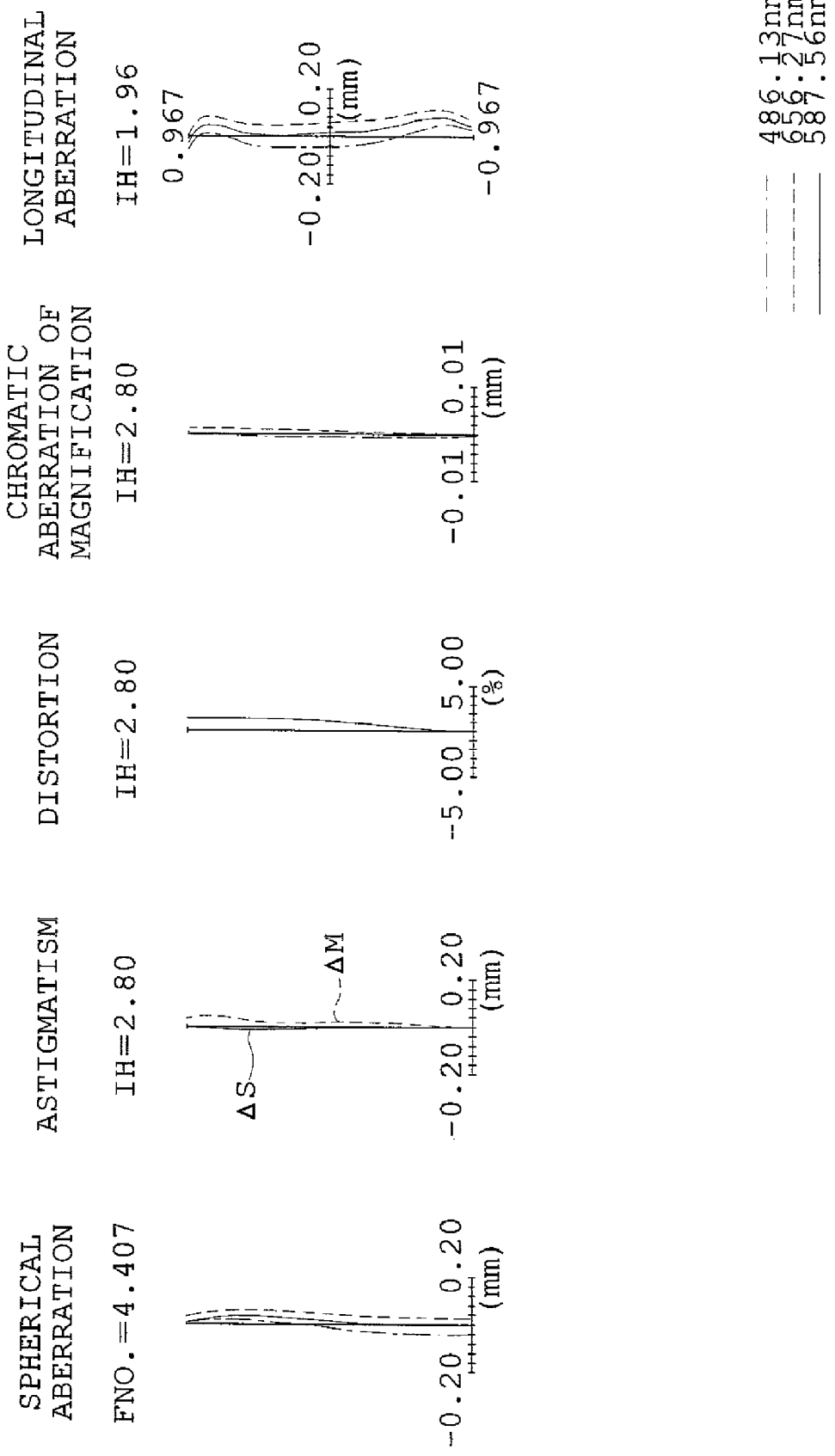

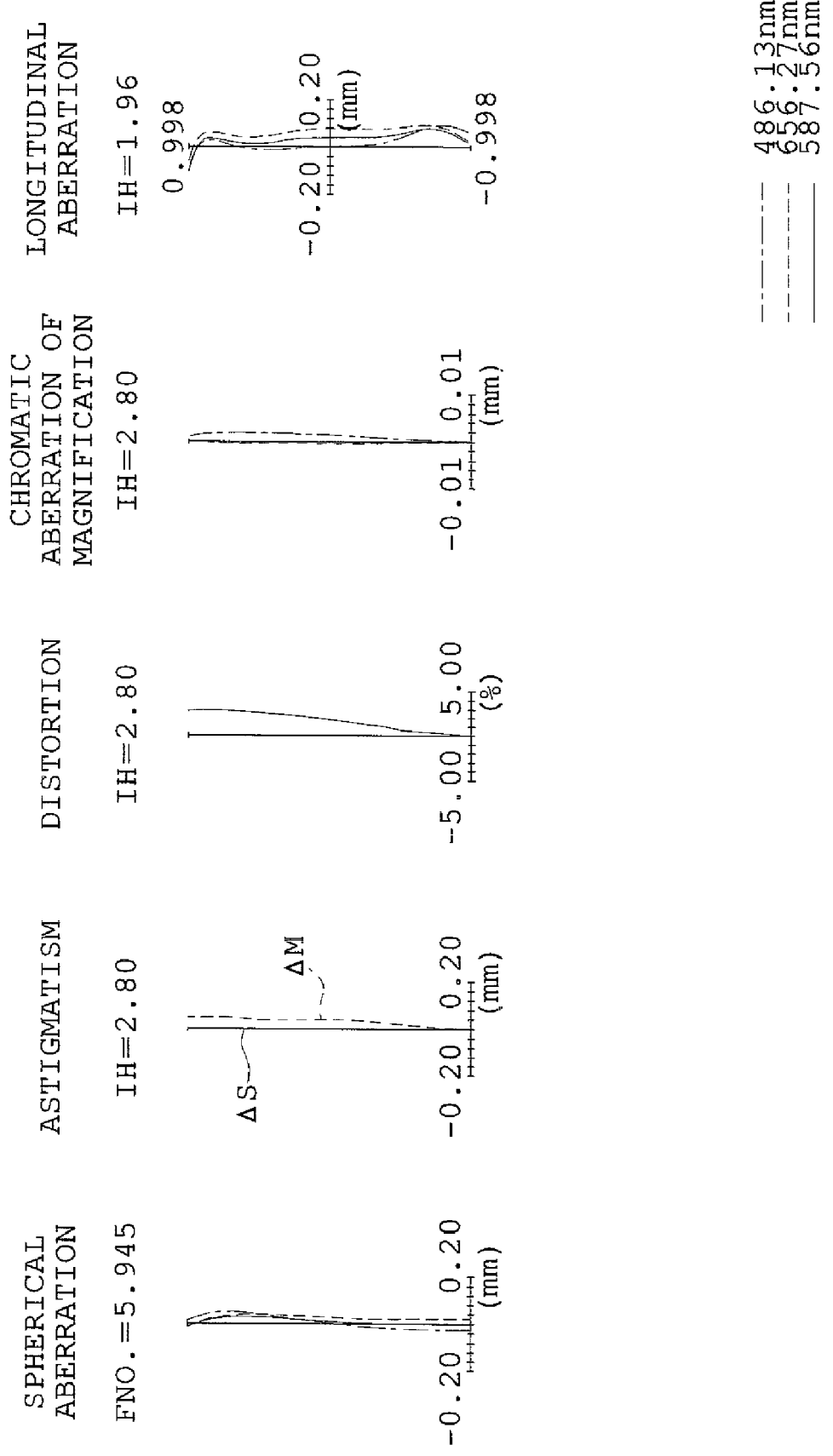

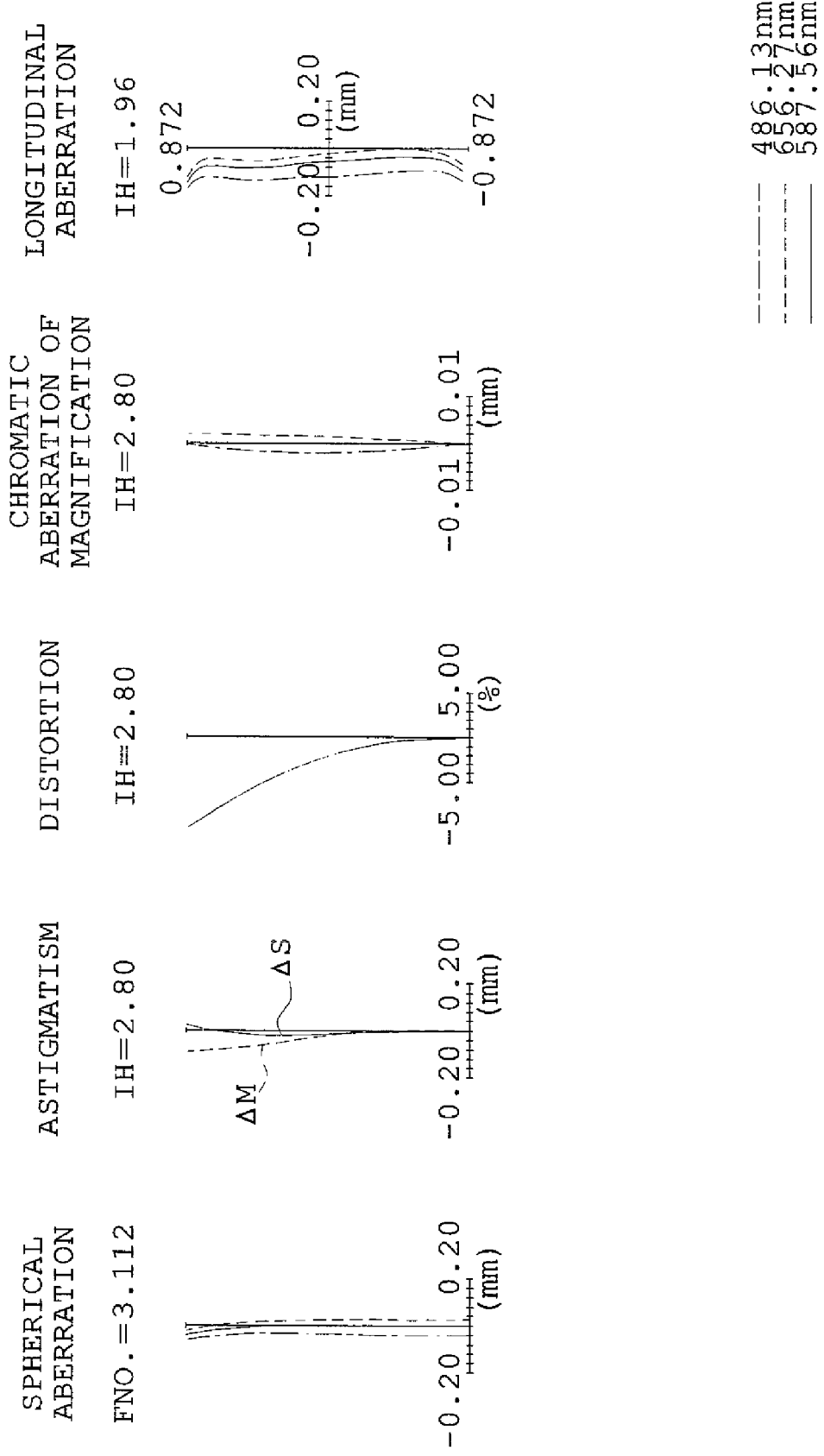

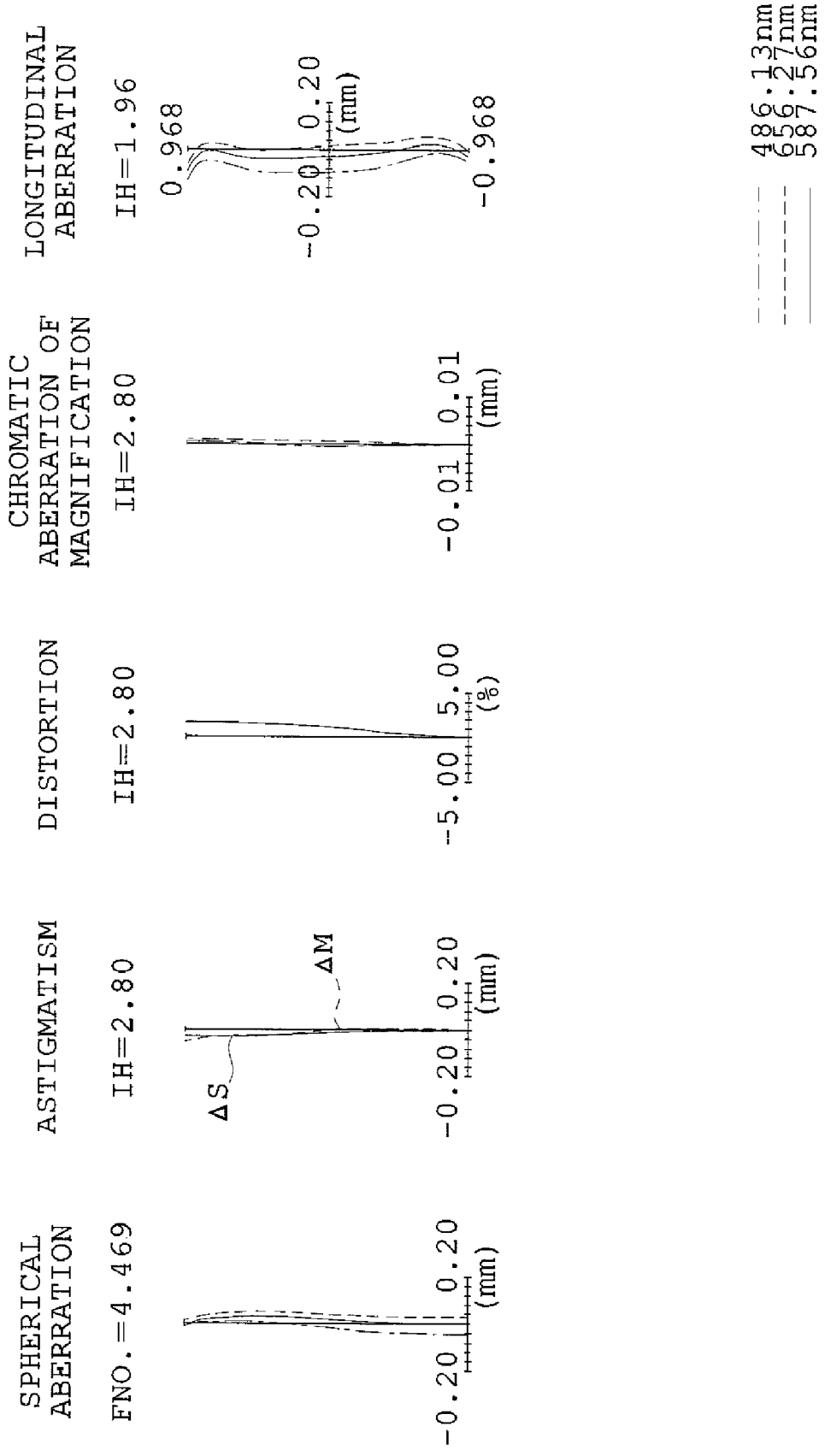

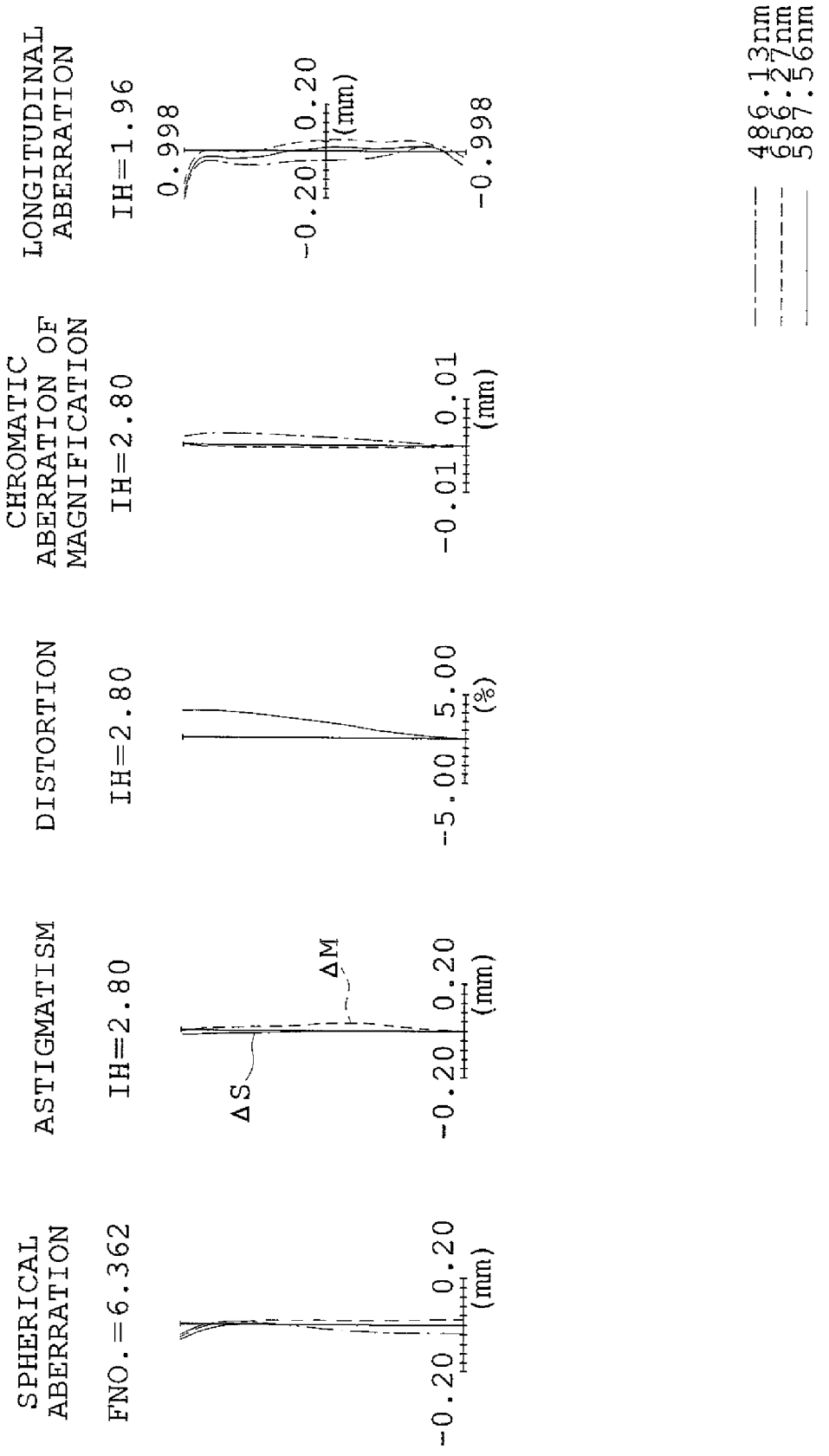

ZOOM OPTICAL SYSTEM AND IMAGE PICKUP APPARATUS PROVIDED WITH THE SAME

This application is a divisional application of U.S. patent application Ser. No. 11/524,788 filed on Sep. 20, 2006 now U.S. Pat. No. 7,679,834, which claims priority to Japanese Application No. 2005-273951 filed on Sep. 2, 2005, each of which is expressly incorporated herein in its entirety by reference thereto.

BACKGROUND OF THE INVENTION

1. Field of the Invention

The present invention relates to a light path bending zoom optical system, especially, a zoom optical system and an image pickup apparatus provided with the same in which a light path bending prism is arranged in order to realize thinning of depth directions of a digital camera, a personal digital assistant (PDA), etc.

2. Description of the Related Art

In an image forming optical system which is built in and used for a miniature camera, a personal digital assistant, a cellular phone, etc., using an electronic image pickup element, such as CCD, C-MOS, etc., miniaturization, especially thinning of its shape has been strongly demanded. Furthermore, a zoom optical system with a high image forming performance which makes an angle of view variable by changing a focal length of image forming optical system is also demanded. To such a demand, many light path bending zoom optical systems in which a prism is arranged at an object side have been proposed and produced commercially. As for such light path bending zoom optical systems, in order to secure an angle of view at a wide angle side, to improve an image forming performance and to make a prism compact, in many cases, one or more negative lenses are arranged at an object side of the prism. On the other hand, as a zoom optical system without requiring such arrangement of the negative lens, for example, zoom optical systems have been proposed. Such systems have been disclosed in Publication of the Japanese unexamined patent application, Toku Kai No. 2003-43354, Publication of the Japanese unexamined patent application, Toku Kai. No. 2003-107356, Publication of the Japanese unexamined patent application, Toku Kai No. 2004-151552, and Publication of the Japanese unexamined patent application, Toku Kai No. 2004-264585.

In these conventional zoom optical systems, an optical system having a zoom ratio with about 3 times has been realized by constituting an entrance surface with concave shape, without arranging a lens element at the object side of a prism. In particular, in zoom optical systems shown in Publication of the Japanese unexamined patent application, Toku Kai No. 2003-43354 and [Publication of the Japanese unexamined patent application, Toku Kai No. 2003-107356, the exit surface of a prism are formed also to be concave surface. A full length of these zoom optical systems is about from 7 to 9 times of a diagonal length of an image pickup screen.

SUMMARY OF THE INVENTION

An zoom optical system according to the present invention comprises, in order from the object side, a prism component which has an entrance surface and a reflecting surface having negative refracting power, and a exit surface having positive refracting power and a group having positive refracting power, wherein the prism component is arranged at the utmost object side in optical elements having refracting power in the zoom optical system, and the lens group comprises two or more moving optical units which move when at least either zooming or focusing is carried out.

An zoom optical system according to the present invention comprises, in order from an object side, a first group having negative refracting power, and a second group having positive refracting power, a third group having negative refracting power, and a fourth group having positive refracting power. The first group further comprises a prism component which is arranged at the utmost object side, and comprises an entrance surface having a concave surface directed toward the object side, a reflecting surface, and an exit surface. The second group further comprises an aperture stop. In such constitution, when zooming is carried out from a wide angle end to a telephoto end, the second group and the third group move toward the object side, respectively, and an interval between the first group and the second group decreases, and an interval between the second group and the third group, and an interval between the third group and the fourth group increase respectively, and the following conditions (1) and (2) are satisfied.

$$1.4 < G23W/G34W < 3 \quad (1)$$

$$0.4 < G23T/G34T < 1.5 \quad (2)$$

where G23W is an interval between the second group and the third group at a wide angle end, G34W is an interval between the third group and the fourth group at a wide angle end, G23T is an interval between the second group and the third group at a telephoto end, and G34T is an interval between the third group and the fourth group at a telephoto end.

A zoom optical system according to the present invention comprises, in order from an object side, a first group having negative refracting power, and a second group having positive refracting power, a third group having negative refracting power, and a fourth group having positive refracting power, wherein the first group comprises a prism component arranged at the utmost object side, which comprises an entrance surface, a reflective surface, and an exit surface, concave surface of which is directed toward to the object side. The second group further comprises an aperture stop, wherein when zooming is carried out from a wide angle end to a telephoto end, the second group and the third group move to the object side, respectively, and an interval between the first group and the second group decreases, and an interval between the second lens group and the third group, and an interval between the third group and the fourth group becomes large, respectively. When focusing is carried out, an interval between the second group and the third group changes. When focusing which is carried out from the infinite distance toward a very near position is based, as for a rate of the amount of movement of the second group and the third group, the second group becomes main at the wide angle side, and the third group becomes main at the telephoto side.

A zoom optical system according to the present invention comprises in order from an object side, a first group having negative refracting power, and a second group having positive refracting power, a third group having negative refracting power, and group with positive refracting power, wherein the first group comprises a prism component arranged at the utmost object side, which comprises an entrance surface, a reflective surface, and an exit surface, concave surface of which is directed toward to the object side, and furthers, and the second group comprising an aperture stop, wherein when zooming is carried out from a wide angle end to a telephoto end. The second group and the third group move to the object side, respectively, and an interval of the first group and the second group decreases, and an interval of the second group and the third group decreases, and an interval of the third group and the fourth group becomes large respectively, and further comprises a light quantity adjustment part arranged between a lens surface arranged at the utmost image side in the second group and a lens surface arranged at the utmost object side in the third group An image pickup apparatus according to the present invention comprises a zoom optical system and an image pickup element, wherein the zoom optical system comprises a first group having a prism component which is arranged at the utmost object side among the zoom optical system and has an entrance surface and a reflective surface, a concave surface of which is directed toward the object side, at least two moving optical units which are arranged at an image side from the first group and movable when zooming is carried out, a last group which is arranged at the utmost image side in the zoom optical system at the image side and has positive refracting power, and an aperture stop arranged between the first group and the last group, wherein when zooming carried out from a wide angle end to a telephoto end, an entrance pupil formed by the aperture stop is moved toward the object side, and an exit pupil formed by the aperture stop in the optical system arranged nearer to the object side than the last group is moved toward the object side, and the last group comprises a lens component having a surface at an object side which is the first aspherical surface a, and a surface at an image side which is the second aspherical surface b, which has a convex surface directed toward the image side near the optical axis, and a point of inflection at a cross-section including the optical axis, and each aspherical surface satisfies the following conditions (3) to (5).

$$0.08 < (ha11 - ha07)/I < 0.3 \quad (3)$$

$$-0.1 < ha07/I < 0.07 \quad (4)$$

$$0.45 < Cb/I < 1 \quad (5)$$

where with respect to the aspherical surface a, $ha07$ is a distance from a reference plane to the aspherical surface a of the direction of an optical axis in 35% of height of an effective diagonal length of an image pickup element (here said reference plane has a vertex of the aspherical surface a and is perpendicular to the optical axis, and, a direction from the object side toward the image side is set to be a positive direction), and, $ha11$ is a distance from the reference plane to the aspherical surface a of the direction of an optical axis in 55% of height of the effective diagonal length of an image pickup element (here the reference plane has a vertex of the aspherical surface a and is perpendicular to the optical axis, and, the direction from the object side to the image side is set to be a positive direction), I is 50% of length of the effective diagonal length of the image pickup element, and Cb is a height from the optical axis to the point of inflection of the aspherical surface b. Here, the effective diagonal length is diagonal length of the greatest domain (effective image pickup surface) which is used for recording, displaying, and printing of an image, on the light receiving surface of an image pickup element.

An mage pickup apparatus according to the present invention comprises a zoom optical system and an image pickup element, wherein the zoom optical system comprises a prism component having an entrance surface which is arranged at the utmost object side in elements having refracting power in the optical system, a concave surface of which is directed toward the object side, a reflecting surface, and an exit surface, and at least one moving optical unit which has refracting power and is moved, and further, the following conditions (6) to (8) are satisfied.

$$-4 < rp1/I < -1.8 \quad (6)$$

$$8 < L/I < 12 \quad (7)$$

$$2.5 < M/I < 7 \quad (8)$$

where rp1 is a radius of curvature of the entrance surface of a prism component, L is an optical path length of a zoom optical system, I is 50% of length of the effective diagonal length of an image pickup element, and M is total of the amount of movement of each group at a wide angle region and at a telephoto region, and the focal length of the telephoto region is 2.3 time or more and 5 times or less of the focal length at the wide angle region.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2E, 2F-2J, and 2K-2O are characteristics diagrams showing spherical aberration, astigmatism, distortion, chromatic aberration of magnification, and longitudinal aberration of a specific image height, and showing the aberrations at a wide angle end, a middle angle position and a telephoto end when a photographing distance is infinite, respectively, of a zoom optical system of the embodiment 1 according to the present invention.

FIGS. 3A-3E, 3F-3J, and 3K-3O are characteristics diagrams showing spherical aberration, astigmatism, distortion, chromatic aberration of magnification, and longitudinal aberration of a specific image height, and showing the aberrations at a wide angle end, a middle position and a telephoto end, respectively, when each photographing distance is 300 mm as very close distance.

FIGS. 5A-5E, 5F-5J, and 5K-5O are characteristics diagrams showing spherical aberration, astigmatism, distortion, chromatic aberration of magnification, and longitudinal aberration of a specific image height of a zoom optical system in the embodiment 2 according to the present invention, and showing the aberrations at a wide angle end, a middle position and a telephoto end when a photographing distance is infinite, respectively.

FIGS. 6A-6E, 6F-6J, and 6K-6O are characteristics diagrams showing spherical aberration, astigmatism, distortion, chromatic aberration of magnification, and longitudinal aberration of a specific image height of a zoom optical system in the embodiment 2 according to the present invention, and showing the aberrations at a wide angle end, a middle position and a telephoto end, respectively, when each photographing distance is 300 mm as very close distance.

FIGS. 8A-8E, 8F-8J, and 8K-8O are characteristics diagrams showing spherical aberration, astigmatism, distortion, chromatic aberration of magnification, and longitudinal aberration of a specific image height of a zoom optical system in the embodiment 3 according to the present invention, and showing the aberrations at a wide angle end, a middle position and a telephoto end when a photographing distance is infinite, respectively.

FIGS. 9A-9E, 9F-9J, and 9K-9O are characteristics diagrams showing spherical aberration, astigmatism, distortion, chromatic aberration of magnification, and longitudinal aberration of a specific image height of the embodiment 3 according to the present invention, and showing the aberrations at a wide angle end, a middle position and a telephoto end, respectively, when each photographing distance is 300 mm as very close distance.

FIGS. 11A-11E, 11F-11J, and 11K-11O are characteristics diagrams showing spherical aberration, astigmatism, distortion, chromatic aberration of magnification, and longitudinal aberration of a specific image height of a zoom optical system in the embodiment 4 according to the present invention, and showing the aberrations at a wide angle end, a middle angle position and a telephoto end when a photographing distance is infinite, respectively.

FIGS. 12A-12E, 12F-12J, and 12K-12O are characteristics diagrams showing spherical aberration, astigmatism, distortion, chromatic aberration of magnification, and longitudinal aberration of a specific image height of a zoom optical system in the embodiment 4, and showing the aberrations at a wide angle end, a middle angle position and a telephoto end when a photographing distance is 300 mm as very close distance, respectively.

FIGS. 14A-14E, 14F-14J, and 14K-14O are characteristics diagrams showing spherical aberration, astigmatism, distortion, chromatic aberration of magnification, and longitudinal aberration of a specific image height of a zoom optical system in the embodiment 5, and showing the aberrations at a wide angle end, a middle angle position and a telephoto end when a photographing distance is infinite, respectively.

FIGS. 15A-15E, 15F-15J, and 15K-15O are characteristics diagrams showing spherical aberration, astigmatism, distortion, chromatic aberration of magnification, and longitudinal aberration of a specific image height, of a zoom optical system in the embodiment 5, and showing the aberrations at a wide angle end, a middle position and a telephoto end, respectively, when each photographing distance is 300 mm as a very close distance.

DETAILED DESCRIPTION OF THE PREFERRED EMBODIMENTS

Figure 1A:
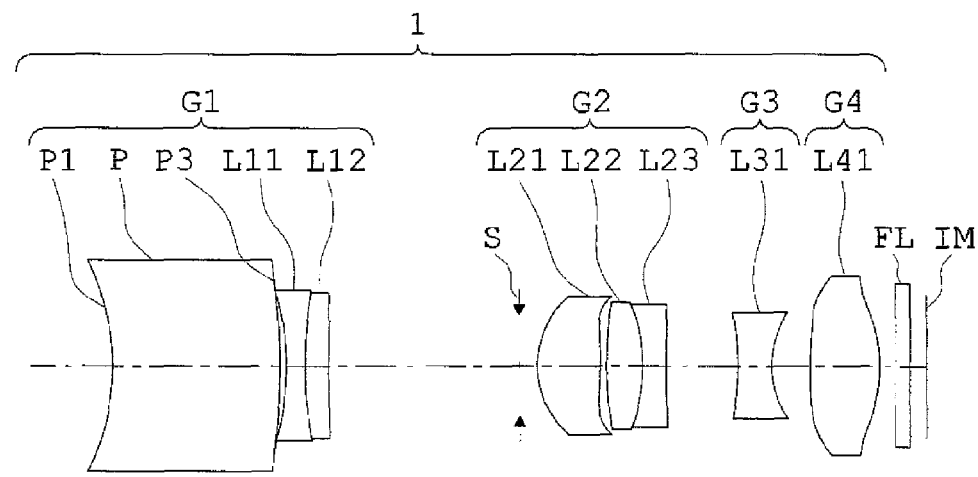
FIGS. 1A, 1B and 1C are developed views of light path along an optical axis showing an optical arrangement of a zoom optical system at a wide angle end, a middle position and a telephoto end when photographing distance is infinite, respectively, of the embodiment 1 according to the present invention.

In advance of explanation of embodiments, the more concrete function and effect of the present invention will be explained.

A zoom optical system of the first invention, comprises in order from an object side, a prism component which has an entrance surface having negative refracting power, a reflecting surface, and an exit surface having positive refracting power, and at least two movable groups which can be moved when either zooming or focusing is carried out, wherein the groups have positive refracting power as a whole.

As shown in the zoom optical system of the first invention, by using the prism component which has an entrance surface having negative refracting power, and an exit surface having positive refracting power, while suppressing the refracting power of the whole prism component from becoming too strong in a negative direction, an entrance surface having strong negative refracting power can be arranged. By this, a size of the entrance surface of the prism component can be made small, an incident light height to the prism component can be made low, and accordingly, it enables to contribute achieving of thinning. If it is constituted in this way, by balancing an amount of generation of a curvature of field and a distortion generated on a concave surface which is an entrance surface of the prism component through a convex surface which is an exit surface of the prism component, the full length of groups arranged at the image side nearer than the prism component can be shortened. That is, if the balance of the amount of the curvature of field and the amount of distortion generated in the prism component is lost, an aberration-correction surface in a portion where luminous flux according to an image height is separated in order to correct both of aberrations good, is increased, and consequently, the full length of a zoom optical system has to be lengthened as a result. As for the prism component, it is desirable to have refracting power which is from weak positive refracting power to negative refracting power, and it is necessary to constitute so that lens element group at the image side may have positive refracting power from a wide angle state to a telephoto state. If two movable groups are arranged, by changing the focal length, focusing can be carried out on an image surface.

An zoom optical system according to the second invention comprises, in order from an object side, a first group having negative refracting power, and a second group having positive refracting power, a third group having negative refracting power, and a fourth group having positive refracting power, the first group further comprising a prism component which is arranged at the utmost object side, and comprises an entrance surface having a concave surface directed toward the object side, a reflecting surface, and an exit surface, and the second group further comprising an aperture stop, wherein, when zooming is carried out from a wide angle end to a telephoto end, the second group and the third group move toward the object side, respectively, and an interval between the first group and the second group decreases, and an interval between the second group and the third group, and an interval between the third group and the fourth group become wide respectively, and the following conditions (1) and (2) are satisfied.

$$1.4 < G23W/G34W < 3 \quad (1)$$

$$0.4 < G23T/G34T < 1.5 \quad (2)$$

where G23W is an interval between the second group and the third group at a wide angle end, G34W is an interval between the third group and the fourth group at a wide angle end, G23T is an interval between the second group and the third group at a telephoto end, and G34T is an interval between the third group and the fourth group at a telephoto end, If a prism component is used for the first group, thinning of an image pickup optical system constituted by using a zoom optical system can be attained. In this case, if it is constituted so that a concave surface of an entrance surface may be directed toward the object side, it is possible to arrange the prism component at the utmost object side, while miniaturizing the prism component, compared with the conventional composition in which a negative lens element and the like are arranged independently at the object side of the prism component like the zoom optical system shown in the patent documents 1 to 4, further thinning of the image pickup optical system can be achieved.

In the second invention, a prism component means the optical element, wherein with respect to the optical element including a prism, only a surface which is arranged at the utmost object side, and only a surface which is arranged at the utmost image side contacts with air, and no air interval contains between the surfaces. As for prism component, it is defined that a prism itself, or a cemented element in which a lens and a prism is cemented is one unit. As for a lens component, it is defined that, with respect to the lens, only a surface which is arranged at the utmost object side, and only a surface which is arranged at the utmost image side contacts with air, and no air interval contains between the surfaces, and single lens or a cemented lens is one unit.

If the second group has a substantial aperture adjusting function, it becomes easy to miniaturize a prism component, and a diameter after the third group, and to bring an incident angle of the luminous flux to the image pickup element close perpendicularly. As a constitution having a substantial aperture adjusting function, besides a composition in which an aperture stop is arranged directly in the second group, for example, a substantial aperture stop may be constituted by a part of mirror holding frame incorporating the lens which constitutes the second group.

When zooming is carried out from a wide angle end to a telephoto end, by moving the second group and the third group toward the object side, respectively, by making an interval between the first group and the second group small, and by extending an interval between the second group and the third group G3, and an interval between the third group G3 and the fourth group G4, zooming function can be distributed with two groups, that is, the second group and the third group. Accordingly, change of an aberration can be suppressed, and it becomes easy to secure permissible conditions on manufacturing such as decentering and the like.

In particular, in the third group, when zooming is carried out from a wide angle end to a telephoto end, by extending an interval to the second group, a telephoto type power can be strengthened and the shortening effect of the full length can be obtained. Further, by extending an interval to the fourth group, an incidence height of the luminous flux at circumference to the fourth group can be made high, and it becomes easy to correct well off-axis aberration, especially distortion through the fourth group.

In the fourth group, since it has a function to adjust an exit pupil position, and when zooming is carried out from a wide angle end to a telephoto end, the second group having an aperture stop, and the third group having a negative component move away toward the object side, by changing the incident light height of the chief ray to each image height (it is made high at the telephoto end), it becomes easy to correct well the off-axis aberration, especially the distortion, irrespective of a zooming state. Also, in the entrance surface of the first group, since the direction of the off-axis luminous flux at the wide angle end side enters into a position distant far from the optical axis compared with a case of the telephoto-end side, it becomes easy to correct the off-axis aberration the wide angle end side. Thus, by constituting the first group to the fourth group, it becomes easy to correct aberrations with sufficient balance over the range from the wide angle end to the telephoto end.

It is not desired that if it is less than the lower limit of condition (1), the third group and the fourth group separate too much at a wide angle end. On the other hand, it is not desired that if it exceeds the upper limit of condition (1), an interval between the second group and the fourth group becomes large too much. It is not desired that if it is less the lower limit of condition (2), an interval between the second group and the third group becomes small too much, and a telephoto arrangement becomes weak. On the other hand, it is not desired that if it exceeds the upper limit of condition (2), an interval between the third group and the fourth group becomes close too much.

Figure 24:
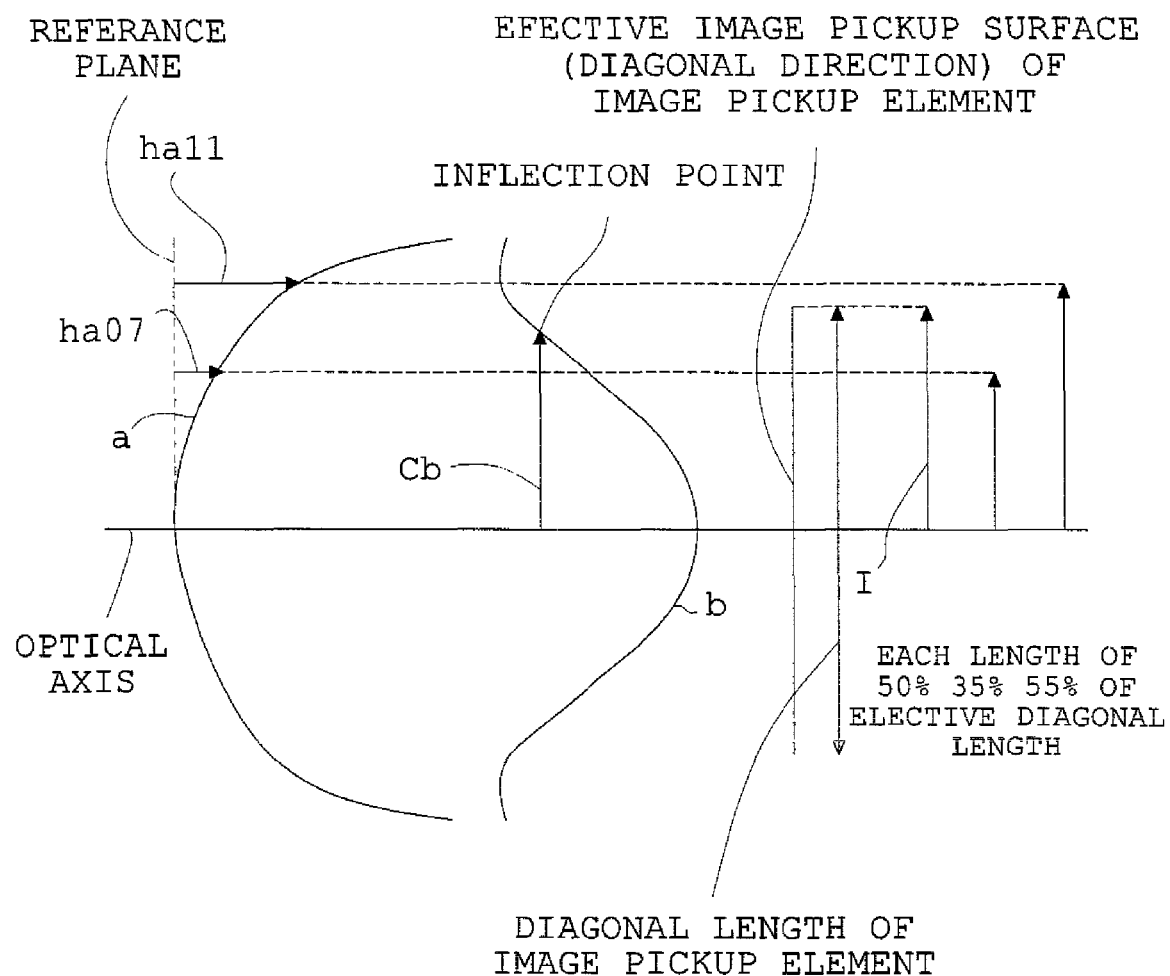
FIG. 24 is an explanatory diagram about the conditions (3), (4), and (5).

An image pickup apparatus according to the third invention comprises a zoom optical system and an image pickup element, wherein the zoom optical system comprises a first group having a prism component which is arranged utmost at an object side among the zoom optical system and has an entrance surface and a reflecting surface, a concave surface of which is directed toward the object side, at least two moving optical units which are arranged at an image side from the first group and movable when zooming is carried out, a last group which is arranged at the utmost image side in the zoom optical system at the image side and has positive refracting power, and an aperture stop arranged between the first group and the last group, wherein when zooming is carried out from a wide angle end to a telephoto end, an entrance pupil formed by the aperture stop is moved toward the object side, and an exit pupil formed by the aperture stop in the optical system arranged nearer to the object side than the last group is moved toward the object side, and the last group comprises a lens component having a surface at an object side which is the first aspherical surface a, and a surface at an image side which is the second aspherical surface b. The second aspherical surface b has a convex surface directed toward the image side near the optical axis, and a point of inflection at a cross-section including the optical axis, and each aspherical surface satisfies (5) the following conditions (3) to (5).

$$0.08 < (ha11 - ha07)/I < 0.3 \quad (3)$$

$$-0.1 < ha07/I < 0.07 \quad (4)$$

$$0.45 < Cb/I < 1 \quad (5)$$

where with respect to the aspherical surface a, ha07 is a distance from a reference plane to the aspherical surface a of the direction of an optical axis in 35% of height of an effective diagonal length of an image pickup element (here said reference plane has a vertex of the aspherical surface a and is perpendicular to the optical axis, and, a direction from the object side toward the image side is set to be a positive direction), and, ha11 is a distance from the reference plane to the aspherical surface a of the direction of an optical axis in 55% of height of the effective diagonal length of an image pickup element (here the reference plane has a vertex of the aspherical surface a and is perpendicular to the optical axis, and, the direction from the object side to the image side is set to be a positive direction), I is 50% of length of the effective diagonal length of the image pickup element, and Cb is a height from the optical axis to the point of inflection of the aspherical surface b. (refer to FIG. 24).

As shown in the second invention, if a prism component is used for the first group, thinning of an image pickup optical system constituted by using a zoom optical system can be attained. Here, if a concave surface of the entrance surface is directed toward the object side, a prism component can be arranged at the utmost object side, while it is miniaturized, and further thinning of the image pickup optical system can be achieved.

In the fourth group, by using a function to adjust an exit pupil position, and by changing the incident light height of the chief ray to each image height (it is made high at the telephoto end) when zooming is carried out from a wide angle end to a telephoto end, in addition to the effect of the first group, it becomes easy to correct well the off-axis aberration, especially the distortion, irrespective to a zooming state. Also, in the entrance surface of the first group, since the direction of the off-axis luminous flux at the wide angle end side enters into a position distant far from the optical axis compared with a case of the telephoto-end side, it becomes easy to correct the off-axis aberration the wide angle end side. Thus, by constituting the first group to the fourth group, it becomes easy to correct aberrations with sufficient balance over the range from the wide angle end to the telephoto end.

On the other hand, different from the case of the third invention, if it is constituted such that an entrance pupil position is moved toward an image side at the telephoto-end side, correction of aberrations becomes difficult, since in the entrance surface of the first group, due to a wide angle of view at the wide-angle-end side, and a distant entrance pupil, there is no difference of incident luminous fluxes to a circumferential image height. (namely, a possibility that the domain where paraxial luminous flux and off-axis luminous flux pass an entrance surface of the first group overlap becomes large)

The conditions (3), (4), and (5), are conditions which specify desirable form of an aspherical surface to demonstrate functions of the fourth group. The conditions (3) and (4), show that an aspherical surface a at an object side has weak refracting power in the central part, and It has acute strong refracting power at a circumference part.

This serves as form advantageous to especially aberration correction at a telephoto end side. If it becomes less than the lower limit of condition (3), the curvature of the form of a circumference part becomes tight too much, and processing becomes difficult and disadvantageous with respect to productivity. On the other hand, if it exceeds the upper limit of condition (3), especially the off-axis aberration of a telephoto side will get worse. If it becomes less than the lower limit of condition (4), the degree of change of the curvature of this surface (aspherical surface a) becomes tight, and it is not desirable. On the other hand, when it exceeds the upper limit of condition (4), if it is attempted to distinguish between the refracting power of the central part and the circumference part of the lens surface concerned, the lens form becomes complicated and it is disadvantageous for improving an image forming performance on the whole.

The condition (5) shows that as for the refracting power of the aspherical surface b from the central portion to the circumference portion, the divergence function becomes strong. If condition (5) is satisfied, positive refracting power to the luminous flux to the circumference image height at a telephoto end side will become small rather than that of a wide-angle-end side, and it becomes advantageous for suppressing change of a substantial exit pupil position.

By combining with the aspherical surface a at the object side, off-axis aberrations such as circumference image height, chromatic aberration, coma aberration, distortion and the like can be corrected well.

That is, the off-axis aberration at the wide angle end side is mainly corrected well in the first group, and even if it degrades the aberration at the telephoto end side, it becomes easy to obtain a good image forming performance on the whole. If it is less than the lower limit of condition (5), the luminous flux at circumference at the telephoto end side and a lot of luminous flux at circumference at the wide angle end sides are influenced together by lens function at the circumference side rather than from the point of inflection, and accordingly it becomes disadvantageous when performances to the luminous flux are distinguished. If it is less than the lower limit of condition (5), the luminous flux at circumference at the telephoto end side and a lot of luminous flux at circumference at the wide angle end side receive together lens function at the center side rather than from the point of inflection, and accordingly it becomes disadvantageous when performances to the luminous flux are distinguished (That is, since a possibility that paraxial luminous flux and off-axis luminous flux are overlapped becomes large, correction of aberrations becomes difficult).

A zoom optical system according to the fourth invention comprise, in order from an object side, a first group having negative refracting power, and a second group having positive refracting power, a third group having negative refracting power, and a fourth group having positive refracting power, wherein the first group comprises a prism component arranged at the utmost object side, which comprises an entrance surface, a reflecting surface, and an exit surface, concave surface of which is directed toward to the object side, and the second group comprising an aperture stop, wherein when zooming is carried out from a wide angle end to a telephoto end, the second group of the third group move to the object side, respectively, and an interval between the first group and the second group decreases, and an interval between the second lens group and the third group, and an interval between the third group and the fourth group becomes large, respectively, and when focusing is carried out, an interval between the second group and the third group changes. When focusing which is carried out from the infinite distance toward a very near position is based, as for a rate of the amount of movement of the second group and the third group, the second group becomes main at the wide angle side, and the third group becomes main at the telephoto side.

In a zoom optical system wherein, with respect to arrangement of refracting power, the first group is negative, the second group is positive, the third group is negative, and the fourth group is positive, and furthermore the second group and the third group are moved at the time of zooming, taking a state such that an interval between the third group and the fourth group is brought close at the a wide angle end. On the other hand, an interval between the first group and the second group is brought close at the telephoto end, becomes advantageous conditions for the full length shortening and the aberration corrections of the optical system.

In this case, if it is constituted such that focusing is carried out by the third group or the fourth group, it is required that the interval between the third group and the fourth group, in order to secure a space required for focusing at the wide angle end also. On the other hand, if it is constituted such that focusing is carried out by the second group, it is required that the interval between the first group and the second group, in order to secure a space required for focusing at the telephoto end also. However, focusing in the first group is not desirable since it moves a prism component. Therefore, according to the zoom optical system of the present invention, in order to solve such the subject and to lessen groups to be driven at the time of zooming, it is constituted such that focusing is carried out the second group and the third group.

When focusing which is carried out toward a very near direction from the infinite distance is based, it is constituted such that the second group is made to be main at the wide angle side about the rate of the movement and the third group is made to be main at the telephoto side. If constituted in this way, it becomes easy to bring the interval between the third group and the fourth group close at the wide angle end, and also it becomes easy to bring the interval between the first group and the second group close at the telephoto end. As a result, it becomes possible to shorten the full length of the zoom optical system.

A zoom optical system according to the fifth invention comprise, in order from an object side, a first group having negative refracting power, and a second group having positive refracting power, a third group having negative refracting power, and a group with positive refracting power, wherein the first group comprises a prism component arranged at the utmost object side, which comprises an entrance surface, a reflecting surface, and an exit surface, concave surface of which is directed toward to the object side, and furthers, and the second group comprising an aperture stop, wherein when zooming is carried out from a wide angle end to a telephoto end. The second group and the third group move to the object side, respectively, and an interval of the first group and the second group decreases, and an interval of the second group and the third group decreases, and an interval of the third group and the fourth group becomes large respectively, and further comprises a light quantity adjustment part arranged between a lens surface arranged at the utmost image side in the second group and a lens surface arranged at the utmost object side in the third group.

It is required that an interval between the first group and the second group is made close at the telephoto end, and an interval between the third group and the fourth group is made close at the wide angle end. As for the interval of the second group and the third group, it is required that it has a telephotograph nature over the whole zooming range, and accordingly, it is necessary to secure a certain amount of interval. Although it is desired that the second group has a function of substantial aperture stop. Besides this, it is desirable to arrange a component which adjusts a quantity of light, including shading component between the second group and the third group. By this arrangement, an efficient zoom constitution is attained, and miniaturization with good performance as a whole can be achieved.

An image pickup apparatus according to the sixth invention comprises a zoom optical system and an image pickup element, wherein the zoom optical system comprises a prism component having an entrance surface which is arranged utmost at an object side, a concave surface of which is directed toward the object side, a reflecting surface and an exit surface, and further the following conditions (6) to (8) are satisfied.

$$-4 < rp1/I < -1.8 \quad (6)$$

$$8 < L/I < 12 \quad (7)$$

$$2.5 < M/I < 7 \quad (8)$$

where rp1 is a radius of curvature of the entrance surface of a prism component, L is an optical path length of a zoom optical system, I is 50% of length of the effective diagonal length of an image pickup element, and M is total of the amount of movement of each group at a wide angle region and at a telephoto region, and the focal length of the telephoto region is 2.3 times or more and 5 times or less of the focal length of the wide angle region.

The condition (6) is a condition for attaining miniaturization, while obtaining a good optical performance, in a constitution such that a prism component which has an entrance surface having a concave surface directed toward an object side, a reflecting surface and an exit surface is arranged at the utmost object side. If the upper limit of condition (6) is exceeded, an entrance pupil position becomes close at the wide angle end side, and separation of luminous flux worsens by the image height at the entrance surface, and accordingly it becomes difficult to get a good off-axis performance. If the lower limit of condition (6) is not reached, good optical performance is hard to achieve and would require an additional lens element to be arranged on the object side, which is disadvantageous for miniaturization. Falling below the lower limit of condition (7) is not desirable, because the full length becomes so short as to bring about a complicated structure for zooming and for lens group arrangement. On the other hand, exceeding the upper limit of condition (7) is not desirable, because, in a situation where zoom constitution is simplified, fluctuation of an entrance pupil position becomes large, or the entrance pupil position at the wide angle end becomes too distant, and accordingly the prism becomes large. The condition (8) is a condition which specifies the balance between the length of lens constitution and the zoom moving region. If the upper limit of the condition (8) is exceeded, it is difficult to strike a balance between various aberration corrections. On the other hand, if the lower limit of the condition (8) is not reached, in order to secure a considerable magnification ratio, each group is required to have a strong refracting power, which would easily generate aberrations. In the zoom optical system according to the seventh invention, in one of the zoom optical system of the first to sixth invention, it is desired that the prism component has negative refracting power as a whole. In this way, by diffusing exit luminous flux, especially correction of spherical aberration or longitudinal aberration of specific image can be carried out easily by the lens element group at the image side. In the zoom optical system according to the eighth invention, in one of the zoom optical system of the first to seventh invention, it is desired that the following condition (9) is satisfied:

$$-0.55 < \Phi P \cdot fw < 0 \quad (9)$$

where the refracting power of the prism component is ΦP, and the focal length of the zoom optical system at the wide angle end is fw.

If it exceeds the upper limit of condition (9), in the group at the image side, especially correction of spherical aberration or longitudinal aberration in a specific image becomes difficult, and it becomes necessary to increase the number of lenses composed of a group and to use an expensive material and a lens element with high processing cost in order to obtain a high image forming performance. It is not desirable for productivity and cost. If it is less than the lower limit of condition (9), a concave surface form on an entrance surface becomes deep, and the processability of the prism component becomes worse, or it becomes unable to keep balances among a curvature of field, chromatic aberration, and distortion.

In the zoom optical system according to the ninth invention, in one of the zoom optical system of the first to eight invention, it is desirable to satisfy the following condition (10), where paraxial radius of curvature of an entrance surface is rP1 and the paraxial radius of curvature of the exit surface is rP2 as for the prism component.

$$-1 < (rP1-rP2)/(rP1+rP2) < -0.2 \quad (10)$$

If it exceed the upper limit of condition (10), in the group at the image side, especially correction of spherical aberration or longitudinal aberration in a specific image becomes difficult, and it becomes necessary to increase the number of lenses composed of a group and use an expensive material and a lens element with high processing cost in order to obtain a high image forming performance. If it is less than the lower limit of condition (10), a concave surface form on an entrance surface becomes deep, and the processability of the prism component becomes worse, or it becomes unable to keep balances among a curvature of field, chromatic aberration, and distortion.

In the zoom optical system according to the tenth invention, one of the first to ninth invention, it is desired that an entrance surface and an exit surface of the prism component are aspherical surfaces, a reflecting surface of the prism component is a flat plane, and each of aspherical surfaces of the prism component has a shape such that refracting power becomes weak as it departs from an optical axis. (namely, a shape in which the absolute value of a local curvature becomes small as it departs from the optical axis) If it is constituted such that the reflecting surface has a curvature, or it has an aspherical surface, it becomes advantageous for a paraxial layout since a surface having refracting power can be arranged near the entrance surface. However, on the other hand, in order to correct an asymmetrical aberration generated on the reflecting surface having aspherical surface form, it is necessary to arrange an asymmetrical surface to an optical axis at another surface. As a result, therefore, it becomes disadvantageous in view of a number of lenses, processing cost, etc. The aspherical surface forms of the entrance surface and the exit surface are formed so that refracting power may become weak as each of them departs from the optical axis similarly. By such constitution mentioned above, meniscus form is maintained, and it becomes easy to control the balance of an off-axis aberration by using a fact that overlapped state of the luminous flux of each image height changes at the entrance surface and the exit surface. Moreover, if the aspherical surfaces of the entrance surface and the exit surface are formed to be symmetrical with respect to the axis, it is desirable for processing or aberrations correction.

In the zoom optical system according to the eleventh invention, in one of the zoom optical system of the first, the third or the sixth invention 1, it is desired that it comprises in order from an object side, a first group which comprises the prism component, and has negative refracting power group which comprises an aperture stop and has positive refracting power, a third group having negative refracting power, and a fourth group having positive refracting power, wherein the second group and the third group are the moving optical units, and when zooming is carried out from a wide angle end to a telephoto end, while the second group and the third group are moved to the object side respectively, an interval between the first group and the second group decreases, and an interval between the third group and the fourth group becomes large. As shown in the zoom optical system of the first invention, by moving the second group and the third group toward the object side, while extending the interval, respectively, zooming function is distributed to these two groups, and change of an aberration can be suppressed, and accordingly, it becomes easy to secure permissible conditions on manufacturing such as decentering and the like. If it is constituted such that the fourth group has a function to adjust an exit pupil position, and when zooming is carried out from a wide angle end to a telephoto end, the second group having an aperture stop, and the third group having a negative component are moved away toward the object side, it becomes easy to correct well the off-axis aberration, especially the distortion, irrespective to a zooming state, by changing the incident light height of the chief ray to each image height.

In a zoom optical system of the twelfth invention, in one zoom optical system according to one of the first to the fifth and the eleventh invention, it is desired that the third group comprises one negative lens. It is constituted so that correction of the off-axis aberration of at the wide angle end side is carried out by the first group, correction of an on-axis aberration is carried out by the second group, and correction of the off-axis aberration at the telephoto end side is carried out mainly by the fourth group, and furthermore, the third group consists of one negative lens so that paraxial functions such as zooming function, function of compensator, etc. are carried out mainly by the third group. Thus, if the third group is constituted with one negative lens, it becomes advantageous for miniaturization as the full length of a zoom optical system is shortened.

In the zoom optical system of the thirteenth invention, it is desired that the one negative lens constituting the third group is formed by plastic molding since the function of the third group is mainly magnification in the zoom optical system of the twelfth invention. It is desired that restrictive conditions with respect to refractive index and dispersion of the material are made loose in order to be advantageous in respect of cost or weight.

In the zoom optical system according to the fourteenth invention, it is desired that the first group is constituted such that a negative lens and a positive lens are arranged at the image side of the prism component in one of the zoom optical system of the second to fourth inventions, or the eleventh to thirteenth inventions. It is desirable to make such arrangement, since the chromatic aberration of magnification at the wide angle side can be corrected well.

In the zoom optical system of the fifteenth invention, it is desired that in a zoom optical system of the fourteenth invention, the refractive index of the negative lens and the positive lens is 1.7 or more, respectively. If the refractive index is made high and the radius of curvature is made loose, the full length can be shortened, and accordingly it can contribute to miniaturization. Especially, if the interval between the backside principal point of the first group and the second group can be made small at the telephoto end, the effect of a miniaturization becomes large, since the amount of movement of each group, or load of aberrations correction in the prism component can be made small.

In the zoom optical system according to the sixteenth invention, it is desired that the negative lens and the positive lens are cemented in the zoom optical system of the fifteenth invention. By cementing lenses, the total length can be shortened. Moreover, the influence due to decentering etc., can also be reduced.

In the zoom optical system of the seventeenth invention, it is desired that the second group comprises, in order from an object side, a positive lens, a positive lens, and a negative lens in the zoom optical system according to one of the eleventh to the sixteenth invention. It is desired that two positive lens and one negative lens are arranged in the second group in order to correct fully aberration and chromatic aberration on the optical axis. Furthermore, in order to arrange the front side principal point of the second group at the object side, it is advantageous to constitute that two positive lenses are arranged at the object side, and one negative lens is arranged at the image side.

In the zoom optical system of the eighteenth invention, it is desired that a lens surface at utmost object side in the second group is a double aspherical lens formed by a plastic molding processing, and a positive lens and a negative lens arranged nearer at an image side, than a lens arranged utmost the object side at the second group are lenses having refractive index of 1.7 or more in a zoom optical system of the seventeenth invention. If required functions for correction by an aspherical surface are concentrated on a lens at the object side, and it is constituted by a plastic-mould lens, cost and productivity becomes advantageous. Moreover, cost and productivity also become advantageous, if required functions for raising a refractive index are concentrated on a lens at the image side, and the positive lens and the negative lens at the image side are spherical lenses. Furthermore, it is desired that the positive lens and the negative lens at the image side are formed as a cemented lens. Moreover, if the cemented lens is a spherical lens of glass, a range of selection of refractive index and dispersion can be extended, and correction can make good. The Petzval sum and chromatic aberration which are difficult in correction for a plastic lens can be carried out well. That is, if a plastic lens having an aspherical surface, and a spherical lens of glass having a high refractive index are combined like the present invention, highly efficient and advantageous optical system in cost or processability can be constituted.

In the zoom optical system according to the nineteenth invention, it is desired that the fourth group is constituted with one positive lens in one of the zoom optical system of the second to fourth inventions or the eleventh to eighteenth inventions. It is desired that if the fourth group is constituted with one positive lens, miniaturization such as shortening of optical total length can be achieved.

Especially, in a zoom optical system of the third invention, it is desired that if the fourth group is constituted with one positive lens, it becomes unnecessary to arrange two surfaces by combining individually the two surfaces where the degrees of aspherical surfaces are large, and accordingly an arrangement error does not generate.

In addition to these mentioned above, in a zoom optical system of the present invention, focusing can be carried out only one group of the second group, the third-group, or the fourth group.

It is desired that the first group remains fixed at the time of zooming and focusing.

It is desired that the fourth group remains fixed at the time of zooming.

Moreover, the fourth group is moved or may remain fixed when focusing is carried out.

Further, it is desired that the prism component has only one reflecting surface.

Furthermore, it is desired that if an image pickup apparatus equipped with one zoom optical system according to the present invention is constituted, thinning can be attained fully in the image pickup apparatus, and furthermore, an effect of the zoom optical system which enables to shorten further more the full length of an optical system with a moderate zooming magnification can be acquired.

Hereafter, embodiments of the present invention will be explained using drawings.

Embodiment 1

Figure 1B:
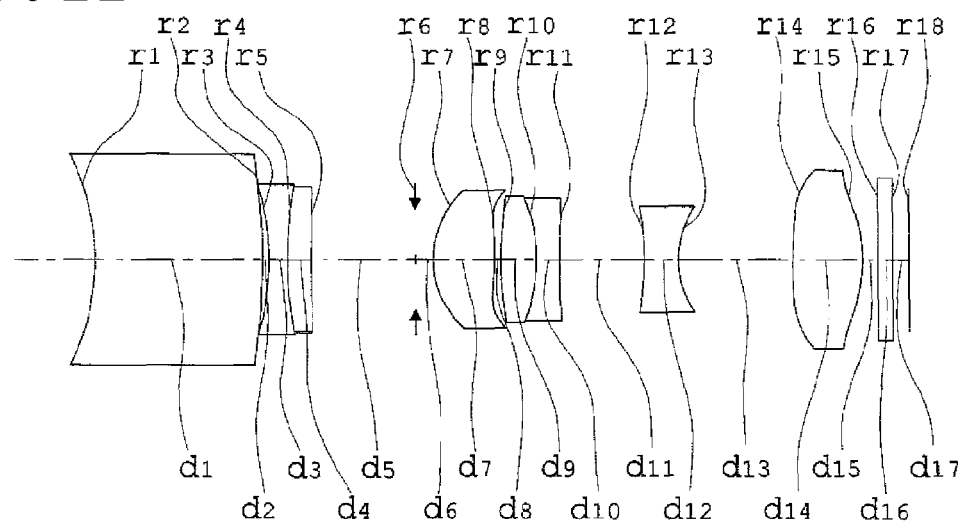
Figure 1C:
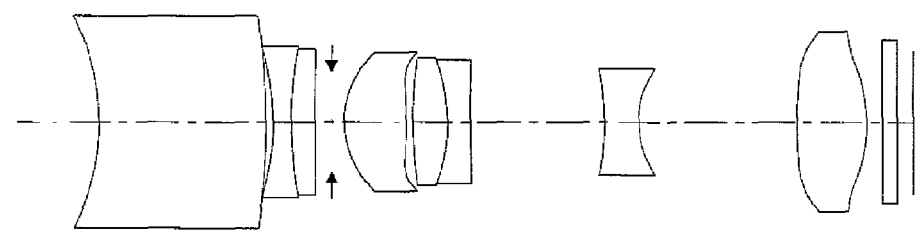

FIG. 1 is a developed view of light path along an optical axis showing an optical arrangement of a zoom of the embodiment 1 according to the present invention, and FIG. 1A shows a state at a wide angle end, FIG. 1B shows a state at a middle angle position and FIG. 1C shows a telephoto end when a photographing distance is infinite, respectively.

FIG. 2 is a diagram showing spherical aberration, astigmatism, distortion, chromatic aberration of magnification, and longitudinal aberration at a specific image height with respect to a zoom optical system of the embodiment 1.

FIGS. 2A-2E, 2F-2J, and 2K-2O show the aberrations at a wide angle end, at a middle angle position and, at a telephoto end, respectively when each photographing distance is infinite.

FIG. 3 is a diagram showing spherical aberration, astigmatism, distortion, chromatic aberration of magnification, and longitudinal aberration at a specific image height with respect to a zoom optical system of the embodiment 1.

FIGS. 3A-3E, 3F-3J, and 3K-3O show the aberrations at a wide angle end, a middle position and a telephoto end, respectively, when each photographing distance is 300 mm as a very close distance.

In FIGS. 2 and 3, IH represents image height.

Figure 18:
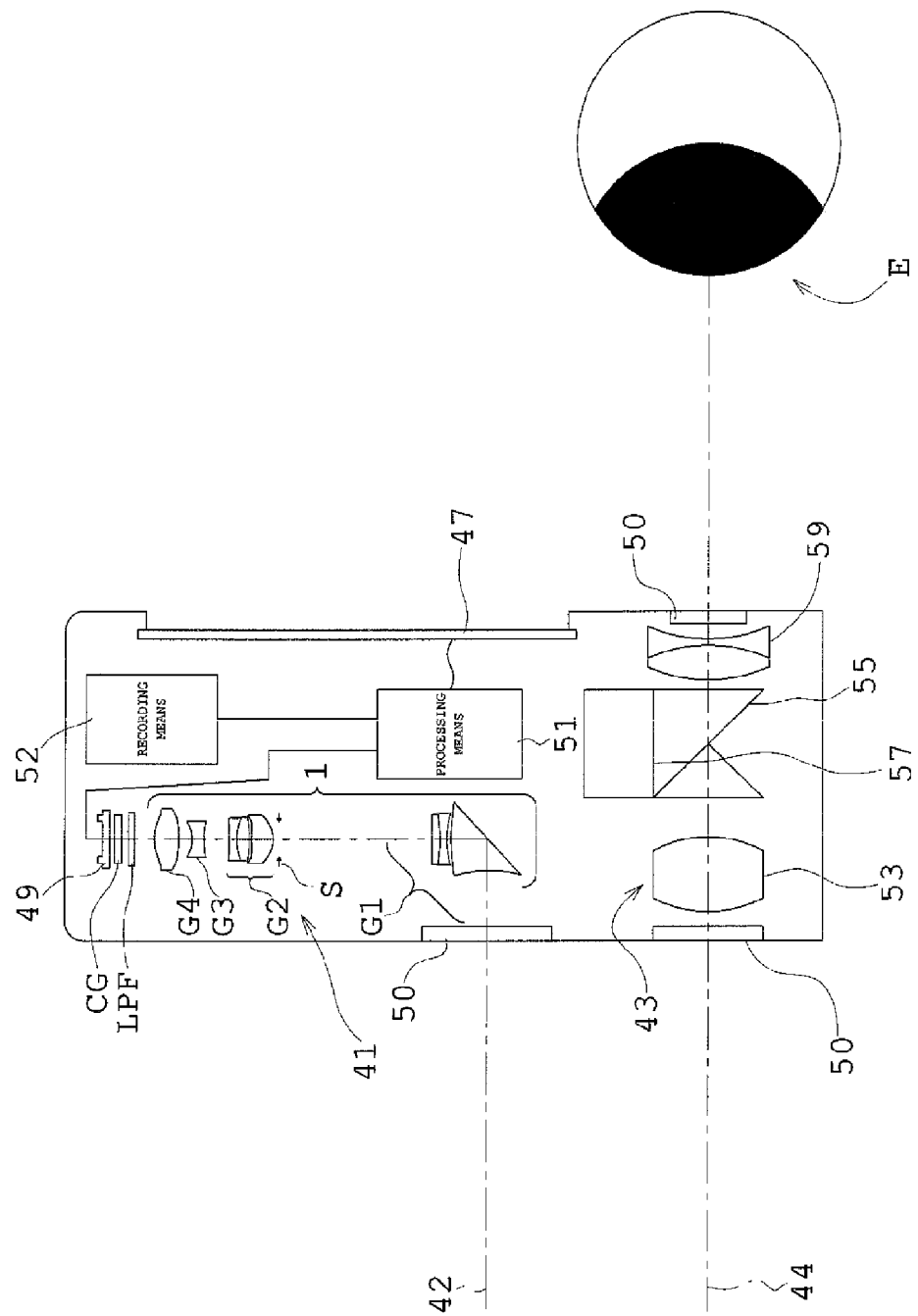
FIG. 18 is an internal block diagram showing the composition of the electronic camera of FIG. 16.
Figure 21:
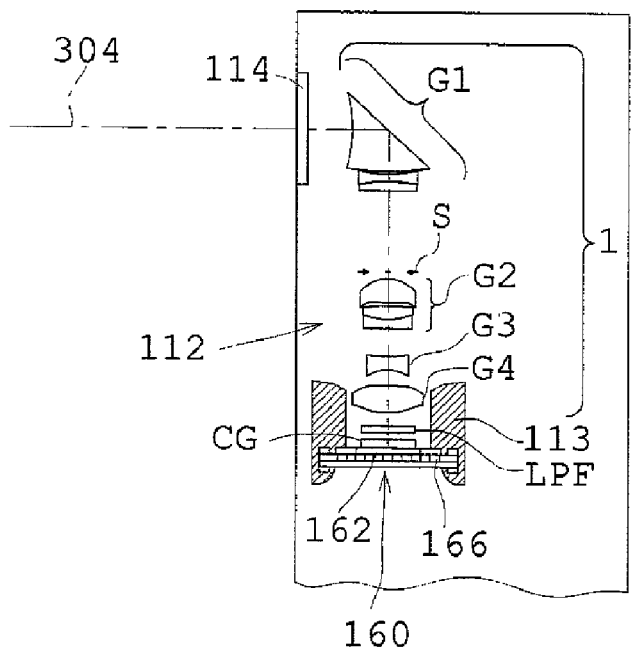
FIG. 21 is a sectional drawing of a photographing optical system incorporated in the personal computer.
Figure 23A:
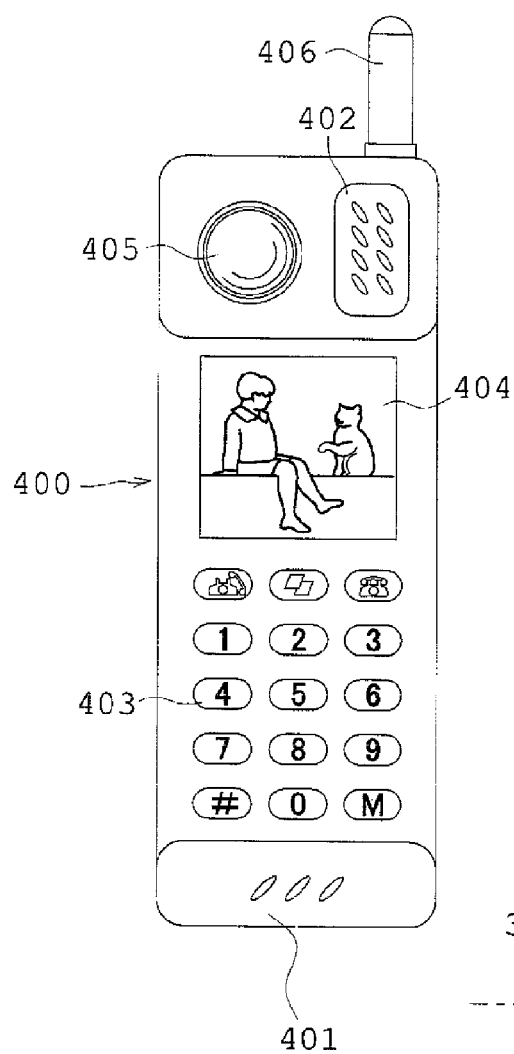
FIGS. 23A, 23B, and 23C are a front elevation, a side elevation, and sectional drawing of a photographing optical system of a cellular phone with which an optical system of the present invention is incorporated as an object optical system, respectively.
Figure 23B:
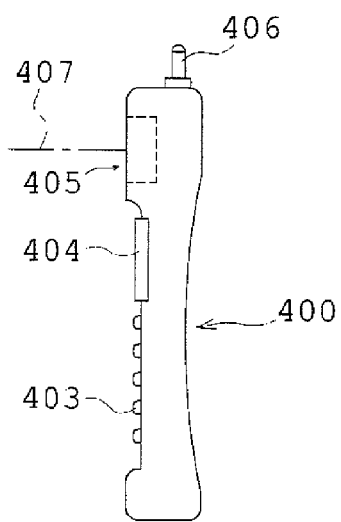
Figure 23C:
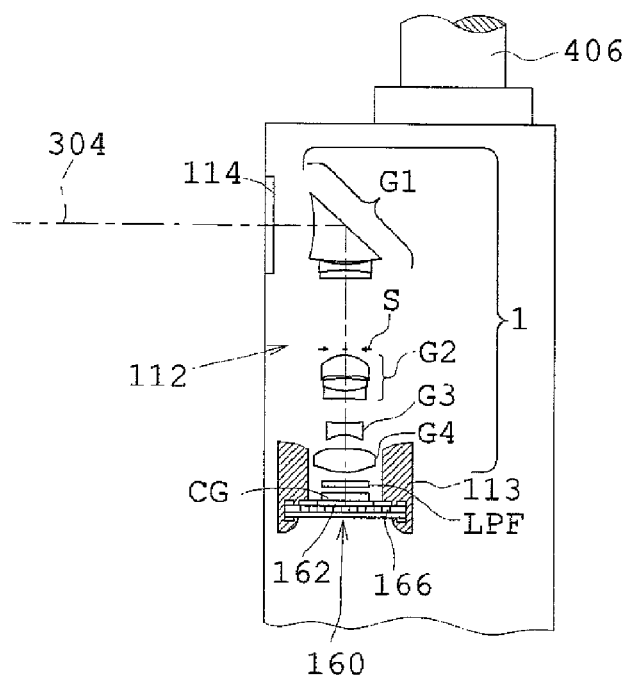

In FIG. 1, for convenience sake, although the prism component is shown by a straight forward transmitting system which does not bend an optical path, it has a reflecting plane where an optical axis is reflected by 90° as shown in FIGS. 18, 21, and 23C.

A zoom optical system 1 of the embodiment 1 comprises a first group G1, a second group G2, a third group G3, and a fourth group G4. In FIG. 1, S is an aperture stop, FL is a parallel plate such as a cover glass of a low pass filter or an electronic image pickup element, an infrared cut filter, and IM is a light receiving surface of an electronic image pickup element. In the present embodiment and other embodiments, the size of the light receiving surface IM and the size of an effective image pickup surface are the same, and the diagonal direction of the surface is shown in the FIGS.

The first group G1 comprises, in an order from the object side, a prism P, and a cemented lens having a double concave lens L11 and a positive meniscus lens L12 having a convex surface directed toward the object side, and it has negative refracting power as a whole. The prism P is arranged at the utmost object side, and it is constituted by comprising an entrance surface P1 having a concave surface directed toward the object side, a reflecting surface (illustration is omitted), and an exit surface P3 having a convex directed toward the image side, and it has negative refracting power as a whole. The entrance surface P1 and the exit surface P3 consist of aspherical surfaces having a form where refracting power becomes weak as each of the surfaces departs from the optical axis. The reflecting surface (illustration is omitted) consists of plane, substantially.

The second group G2 comprises, an aperture-stop S, a lens L21 having a double convex surface on the optical axis, a cemented lens having a double convex lens L22 and a double concave lens L23, and it has negative refracting power as a whole. A lens L21 is formed by a plastic mould, and has an aspherical surface on both sides. The cemented lens of the double convex lens L22 and the double concave lens L23 is formed as a glass spherical surface lens.

The third group G3 consists of single a double concave lens L31. The double concave lens L31 is formed by a plastic mould, and has an aspherical surface on both sides. The fourth group G4 consists of single double convex lens L41 on the optical axis. As for the lens L41, both sides are formed aspherical surfaces (equivalent to the aspherical surfaces a and b in the present invention). The surface at the image side of the lens L41 (equivalent to the aspherical surface b in the present invention) is formed so that it may have the point of inflection and may become a convex surface toward the image side near the optical axis.

When zooming is carried out from a wide angle end to a telephoto end, the first group G1 is fixed, the second group G2 is moved toward the object side so that a distance to the first group G1 may decrease, the third group G3 is moved toward the object side so that an distance to the second group G2 and a distance to the fourth group G4 may increase, respectively, and the fourth group remains fixed. Focusing is carried out by changing an interval between the second group G2 and the third group G3. When focusing which is carried out toward a very near direction from the infinite distance is based, it is constituted so that the second group G2 is moved greatly compared with the third group G3 at the wide angle side, and the third group G3 is moved greatly compared with the second group G2 at the telephoto side. Here, the first group G1 remains fixed at the time of the focusing. Further, the lens system which is constituted by lenses from the cemented lens having the double concave lens L11 in the first group G1 and the positive meniscus lens L12 having the convex surface directed toward the object side to the lens L41 of the fourth group G4 has positive refracting power as a whole.

Numerical data of the zoom optical system of the embodiment 1 are shown below. Here, $r_1, r_2 \ldots$ represent a radius of curvature of each-lens surface, and $d_1, d_2 \ldots$ represent a distance between each lens surface, and na1, na2 ... represent a refracting index of each lens at d ray, $v_{d1}, v_{d2} \ldots$ is Abbe number of each lens at d ray, and Fno is an F number. An aspherical surface is expressed by the following formula (c), where a direction of an optical axis is Z, a direction which intersects perpendicularly to the optical axis is Y, a cone coefficient is k, and an aspherical coefficient is set to $A_4, A_6, A_8$, and $A_{10}$, $$Z=(Y^2/r)/[1+\{1-(1+k)\cdot(Y/r)^2\}^{1/2}]+A_4 y^4+A_6 y^6+A_8 y^8+A_{10} y^{10} \quad (c)$$

Furthermore, in the numerical data, (AP) represents an aspherical surface, (AS) represents an aperture stop, and (IM) represents a light receiving surface of a image pickup element.

These symbols are common in the numerical data of embodiments to be described later.

| Numerical data 1 (Embodiment 1) | | | |
|---|---|---|---|
| $r_1 = -7.3661$ (AP) | $d_1 = 6.00$ | $n_{d1} = 1.52542$ | $v_{d1} = 55.78$ |
| $r_2 = -15.8354$ (AP) | $d_2 = 0.21$ | | |
| $r_3 = -9.8122$ | $d_3 = 0.65$ | $n_{d3} = 1.80400$ | $v_{d3} = 46.57$ |
| $r_4 = 13.8961$ | $d_4 = 0.90$ | $n_{d4} = 1.84666$ | $v_{d4} = 23.78$ |
| $r_5 = 240.4001$ | $d_5 = D5$ | | |
| $r_6 = \infty$ (AS) | $d_6 = 0.65$ | | |
| $r_7 = 4.0914$ (AP) | $d_7 = 2.20$ | $n_{d7} = 1.52542$ | $v_{d7} = 55.78$ |
| $r_8 = -20.7730$ (AP) | $d_8 = 0.25$ | | |
| $r_9 = 17.2752$ | $d_9 = 1.26$ | $n_{d9} = 1.80400$ | $v_{d9} = 46.57$ |
| $r_{10} = -6.6689$ | $d_{10} = 0.82$ | $n_{d10} = 1.84666$ | $v_{d10} = 23.78$ |
| $r_{11} = 51.4108$ | $d_{11} = D11$ | | |
| $r_{12} = -11.0035$ (AP) | $d_{12} = 1.22$ | $n_{d12} = 1.52542$ | $v_{d12} = 55.78$ |
| $r_{13} = 4.0986$ (AP) | $d_{13} = D13$ | | |
| $r_{14} = 27.1190$ (AP) | $d_{14} = 2.57$ | $n_{d14} = 1.52542$ | $v_{d14} = 55.78$ |
| $r_{15} = -3.6438$ (AP) | $d_{15} = 0.54$ | | |
| $r_{16} = \infty$ | $d_{16} = 0.50$ | $n_{d16} = 1.51633$ | $v_{d16} = 64.14$ |
| $r_{17} = \infty$ | $d_{17} = 0.58$ | | |
| $r_{18} = \infty$ (IM) | | | |

| Aspherical coefficient | | | | | |
|---|---|---|---|---|---|
| Surface Number | k | $A_4$ | $A_6$ | $A_8$ | $A_{10}$ |
| 1 | −0.000 | $1.1835 \times 10^{-3}$ | $-4.6222 \times 10^{-5}$ | $3.1110 \times 10^{-6}$ | $-6.7350 \times 10^{-8}$ |
| 2 | −0.000 | $9.5004 \times 10^{-4}$ | $-1.1680 \times 10^{-4}$ | $1.8911 \times 10^{-5}$ | $-7.8809 \times 10^{-7}$ |
| 7 | −0.000 | $7.1998 \times 10^{-4}$ | $1.0941 \times 10^{-4}$ | $2.0647 \times 10^{-5}$ | $2.2314 \times 10^{-6}$ |
| 8 | −0.000 | $3.7583 \times 10^{-3}$ | $6.2853 \times 10^{-4}$ | $-9.8635 \times 10^{-5}$ | $2.6799 \times 10^{-5}$ |
| 12 | −0.000 | $2.5142 \times 10^{-3}$ | $-3.4809 \times 10^{-4}$ | | |
| 13 | −0.000 | $6.7535 \times 10^{-3}$ | $6.0145 \times 10^{-5}$ | $-5.4357 \times 10^{-5}$ | |
| 14 | −0.000 | $1.6783 \times 10^{-3}$ | $1.9069 \times 10^{-4}$ | $-5.6697 \times 10^{-7}$ | |
| 15 | −0.000 | $1.3251 \times 10^{-2}$ | $-9.0528 \times 10^{-4}$ | $6.9564 \times 10^{-5}$ | |

(AP): an aspherical surface
(AS)): an aperture stop
(IM): a light receiving surface of a image pickup element

TABLE 1

| | | Focal distance | | |
|---|---|---|---|---|
| | | 5 | 8.5 | 14.7 |
| | | | Fno | |
| | | 3.1 | 4.3 | 5.7 |
| Photographied distance: infinity | D5 | 7.09 | 3.89 | 0.55 |
| | D11 | 2.69 | 3.05 | 4.81 |
| | D13 | 1.49 | 4.33 | 5.90 |
| Photographied distance: 300 mm | D5 | 7.04 | 3.89 | 0.55 |
| | D11 | 2.74 | 3.13 | 5.01 |
| | D13 | 1.49 | 4.25 | 5.71 |

Embodiment 2

Figure 4A:
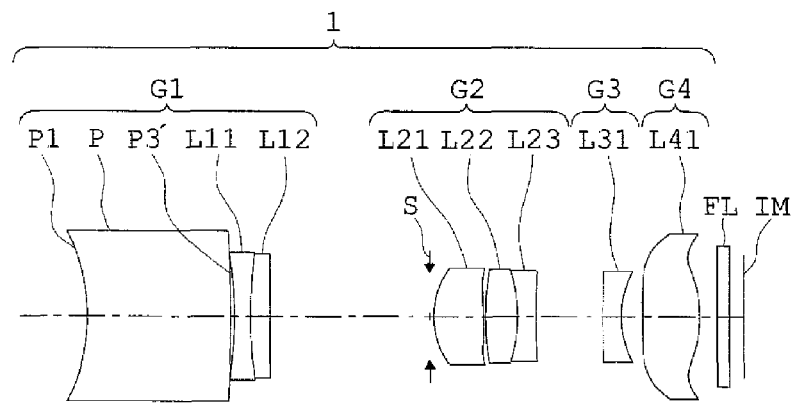
FIGS. 4A, 4B and 4C are developed views of light path along an optical axis showing an optical arrangement of a zoom optical system of the embodiment 2 according to the present invention, and showing states at a wide angle end, a middle position and a telephoto end when a photographing distance is infinite, respectively.
Figure 4B:
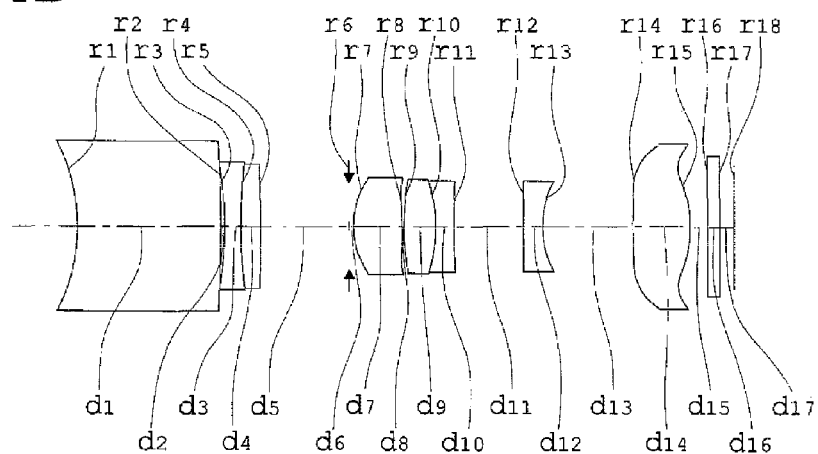
Figure 4C:
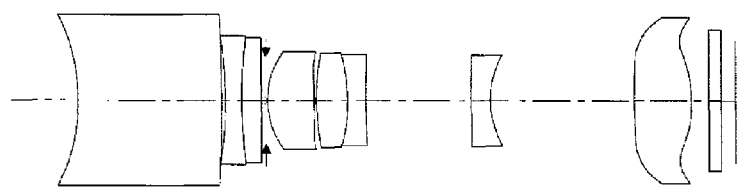

FIG. 4 is a developed view of light path along an optical axis showing an optical arrangement of a zoom optical system of the embodiment 2 according to the present invention, and FIG. 4A shows a state at a wide angle end, FIG. 4B shows a state at a middle angle position and FIG. 4C shows a telephoto end when a photographing distance is infinite, respectively. FIG. 5 is a diagram showing spherical aberration, astigmatism, distortion, chromatic aberration of magnification, and longitudinal aberration at a specific image height with respect to the zoom optical system of the embodiment 2, and FIGS. 5A-5E, 5F-5J, and 5K-5O show the aberrations at a wide angle end, at a middle angle position and, at a telephoto end respectively, when each photographing distance is infinite. FIG. 6 is a diagram showing spherical aberration, astigmatism, distortion, chromatic aberration of magnification, and longitudinal aberration at a specific image height with respect to the zoom optical system of the embodiment 2. FIGS. 6A-6E, 3F-3J, and 3K-3O show the aberrations at a wide angle end, a middle position and a telephoto end, respectively, when each photographing distance is 300 mm as a very close distance. IH is image height in FIGS. 5 and 6. In FIG. 4, for convenience sake, although the prism component is shown by a straight forward transmitting system which does not bend an optical path, it has a reflecting plane where an optical axis is reflected by 90° as shown in FIGS. 18, 21, and 23C The zoom optical system 1 of Embodiment 2 comprises the first group G1, the second group G2, the third group G3, and the fourth group G4. In FIG. 4, S is an aperture stop, FL is a parallel plate such as a cover glass of a low pass filter or an electronic image pickup element, an infrared cut filter, and IM is a light receiving surface of an electronic image pickup element.

The first group G1 comprises, in an order from the object side, a prism P, a cemented lens having a double concave lens L11 and a positive meniscus lens L12 having a convex surface directed toward the object side, and it has negative refracting power as a whole. The prism P is arranged at the utmost object side, and comprises an entrance surface P1 having a concave surface directed toward the object side, a reflecting surface (illustration is omitted), and an exit surface P3' having plane-shape, and it has negative refracting power as a whole. The entrance surface P1 is formed to be an aspherical surface. The reflecting surface (illustration is omitted) is formed to be a plane, substantially.

The second group G2 comprises, an aperture-stop S, a lens L21 having a double convex surface on the optical axis, a cemented lens having a double convex lens L22 and a double concave lens L23, and it has negative refracting power as a whole. A lens L21 is formed by a plastic mould, and has an aspherical surface on both sides. The cemented lens of the double convex lens L22 and the double concave lens L23 is formed as a glass spherical surface lens.

The third group G3 consists of single double concave lens L31. The double concave lens L31 is formed by a plastic mould, and has an aspherical surface on both sides.

The fourth group G4 consists of single double convex lens L41 on the optical axis. As for the lens L41, both sides are formed aspherical surfaces (equivalent to the aspherical surfaces a and b in the present invention). The surface at the image side of the lens L41 (equivalent to the aspherical surface b in the present invention) is formed so that it may have the point of inflection and may become a convex surface toward the image side near the optical axis.

When zooming is carried out from a wide angle end to a telephoto end, the first group G1 is fixed, the second group G2 is moved toward the object side so that a distance to the first group G1 may be narrowed, the third group G3 is moved toward the object side so that an distance to the second group G2 and a distance to the fourth group G4 may increase, respectively, and the fourth group remains fixed. Focusing is carried out by changing an interval between the second group G2 and the third group G3. When focusing which is carried out toward a very near direction from the infinite distance is based, the second group G2 is moved greatly compared with the third group G3 at the wide angle side, and the third group G3 is moved greatly compared with the second group G2 at the telephoto side. Here, the first group G1 remains fixed when focusing is carried out. Further, the lens system which is constituted by lenses from the cemented lens having the double concave lens L11 in the first group G1 and the positive meniscus lens L12 having the convex surface directed toward the object side to the lens L41 of the fourth group G4 has positive refracting power as a whole.

Numerical data of the zoom optical system of the embodiment 2 are shown below.

Numerical data 2 (Embodiment 2)

| | | | |
|---|---|---|---|
| $r_1 = -7.6995$ (AP) | $d_1 = 6.00$ | $n_{d1} = 1.52542$ | $v_{d1} = 55.78$ |
| $r_2 = \infty$ | $d_2 = 0.20$ | | |
| $r_3 = -27.5310$ | $d_3 = 0.65$ | $n_{d3} = 1.80400$ | $v_{d3} = 46.57$ |
| $r_4 = 14.8877$ | $d_4 = 0.86$ | $n_{d4} = 1.84666$ | $v_{d4} = 23.78$ |
| $r_5 = 93.3267$ | $d_5 = D5$ | | |
| $r_6 = \infty$ (AS) | $d_6 = 0.14$ | | |
| $r_7 = 3.9288$ (AP) | $d_7 = 1.99$ | $n_{d7} = 1.52542$ | $v_{d7} = 55.78$ |
| $r_8 = -22.7877$ (AP) | $d_8 = 0.10$ | | |
| $r_9 = 19.5924$ | $d_9 = 1.33$ | $n_{d9} = 1.80400$ | $v_{d9} = 46.57$ |
| $r_{10} = -6.8623$ | $d_{10} = 0.80$ | $n_{d10} = 1.84666$ | $v_{d10} = 23.78$ |
| $r_{11} = 38.1449$ | $d_{11} = D11$ | | |
| $r_{12} = -352.5316$ (AP) | $d_{12} = 0.77$ | $n_{d12} = 1.52542$ | $v_{d12} = 55.78$ |
| $r_{13} = 3.5045$ (AP) | $d_{13} = D13$ | | |

-continued

Numerical data 2 (Embodiment 2)

| | | | |
|---|---|---|---|
| $r_{14} = 69.0396$ (AP) | $d_{14} = 2.50$ | $n_{d14} = 1.52542$ | $v_{d14} = 55.78$ |
| $r_{15} = -3.6244$ (AP) | $d_{15} = 0.80$ | | |
| $r_{16} = \infty$ | $d_{16} = 0.50$ | $n_{d16} = 1.51633$ | $v_{d16} = 64.14$ |
| $r_{17} = \infty$ | $d_{17} = 0.54$ | | |
| $r_{18} = \infty$ (IM) | | | |

Aspherical coefficient

| Surface Number | k | $A_4$ | $A_6$ | $A_8$ | $A_{10}$ |
|---|---|---|---|---|---|
| 1 | −0.000 | $4.2351 \times 10^{-4}$ | $-4.4996 \times 10^{-5}$ | $4.9179 \times 10^{-6}$ | $-1.6629 \times 10^{-7}$ |
| 7 | −0.000 | $9.0647 \times 10^{-4}$ | $2.7807 \times 10^{-4}$ | $4.2152 \times 10^{-6}$ | $7.3690 \times 10^{-6}$ |
| 8 | −0.000 | $4.8399 \times 10^{-3}$ | $6.7470 \times 10^{-4}$ | $-7.9509 \times 10^{-5}$ | $3.9980 \times 10^{-5}$ |
| 12 | −0.000 | $2.3184 \times 10^{-3}$ | $-1.9862 \times 10^{-4}$ | | |
| 13 | −0.000 | $4.6978 \times 10^{-3}$ | $2.4867 \times 10^{-4}$ | $-8.6627 \times 10^{-5}$ | |
| 14 | −0.000 | $4.0769 \times 10^{-3}$ | $1.6742 \times 10^{-4}$ | $2.6227 \times 10^{-6}$ | |
| 15 | −0.000 | $1.5729 \times 10^{-2}$ | $-9.8093 \times 10^{-4}$ | $9.4002 \times 10^{-5}$ | |

TABLE 2

| | | Focal distance | | |
|---|---|---|---|---|
| | | 5 | 8.2 | 14.9 |
| | | | Fno | |
| | | 3.1 | 4.3 | 6 |
| Photographied distance: infinity | D5 | 6.99 | 3.95 | 0.20 |
| | D11 | 2.85 | 2.86 | 4.44 |
| | D13 | 0.97 | 3.99 | 6.16 |
| Photographied distance: 300 mm | D5 | 6.93 | 3.95 | 0.20 |
| | D11 | 2.91 | 2.97 | 4.69 |
| | D13 | 0.97 | 3.89 | 5.91 |

Embodiment 3

Figure 7A:
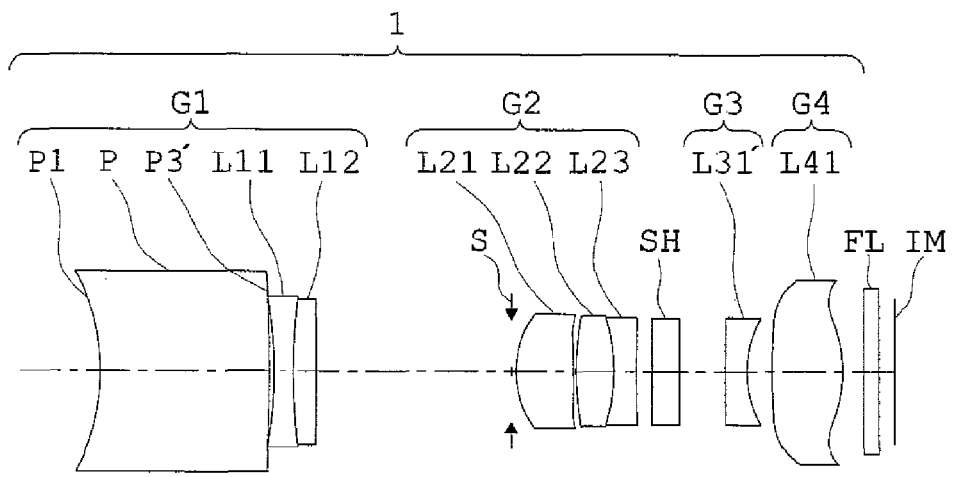
FIGS. 7A, 7B and 7C are developed views of light path along an optical axis showing an optical arrangement of a zoom optical system of the embodiment 3 according to the present invention, and showing states at a wide angle end, a middle position and a telephoto end when a photographing distance is infinite, respectively.
Figure 7B:
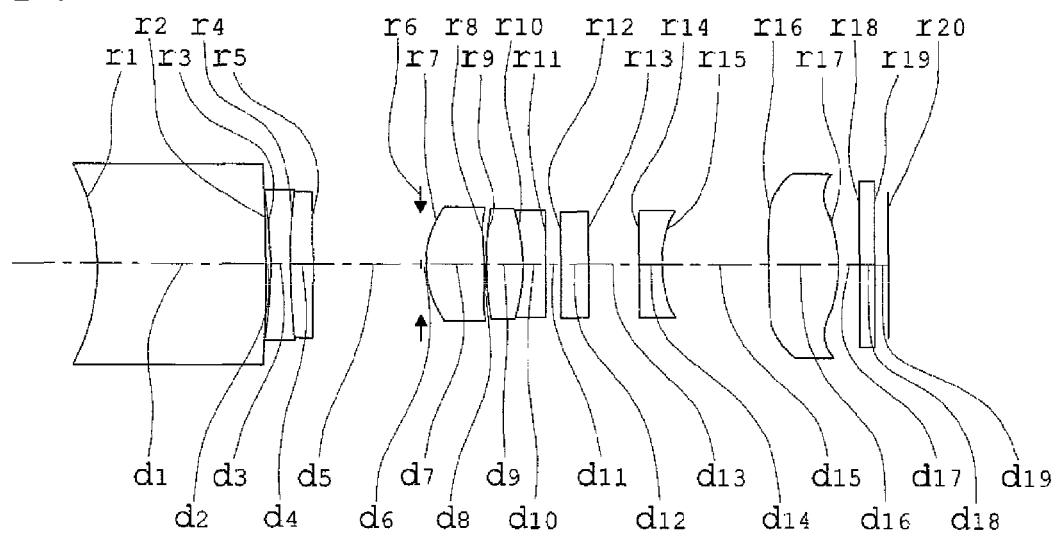
Figure 7C:
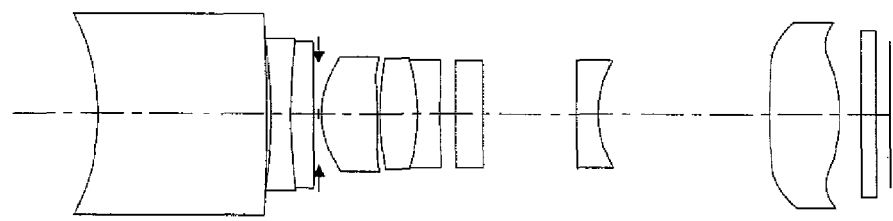

FIG. 7 is a developed view of light path along an optical axis showing an optical arrangement of a zoom optical system of the embodiment 3 according to the present invention, and FIG. 7A shows a state at a wide angle end, FIG. 7B shows a state at a middle angle position and FIG. 7C shows a telephoto end when a photographing distance is infinite, respectively. FIG. 5 is a diagram showing spherical aberration, astigmatism, distortion, chromatic aberration of magnification, and longitudinal aberration at a specific image height with respect to the zoom optical system of the embodiment 2, and FIGS. 8A-8E, 8F-8J, and 8K-8O show the aberrations at a wide angle end, at a middle angle position and, at a telephoto end respectively, when each photographing distance is infinite. FIG. 9 is a diagram showing spherical aberration, astigmatism, distortion, chromatic aberration of magnification, and longitudinal aberration at a specific image height with respect to the zoom optical system of the embodiment 2. FIGS. 9A-9E, 9F-9J, and 9K-9O show the aberrations at a wide angle end, a middle position and a telephoto end, respectively, when each photographing distance is 300 mm as a very close distance. IH is image height in FIGS. 8 and 9. In FIG. 7, for convenience sake, although the prism component is shown by a straight forward transmitting system which does not bend an optical path, it has a reflecting plane where an optical axis is reflected by 90° as shown in FIGS. 18, 21, and 23C.

The zoom optical system 1 of embodiment 3 comprises the first group G1, the second group G2, the third group G3, and the fourth group G4. In FIG. 7, S is an aperture stop, FL is a parallel plate such as a cover glass of a low pass filter or an electronic image pickup element, an infrared cut filter, and IM is a light receiving surface of an electronic image pickup element.

The first group G1 comprises, in order from the object side, a prism P, a cemented lens having a double concave lens L11 and a positive meniscus lens L12 having a convex surface directed toward the object side, and it has negative refracting power as a whole. The prism P is arranged at the utmost object side, and it is constituted by comprising an entrance surface P1 having a concave surface directed toward the object side, a reflecting surface (illustration is omitted), and an exit surface P3' having a plane-shape, and it has negative refracting power as a whole. The entrance surface P1 is formed to be an aspherical surface. The reflecting surface (illustration is omitted) consists of plane, substantially.

The second group G2 comprises, an aperture-stop S, a lens L21 having a double convex surface on the optical axis, a cemented lens having a double convex lens L22 and a double concave lens L23, and it has negative refracting power as a whole. A lens L21 is formed by a plastic mould, and both surfaces are aspherical. The cemented lens of the double convex lens L22 and the double concave lens L23 is formed as a glass spherical surface lens.

The third group G3 consists of single negative meniscus lens L31' having a convex surface directed toward the object side. The negative meniscus lens L31' is formed by a plastic mould, and the both surfaces are formed to be aspherical surfaces.

In the zoom optical system 1 of embodiment 3, between a lens surface at the image side in the second group G2 and a lens surface at utmost object side in the third group, a well-known liquid crystal shutter is arranged as a light quantity adjustment mechanism SH (in FIG. 7, an illustration is omitted). As a light quantity adjustment mechanism SH, it is possible to use a liquid crystal shutter in which a liquid crystal changes transmission of light electrically as shown in the present embodiment etc., a mechanical shutter mechanism, a mechanism in which a ND filter can be inserted and can be pulled out, or other mechanism combined them mentioned above.

The fourth group G4 consists of single double convex lens L41 on the optical axis. As for the lens L41, both sides are formed aspherical surfaces (equivalent to the aspherical surfaces a and b in the present invention). The surface at the image side of the lens L41 (equivalent to the aspherical surface b in the present invention) is formed so that it may have the point of inflection and may become a convex surface toward the image side near the optical axis.

When zooming is carried out from a wide angle end to a telephoto end, the first group G1 is fixed, the second group G2 is moved toward the object side so that a distance to the first group G1 may decrease, the third group G3 is moved toward the object side so that an distance to the second group G2 and a distance to the fourth group G4 may increase, respectively, and the fourth group remains fixed. Focusing is carried out by changing an interval between the second group G2 and the third group G3. When focusing which is carried out toward a very near direction from the infinite distance is based, the second group G2 is moved greatly compared with the third group G3 at the wide angle side, and the third group G3 is moved greatly compared with the second group G2 at the telephoto side. Here, the first group G1 remains fixed when focusing is carried out. Further, the lens system which is constituted by lenses from the cemented lens having the double concave lens L11 and the double concave lens L12 to the lens L41 of the fourth group G4 has positive refracting power as a whole.

Numerical data of the zoom optical system of the embodiment 3 are shown below.

TABLE 3-continued

| | | Focal distance | | |
|---|---|---|---|---|
| | | 5 | 8.2 | 14.9 |
| | | | Fno | |
| | | 3.1 | 4.3 | 6 |
| Photographied distance 300 mm | D5 | 6.92 | 3.95 | 0.20 |
| | D13 | 1.75 | 1.81 | 3.54 |
| | D15 | 0.95 | 3.86 | 5.89 |

Embodiment 4

Figure 10A:
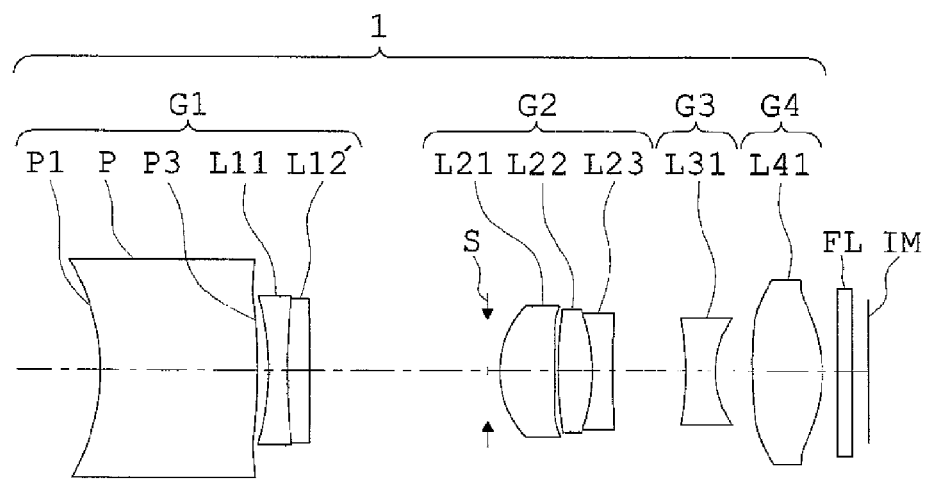
FIGS. 10A, 10B and 10C are developed views of light path along an optical axis showing an optical arrangement of a zoom optical system of the embodiment 4 according to the present invention, and showing states at a wide angle end, a middle angle position and a telephoto end when a photographing distance is infinite, respectively.
Figure 10B:
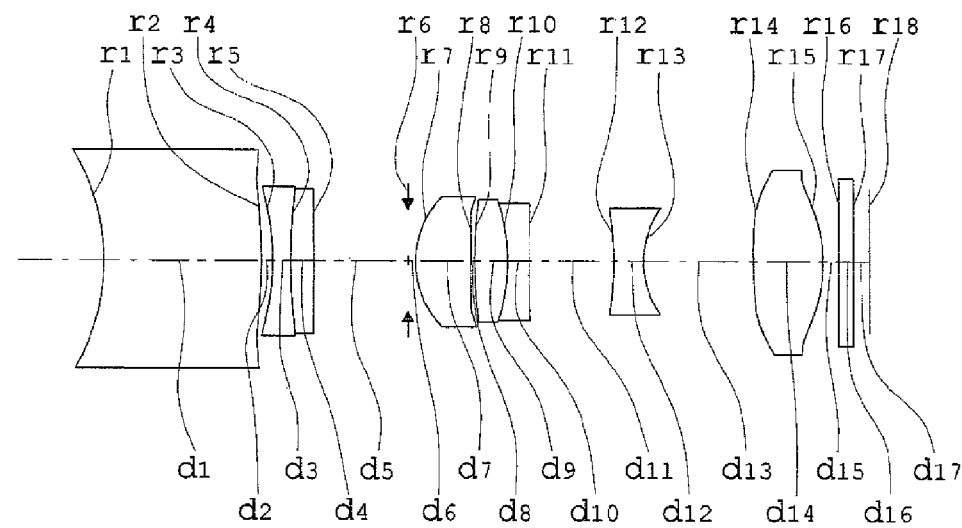
Figure 10C:
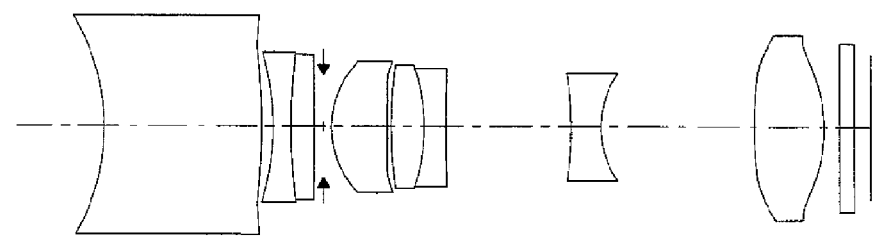

FIG. 10 is a developed view of light path along an optical axis showing an optical arrangement of a zoom of the embodiment 1 according to the present invention, and FIG. 10A shows a state at a wide angle end, FIG. 1B shows a state at a middle angle position and FIG. 1C shows a telephoto end when a photographing distance is infinite, respectively. FIG. 11 is a diagram showing spherical aberration, astigmatism, distortion, chromatic aberration of magnification, and longi- Numerical data 3 (Embodiment 3)

| $r_1 = -7.7334$ (AP) | $d_1 = 6.00$ | $n_{d1} = 1.52542$ | $v_{d1} = 55.78$ |
|---|---|---|---|
| $r_2 = \infty$ | $d_2 = 0.20$ | | |
| $r_3 = -26.6932$ | $d_3 = 0.65$ | $n_{d3} = 1.80400$ | $v_{d3} = 46.57$ |
| $r_4 = 14.5085$ | $d_4 = 0.87$ | $n_{d4} = 1.84666$ | $v_{d4} = 23.78$ |
| $r_5 = 99.8567$ | $d_5 = D5$ | | |
| $r_6 = \infty$ (AS) | $d_6 = 0.14$ | | |
| $r_7 = 3.9235$ (AP) | $d_7 = 1.99$ | $n_{d7} = 1.52542$ | $v_{d7} = 55.78$ |
| $r_8 = -22.8668$ (AP) | $d_8 = 0.10$ | | |
| $r_9 = 19.6534$ | $d_9 = 1.33$ | $n_{d9} = 1.80400$ | $v_{d9} = 46.57$ |
| $r_{10} = -6.8845$ | $d_{10} = 0.80$ | $n_{d10} = 1.84666$ | $v_{d10} = 23.78$ |
| $r_{11} = 37.8553$ | $d_{11} = 0.50$ | | |
| $r_{12} = \infty$ | $d_{12} = 1.00$ | $n_{d12} = 1.51633$ | $v_{d12} = 64.14$ |
| $r_{13} = \infty$ | $d_{13} = D13$ | | |
| $r_{14} = 949.9402$ (AP) | $d_{14} = 0.77$ | $n_{d14} = 1.52542$ | $v_{d14} = 55.78$ |
| $r_{15} = 3.4651$ (AP) | $d_{15} = D15$ | | |
| $r_{16} = 97.7468$ (AP) | $d_{16} = 2.53$ | $n_{d16} = 1.52542$ | $v_{d16} = 55.78$ |
| $r_{17} = -3.5526$ | $d_{17} = 0.80$ | | |
| $r_{18} = \infty$ | $d_{18} = 0.50$ | $n_{d18} = 1.51633$ | $v_{d18} = 64.14$ |
| $r_{19} = \infty$ | $d_{19} = 0.55$ | | |
| $r_{20} = \infty$ (IM) | | | |

Aspherical coefficient

| Surface Number | k | $A_4$ | $A_6$ | $A_8$ | $A_{10}$ |
|---|---|---|---|---|---|
| 1 | −0.000 | $3.3769 \times 10^{-4}$ | $-2.4237 \times 10^{-5}$ | $3.1079 \times 10^{-6}$ | $-1.0918 \times 10^{-7}$ |
| 7 | −0.000 | $1.0092 \times 10^{-3}$ | $3.2198 \times 10^{-4}$ | $-8.5427 \times 10^{-6}$ | $9.1174 \times 10^{-6}$ |
| 8 | −0.000 | $4.9588 \times 10^{-3}$ | $7.7360 \times 10^{-4}$ | $-1.1630 \times 10^{-4}$ | $4.7068 \times 10^{-5}$ |
| 14 | −0.000 | $1.5126 \times 10^{-3}$ | $-1.5107 \times 10^{-4}$ | | |
| 15 | −0.000 | $3.5741 \times 10^{-3}$ | $2.4750 \times 10^{-4}$ | $-8.7786 \times 10^{-5}$ | |
| 16 | −0.000 | $3.6318 \times 10^{-3}$ | $2.3999 \times 10^{-4}$ | $-2.0159 \times 10^{-6}$ | |
| 17 | −0.000 | $1.5224 \times 10^{-2}$ | $-8.5997 \times 10^{-4}$ | $8.8017 \times 10^{-5}$ | |

TABLE 3

| | | Focal distance | | |
|---|---|---|---|---|
| | | 5 | 8.2 | 14.9 |
| | | | Fno | |
| | | 3.1 | 4.3 | 6 |
| Photographied distance: infinity | D5 | 6.99 | 3.95 | 0.20 |
| | D13 | 1.69 | 1.70 | 3.28 |
| | D15 | 0.95 | 3.97 | 6.14 | tudinal aberration at a specific image height with respect to a zoom optical system of the embodiment 1, and FIGS. 11A-11E, 11F-11J, and 11K-11O show the aberrations at a wide angle end, at a middle angle position and, at a telephoto end respectively, when each photographing distance is infinite. FIG. 12 is a diagram showing spherical aberration, astigmatism, distortion, chromatic aberration of magnification, and longitudinal aberration at a specific image height with respect to a zoom optical system of the embodiment 4, and FIGS. 12A-12E, 11F-12J, and 12K-12O show the aberrations at a wide angle end, a middle position and a telephoto end, respectively, when each photographing distance is 300 mm as a very close distance. IH is image height in FIGS. 11 and 12. In FIG. 10, for convenience sake, although the prism component is shown by a straight forward transmitting system which does not bend an optical path, it has a reflecting plane where an optical axis is reflected by 90° as shown in FIGS. 18, 21, and 23C.

The zoom optical system 1 of embodiment 4 comprises the first group G1, the second group G2, the third group G3, and the fourth group G4. In FIG. 10, S is an aperture stop, FL is a parallel plate such as a cover glass of a low pass filter or an electronic image pickup element, an infrared cut filter, and IM is a light receiving surface of an electronic image pickup element.

The first group G1 comprises, in an order from the object side, a prism P, a cemented lens having a double concave lens L11 and a double convex lens L12', and it has negative refracting power as a whole. The prism P is arranged at the utmost object side, and comprises an entrance surface P1 having a concave surface directed toward the object side, a reflecting surface (illustration is omitted), and an exit surface P3 having a convex surface directed toward the image side on the optical axis, and it has negative refracting power as a whole. The entrance surface P1 and the exit surface P3 consist of aspherical surfaces having a form where refracting power becomes weak as each of the surfaces departs from the optical axis. The reflecting surface (illustration is omitted) consists of plane, substantially.

The second group G2 comprises, an aperture-stop S, a lens L21 having a double convex surface on the optical axis, a cemented lens having a double convex lens L22 and a double concave lens L23, and it has negative refracting power as a whole. A lens L21 is formed by a plastic mould, and has an aspherical surface on both sides. The cemented lens of the double convex lens L22 and the double concave lens L23 is formed as a glass spherical surface lens.

The third group G3 consists of single a double concave lens L31. The double concave lens L31 is formed by a plastic mould, and has an aspherical surface on both sides. The fourth group G4 consists of single double convex lens L41 on the optical axis. As for the lens L41, both sides are formed aspherical surfaces (equivalent to the aspherical surfaces a and b in the present invention). The surface at the image side of the lens L41 (equivalent to the aspherical surface b in the present invention) is formed so that it may have the point of inflection and may become a convex surface toward the image side near the optical axis.

When zooming is carried out from a wide angle end to a telephoto end, the first group G1 is fixed, the second group G2 is moved toward the object side so that a distance to the first group G1 may decrease, the third group G3 is moved toward the object side so that an distance to the second group G2 and a distance to the fourth group G4 may increase, respectively, and the fourth group remains fixed. Focusing is carried out by changing an interval between the second group G2 and the third group G3. When focusing which is carried out toward a very near direction from the infinite distance is based, the second group G2 is moved greatly compared with the third group G3 at the wide angle side, and the third group G3 is moved greatly compared with the second group G2 at the telephoto end. Here, the first group G1 remains fixed when focusing is carried out. Further, the lens system which is constituted by lenses from the cemented lens having the double concave lens L11 and the double concave lens L12' to the lens L41 of the fourth group G4 has positive refracting power as a whole.

Numerical data of the zoom optical system of the embodiment 4 are shown below.

Numerical data 4 (Embodiment 4)

| | | | |
|---|---|---|---|
| $r_1 = -7.2950$ (AP) | $d_1 = 6.00$ | $n_{d1} = 1.52542$ | $v_{d1} = 55.78$ |
| $r_2 = -16.7915$ (AP) | $d_2 = 0.36$ | | |
| $r_3 = -9.7309$ | $d_3 = 0.66$ | $n_{d3} = 1.80400$ | $v_{d3} = 46.57$ |
| $r_4 = 13.5503$ | $d_4 = 0.95$ | $n_{d4} = 1.84666$ | $v_{d4} = 23.78$ |
| $r_5 = -1219.4911$ | $d_5 = D5$ | | |
| $r_6 = \infty$ (AS) | $d_6 = 0.30$ | | |
| $r_7 = 4.0499$ (AP) | $d_7 = 2.06$ | $n_{d7} = 1.52542$ | $v_{d7} = 55.78$ |
| $r_8 = -21.5703$ (AP) | $d_8 = 0.12$ | | |
| $r_9 = 16.6160$ | $d_9 = 1.25$ | $n_{d9} = 1.80400$ | $v_{d9} = 46.57$ |
| $r_{10} = -6.3712$ | $d_{10} = 0.80$ | $n_{d10} = 1.84666$ | $v_{d10} = 23.78$ |
| $r_{11} = 77.1776$ | $d_{11} = D11$ | | |
| $r_{12} = -10.6390$ (AP) | $d_{12} = 1.07$ | $n_{d12} = 1.52542$ | $v_{d12} = 55.78$ |
| $r_{13} = 3.9135$ (AP) | $d_{13} = D13$ | | |
| $r_{14} = 20.8952$ (AP) | $d_{14} = 2.55$ | $n_{d14} = 1.52542$ | $v_{d14} = 55.78$ |
| $r_{15} = -3.7887$ (AP) | $d_{15} = 0.59$ | | |
| $r_{16} = \infty$ | $d_{16} = 0.50$ | $n_{d16} = 1.51633$ | $v_{d16} = 64.14$ |
| $r_{17} = \infty$ | $d_{17} = 0.60$ | | |
| $r_{18} = \infty$ (IM) | | | |

Aspherical coefficient

| Surface Number | k | $A_4$ | $A_6$ | $A_8$ | $A_{10}$ |
|---|---|---|---|---|---|
| 1 | −0.000 | $1.2734 \times 10^{-3}$ | $-3.7071 \times 10^{-5}$ | $1.5959 \times 10^{-6}$ | $-1.1269 \times 10^{-8}$ |
| 2 | −0.000 | $1.0379 \times 10^{-3}$ | $-1.0413 \times 10^{-4}$ | $1.5254 \times 10^{-5}$ | $-4.8660 \times 10^{-7}$ |
| 7 | −0.000 | $9.9710 \times 10^{-4}$ | $1.3954 \times 10^{-4}$ | $1.9959 \times 10^{-5}$ | $3.3621 \times 10^{-6}$ |
| 8 | −0.000 | $4.3607 \times 10^{-3}$ | $4.3558 \times 10^{-4}$ | $-2.1370 \times 10^{-5}$ | $2.1064 \times 10^{-5}$ |
| 12 | −0.000 | $4.6291 \times 10^{-3}$ | $-1.1680 \times 10^{-3}$ | | |
| 13 | −0.000 | $9.0463 \times 10^{-3}$ | $-6.8653 \times 10^{-4}$ | $-8.7660 \times 10^{-5}$ | |
| 14 | −0.000 | $2.5318 \times 10^{-3}$ | $-9.3395 \times 10^{-5}$ | $1.6074 \times 10^{-5}$ | $-2.1482 \times 10^{-7}$ |
| 15 | −0.000 | $1.3685 \times 10^{-2}$ | $-1.2063 \times 10^{-3}$ | $-7.7094 \times 10^{-5}$ | |

TABLE 4

|  |  | Focal distance | | |
| --- | --- | --- | --- | --- |
|  |  | 5 | 8.5 | 14.7 |
|  |  |  | Fno |  |
|  |  | 3.1 | 4.3 | 5.7 |
| Photographied distance: infinity | D5 | 6.72 | 3.56 | 0.32 |
|  | D11 | 2.71 | 3.07 | 4.75 |
|  | D13 | 1.43 | 4.23 | 5.79 |
| Photographied distance 300 mm | D5 | 6.68 | 3.56 | 0.32 |
|  | D11 | 2.76 | 3.15 | 4.94 |
|  | D13 | 1.43 | 4.14 | 5.60 |

Embodiment 5

Figure 13A:
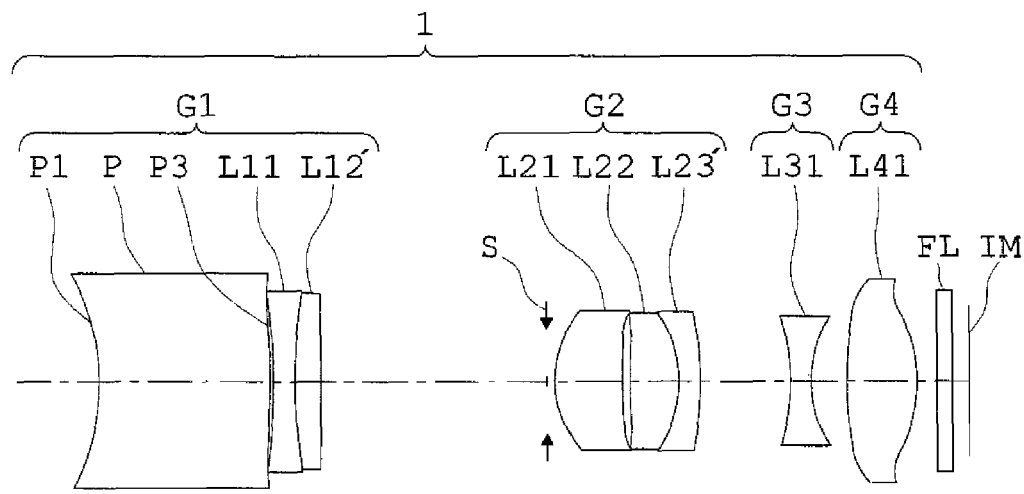
FIGS. 13A, 13B and 13C are developed views of light path along an optical axis showing an optical arrangement of a zoom optical system of the embodiment 5 according to the present invention, and showing states at a wide angle end, a middle angle position and a telephoto end when a photographing distance is infinite, respectively.
Figure 13B:
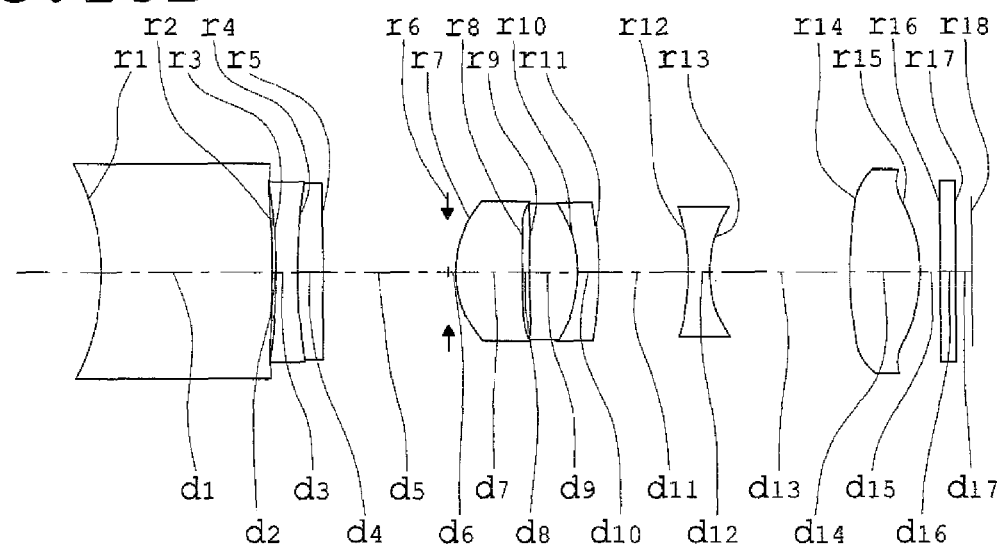
Figure 13C:
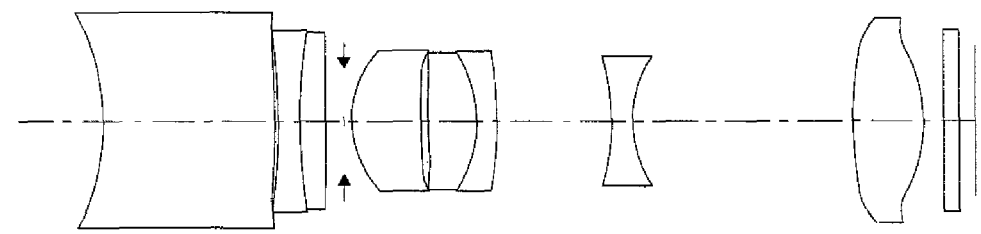

FIG. 13 is a developed view of light path along an optical axis showing an optical arrangement of a zoom of the embodiment 5 according to the present invention, and FIG. 13A shows a state at a wide angle end, FIG. 13B shows a state at a middle angle position and FIG. 13C shows a telephoto end when a photographing distance is infinite, respectively. FIG. 14 is a diagram showing spherical aberration, astigmatism, distortion, chromatic aberration of magnification, and longitudinal aberration at a specific image height with respect to a zoom optical system of the embodiment 5, and FIGS. 14A-14E, 14F-14J, and 14K-14O show the aberrations at a wide angle end, at a middle angle position and, at a telephoto end respectively, when each photographing distance is infinite. FIG. 15 is a diagram showing spherical aberration, astigmatism, distortion, chromatic aberration of magnification, and longitudinal aberration at a specific image height with respect to a zoom optical system of the embodiment 5, and FIGS. 15A-15E, 15F-15J, and 15K-15O show the aberrations at a wide angle end, a middle position and a telephoto end respectively, when each photographing distance is 300 mm as a very close distance. IH is image height in FIGS. 14 and 15. In FIG. 13, for convenience sake, although the prism component is shown by a straight forward transmitting system which does not bend an optical path, it has a reflecting plane where an optical axis is reflected by 90° as shown in FIGS. 18, 21, and 23C.

The zoom optical system 1 of embodiment 5 comprises the first group G1, the second group G2, the third group G3, and the fourth group G4. In FIG. 13, S is an aperture stop, FL is a parallel plate such as a cover glass of a low pass filter or an electronic image pickup element, an infrared cut filter, and IM is a light receiving surface of an electronic image pickup element.

The first group G1 comprises, in an order from the object side, a prism P, a cemented lens having a double concave lens L11 and a double convex lens L12', and it has negative refracting power as a whole. The prism P is arranged at the utmost object side, and it is constituted by comprising an entrance surface P1 having a concave surface directed toward the object side, a reflecting surface (illustration is omitted), and an exit surface P3 having a convex directed toward the image side, and The entrance surface P1 and the exit surface P3 consist of aspherical surfaces having a form where refracting power becomes weak as each of the surfaces departs from the optical axis. The reflecting surface (illustration is omitted) consists of plane, substantially.

The second group G2 comprises, an aperture-stop S, a lens L21 having a double convex surface on the optical axis, a cemented lens having a double convex lens L22 and a negative meniscus lens L23' having a concave surface directed toward the object side, and it has negative refracting power as a whole. A lens L21 is formed by a plastic mould, and has an aspherical surface on both sides. The cemented lens of the double convex lens L22 and the negative meniscus lens L23' having a concave surface directed to the object side, is formed as a glass spherical surface lens.

The third group G3 consists of single a double concave lens L31. The double concave lens L31 is formed by a plastic mould, and has an aspherical surface at the object side.

The fourth group G4 consists of single double convex lens L41 on the optical axis. As for the lens L41, both sides are formed aspherical surfaces (equivalent to the aspherical surfaces a and b in the present invention). The surface at the image side of the lens L41 (equivalent to the aspherical surface b in the present invention) is formed so that it may have the point of inflection and may become a convex surface toward the image side near the optical axis.

When zooming is carried out from a wide angle end to a telephoto end, the first group G1 remains fixed, the second group G2 is moved toward the object side so that a distance to the first group G1 may decrease, the third group G3 is moved toward the object side so that an distance to the second group G2 and a distance to the fourth group G4 may increase, respectively, and the fourth group remains fixed. Focusing is carried out by changing an interval between the second group G2 and the third group G3. When focusing which is carried out toward a very near direction from the infinite distance is based, the second group G2 is moved greatly compared with the third group G3 at the wide angle side, and the third group G3 is moved greatly compared with the second group G2 at the telephoto end. Here, the first group G1 remains fixed when focusing is carried out.

Further, the lens system which is constituted by lenses from the cemented lens having the double concave lens L11 and the double convex lens L12' of the first group to the lens L41 of the fourth group G4 has positive refracting power as a whole.

Numerical data of the image forming optical system of the embodiment 5 are shown below.

Numerical data 5 (Embodiment 5)

| | | | |
| --- | --- | --- | --- |
| $r_1 = -8.4605$ (AP) | $d_1 = 6.00$ | $n_{d1} = 1.80400$ | $v_{d1} = 46.57$ |
| $r_2 = -58.9999$ (AP) | $d_2 = 0.13$ | | |
| $r_3 = -25.1357$ | $d_3 = 0.65$ | $n_{d3} = 1.80400$ | $v_{d3} = 46.57$ |
| $r_4 = 16.4035$ | $d_4 = 0.94$ | $n_{d4} = 1.84666$ | $v_{d4} = 23.78$ |
| $r_5 = -276.3763$ | $d_5 = D5$ | | |
| $r_6 = \infty$ (AS) | $d_6 = 0.23$ | | |
| $r_7 = 4.2908$ (AP) | $d_7 = 2.33$ | $n_{d7} = 1.52542$ | $v_{d7} = 55.78$ |
| $r_8 = 769.3655$ (AP) | $d_8 = 0.26$ | | |
| $r_9 = 35.3764$ | $d_9 = 1.66$ | $n_{d9} = 1.80400$ | $v_{d9} = 46.57$ |
| $r_{10} = -4.5478$ | $d_{10} = 0.65$ | $n_{d10} = 1.84666$ | $v_{d10} = 23.78$ |
| $r_{11} = -18.0677$ | $d_{11} = D11$ | | |

-continued

Numerical data 5 (Embodiment 5)

| $r_{12} = -10.8542$ (AP) | $d_{12} = 0.72$ | $n_{d12} = 1.52542$ | $v_{d12} = 55.78$ |
|---|---|---|---|
| $r_{13} = 3.9342$ | $d_{13} = D13$ | | |
| $r_{14} = 16.8714$ (AP) | $d_{14} = 2.52$ | $n_{d14} = 1.52542$ | $v_{d14} = 55.78$ |
| $r_{15} = -3.9902$ (AP) | $d_{15} = 0.67$ | | |
| $r_{16} = \infty$ | $d_{16} = 0.50$ | $n_{d16} = 1.51633$ | $v_{d16} = 64.14$ |
| $r_{17} = \infty$ | $d_{17} = 0.55$ | | |
| $r_{18} = \infty$ (IM) | | | |

Aspherical coefficient

| Surface Number | k | $A_4$ | $A_6$ | $A_8$ | $A_{10}$ | $A_{12}$ |
|---|---|---|---|---|---|---|
| 1 | −0.000 | $3.1854 \times 10^{-4}$ | $8.1624 \times 10^{-6}$ | $-2.7758 \times 10^{-7}$ | $1.3649 \times 10^{-8}$ | |
| 2 | −0.000 | $1.6895 \times 10^{-4}$ | $1.0091 \times 10^{-5}$ | | | |
| 7 | −0.000 | $4.8122 \times 10^{-4}$ | $5.9923 \times 10^{-5}$ | $1.7634 \times 10^{-5}$ | $7.4884 \times 10^{-8}$ | |
| 8 | −0.000 | $3.5049 \times 10^{-3}$ | $1.9473 \times 10^{-4}$ | $2.5412 \times 10^{-5}$ | $3.8429 \times 10^{-6}$ | |
| 12 | −0.000 | $-9.5269 \times 10^{-4}$ | $1.1024 \times 10^{-5}$ | | | |
| 14 | −0.000 | $-6.5298 \times 10^{-4}$ | $1.9493 \times 10^{-4}$ | $1.3236 \times 10^{-6}$ | | |
| 15 | −0.000 | $8.1885 \times 10^{-3}$ | $-7.2053 \times 10^{-4}$ | $-1.0516 \times 10^{-4}$ | $-5.8514 \times 10^{-6}$ | $1.7832 \times 10^{-7}$ |

TABLE 5

| | | Focal distance | | |
|---|---|---|---|---|
| | | 5 | 8.6 | 14.9 |
| | | | Fno | |
| | | 3.1 | 4.4 | 5.9 |
| Photographed distance: infinity | D5 | 7.99 | 4.41 | 0.58 |
| | D11 | 3.10 | 3.17 | 4.26 |
| | D13 | 1.35 | 4.87 | 7.60 |
| Photographed distance 300 mm | D5 | 7.95 | 4.41 | 0.58 |
| | D11 | 3.15 | 3.25 | 4.43 |
| | D13 | 1.35 | 4.79 | 7.44 |

Next, values corresponding to numerical parameters of the conditions in each embodiment are shown.

TABLE 6

Values of conditions in each of the embodiments

| conditions | embodiment 1 | embodiment 2 | embodiment 3 | embodiment 4 | embodiment 5 |
|---|---|---|---|---|---|
| (1) 1.4 < G23W/G34W < 3 | 1.81 | 2.94 | 1.78 | 1.90 | 2.30 |
| (2) 0.4 < G23T/G34T < 1.5 | 0.82 | 0.67 | 0.53 | 0.82 | 0.56 |
| (3) 0.08 < (ha11 − ha07)/I < 0.3 | 0.135 | 0.179 | 0.171 | 0.129 | 0.102 |
| (4) −0.1 < ha07/I < 0.07 | 0.038 | 0.035 | 0.031 | 0.046 | 0.041 |
| (5) 0.45 < Cb/I < 1 | 0.743 | 0.575 | 0.589 | 0.857 | 0.807 |
| (6) −4 < rp1/I < −1.8 | −2.63 | −2.75 | −2.76 | −2.61 | −3.02 |
| (7) 8 < L/I < 12 | 10.57 | 10.00 | 10.13 | 10.23 | 10.79 |
| (8) 2.5 < M/I < 7 | 3.91 | 4.28 | 4.28 | 3.84 | 4.88 |
| (9) −0.55 < φP · fw < 0 | −0.15 | −0.34 | −0.34 | −0.16 | −0.39 |
| (10) −1 < (rp1 − rp2)/(rp1 + rp2) < −0.2 | −0.36 | −1 | −1 | −0.39 | −0.75 |

In the zoom optical system of the embodiment 1 to the embodiment 6, it is possible to carry out focusing by moving only one of groups of the second group G2, the third group G3, and the fourth group G4. Moreover, the fourth group G4 may be moved or may be fixed when focusing is carried out.

The electronic image pickup apparatus using the optical zoom optical system of the present invention such as that mentioned above can be used in the photographing apparatus in which the image of the object is formed by the image forming system, such as a zoom optical system, and is received by the image pickup element, such as a CCD, to take a photograph, notably in a digital camera or a video camera, a personal computer which is an example of an information processing apparatus, or a telephone, especially a mobile phone that is handy to carry. The embodiments of such apparatuses are shown below.

Figure 16:
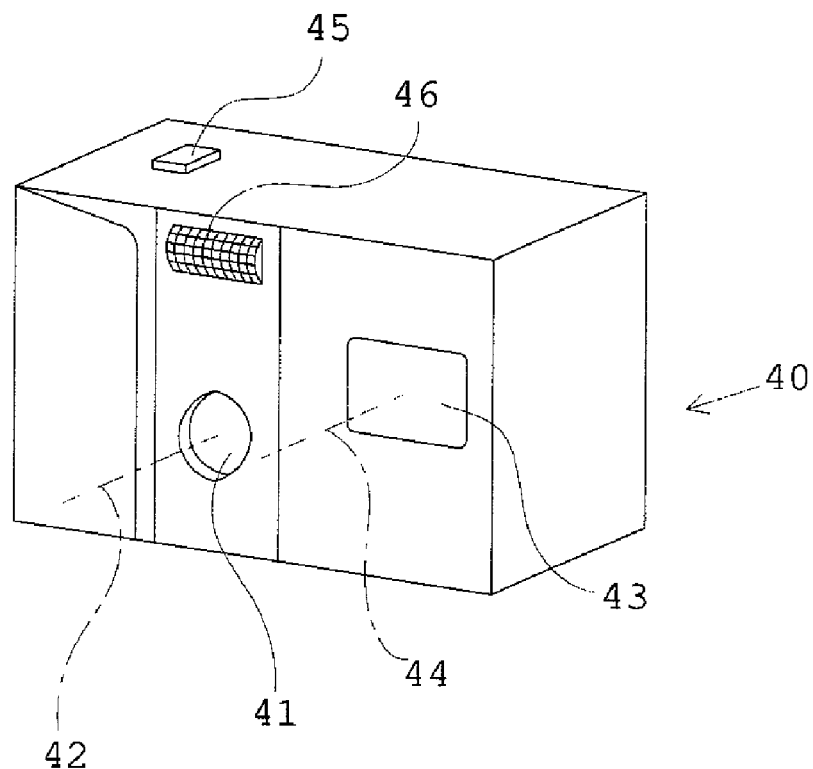
FIG. 16 is a front perspective diagram showing the outside view of an electronic camera using the optical system of the present invention.
Figure 17:
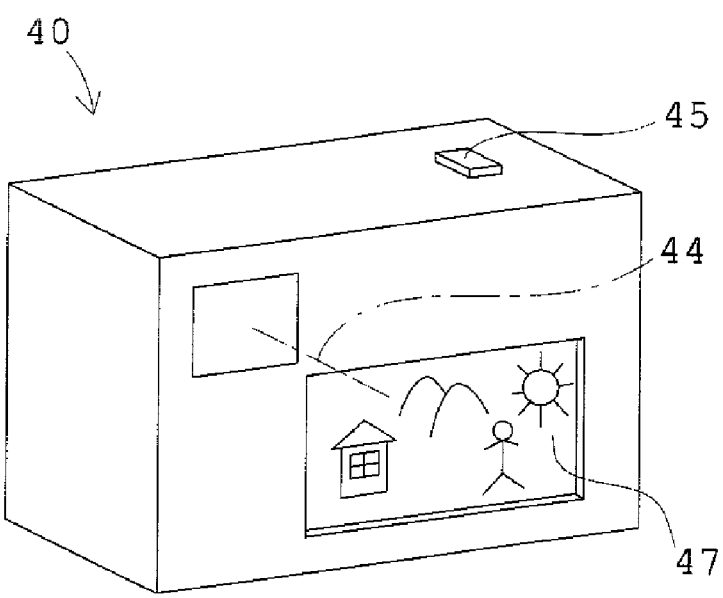
FIG. 17 is a back perspective diagram of the electronic camera of FIG. 16.

FIGS. 16 to 18, are conceptual diagrams of composition in which the zoom optical system of the present invention is incorporated in the photographing optical system 41 of the digital camera 40. FIG. 16 is a front perspective diagram showing the outside view of the digital camera 40, FIG. 17 is a back perspective diagram of the same, and FIG. 18 is an internal block diagram showing the composition of the digital camera 40. The digital camera shown in FIG. 18 is constructed so that an image pickup optical path is bent along the major side of a finder, and an observer's eye is viewed from the upper side.

An electronic camera 40, in this example, includes a photographing optical system 41 constructed as in the embodiment 1 of the present invention, having a photographing optical path 42; a finder optical system 43 having a finder optical path 44; a shutter button 45; a flash lamp 46; and a liquid crystal display monitor 47. When the shutter button 45 provided on the upper portion of the camera 40 is pushed, photographing is carried out through, for example, the light path bending optical system of the embodiment 1 which constitutes the photographing optical system 41 in association with the shutter button 45. An object image produced by the photographing optical system 41 is formed on an image pickup surface of CCD 49 through filter LPF such as the low-pass filter and the infrared cutoff filter and the like and a cover glass CG.

The object image received by the CCD 49 is displayed as an electronic image on the liquid crystal display monitor 47 provided on the backside of the camera through a processing means 51. A recording means 52 is connected to the processing means 51, where a photographed electronic image can be recorded. Also, the recording means may be provided independently from the processing means 51, or may be constructed so that the image is electronically recorded and written by a flexible disk, a memory card, MO and the like. The camera may be constructed as a film camera using a silver halide film instead of the CCD 49.

Further, a finder objective optical system 53 is arranged on the finder optical path 44. An object image produced on an image pickup plane 42 of the finder objective optical system 53 is formed on a field frame 57 through a Porro prism 55 that is an image erecting member. Behind the Porro prism 55 is arranged an eye-piece optical system 59 which introduces an erect image into an observer's eye E. Cover members 50 are arranged at the entrance sides of the photographing optical system 41 and the finder objective optical system 53 and the exit side of the eyepiece optical system 59 respectively.

The digital camera 40 constituted in this way has an effect in thinning of a camera by having bent a light path to the direction of long side. Furthermore, since the photographing optical system 41 has a high variable magnification ratio and it is a bright zoom lens optical system in which aberrations are favorably corrected and a large back-focus space for filter and the like can be arranged, high performance and function can be realized, and miniaturization and low cost production can be realized since the photographing optical system 41 can be constituted with small numbers of optical elements.

Also, the digital camera 40 of the present embodiment may be constructed so that the image pickup optical path is bent along the minor side of the finder. In this example of FIG. 18, the plane-parallel plate is arranged as cover component 50. Here, without preparing a cover component, a surface arranged at the utmost object side in the optical system of the present invention can be used also as a cover component. In this example, a surface at the utmost object side is used as an entrance surface of the first group G1.

Figure 19:
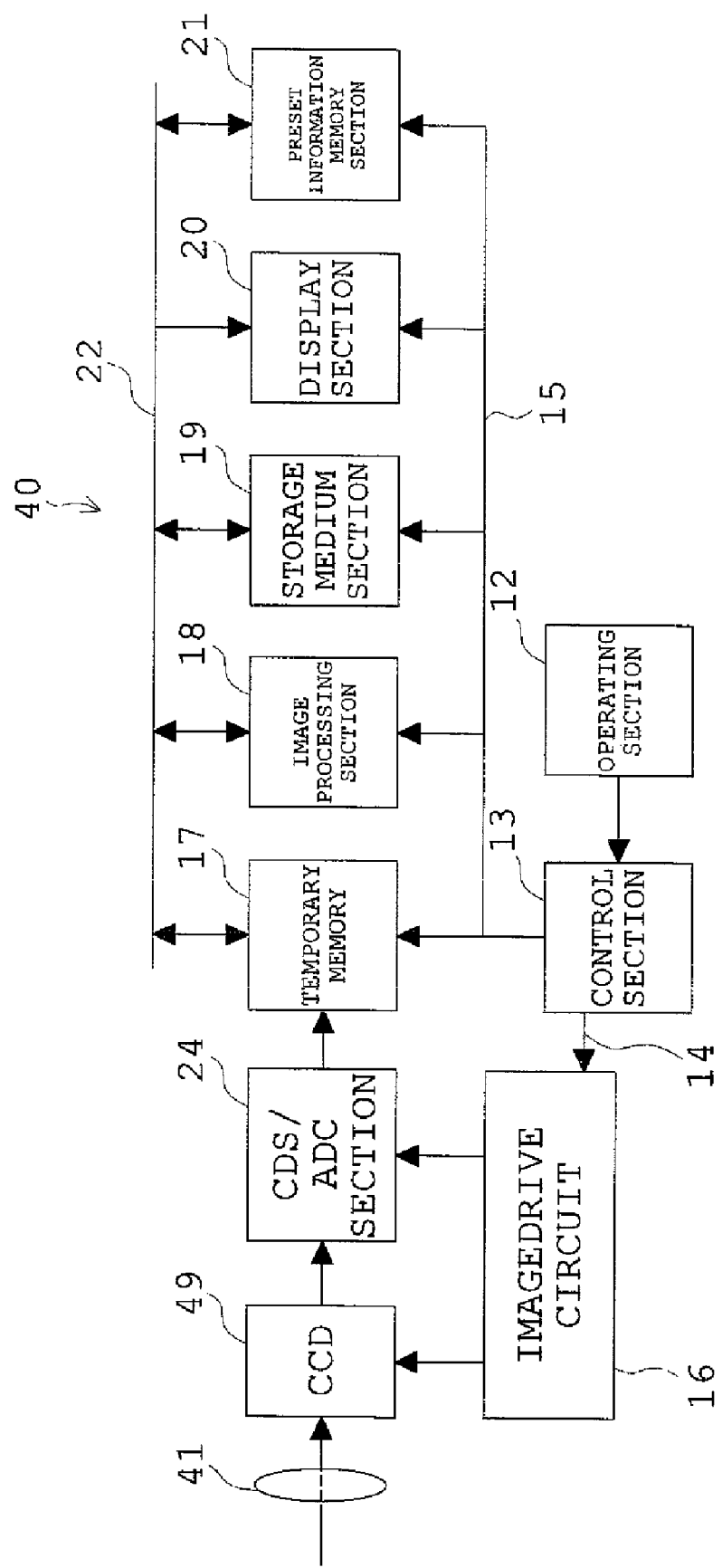
FIG. 19 is a block diagram showing a circuit composition for controlling each part in an embodiment of the electronic camera.

FIG. 19 shows the configuration of the internal circuit of essential sections of the digital camera 40. In the following description, the processing means 51 includes, for example, a CDS/ADC section 24, a temporary memory 17, and an image processing section 18, and the recording means 52 includes, for example, a storage medium section 19 and the like.

The digital camera 40', as shown in FIG. 19, has an operating section 12; a control section 13 connected to the operating section 12; and an image drive circuit 16, the temporary memory 17, the image processing section 18, the storage medium section 19, a display section 20, and a preset information memory section 21, connected to control signal output ports of the control section 13 through busses 14 and 15. The temporary memory 17, the image processing section 18, the storage medium section 19, the display section 20, and the preset information memory section 21 are constructed so that data are mutually input or output through a bus 22. A CCD 49 and the CDS/ADC section 24 are connected to the image drive circuit 16.

The operating section 12 is a circuit provided with various input buttons and switches and transmitting event information input from the exterior (a camera user) through these input buttons and switches to the control section 13. The control section 13 is a circuit that is a central arithmetical processing unit including, for example, a CPU, and incorporates a program memory, not shown, to control the whole of the digital camera 40 by receiving instructions input from the camera user through the operating section 12 in accordance with a program housed in the program memory.

The CCD 49 is an image pickup element that is drive-controlled by the image drive circuit 16 and converts the amount of light of each pixel of the object image into an electric signal to output the signal to the CDS/ADC section 24.

The CDS/ADC section 24 is a circuit that amplifies the electric signal input from the CCD 49 and carries out an analog/digital conversion to output image raw data (Bayer data, hereinafter called RAW data) according to only such amplification and digital conversion to the temporary memory 17.

The temporary memory 17 is a memory device that is a buffer including, for example, SDRAM and temporarily stores the RAW data output from the CDS/ADC section 24.

The image processing section 18 is a circuit that reads out the RAW data stored in the temporary memory 17 or the storage medium section 19 to electrically process various images, together with correction for coma, in accordance with image-quality parameters designated by the control section 13.

The storage medium section 19 is a control circuit of a device that removably mounts a card or stick recording medium including, for example, a flash memory and records and holds the RAW data transferred from the temporary memory 17 and image data processed by the image processing section 18 in the card or stick flash memory.

The display section 20 is a circuit that is provided with the liquid crystal display monitor 47 to display an image and an operation menu on the liquid crystal display monitor 47. The preset information memory section 21 is provided with a ROM previously incorporating various image-quality parameters and a RAM storing an image-quality parameter selected by the input operation of the operating section 12 from among image-quality parameters read out from the ROM. The preset information memory section 21 is a circuit for controlling the input into and output from to these memories.

Figure 20:
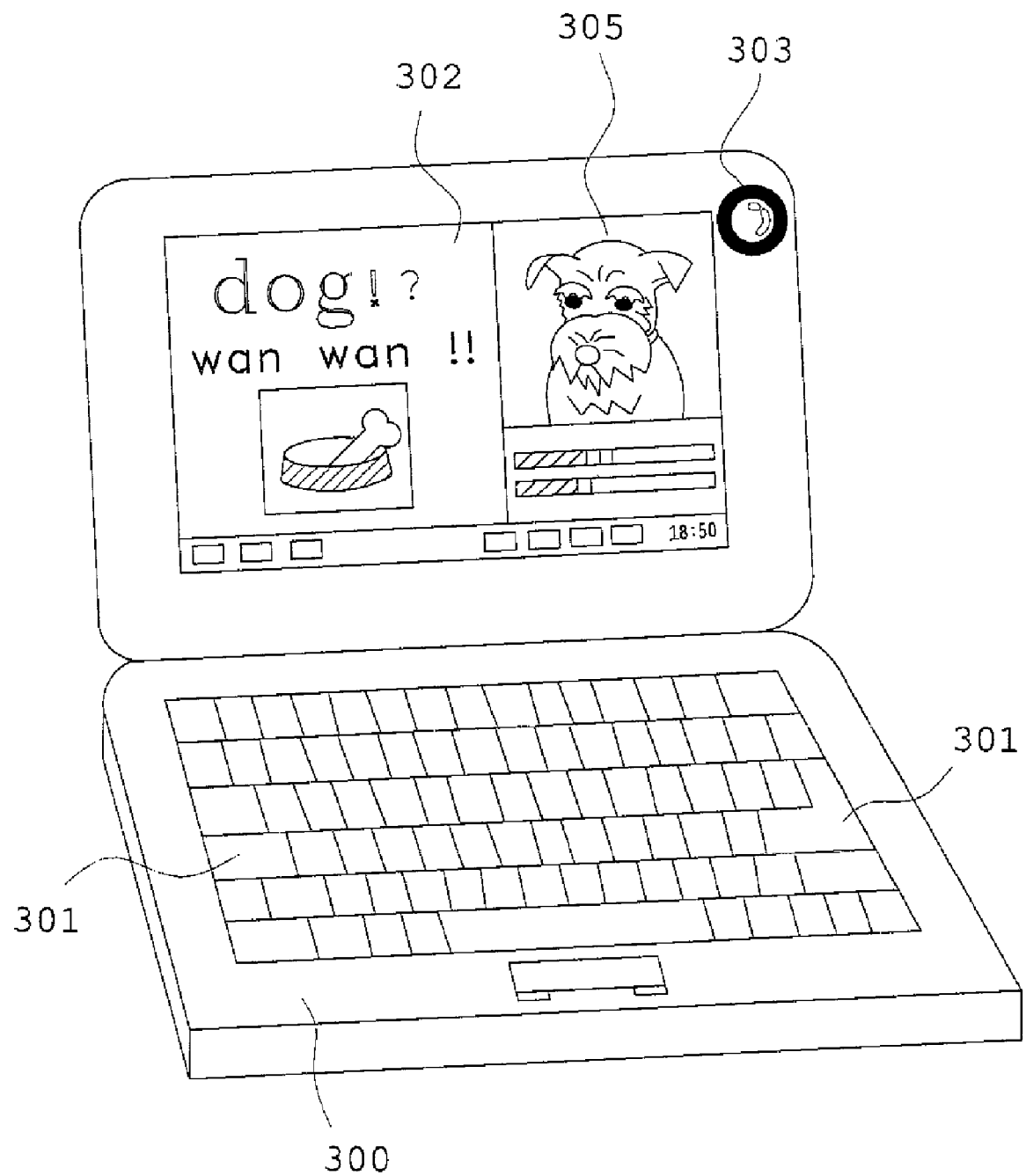
FIG. 20 is a front perspective diagram of the personal computer in which an optical system of the present invention is incorporated as an objective optical system, where the cover is opened.
Figure 22:
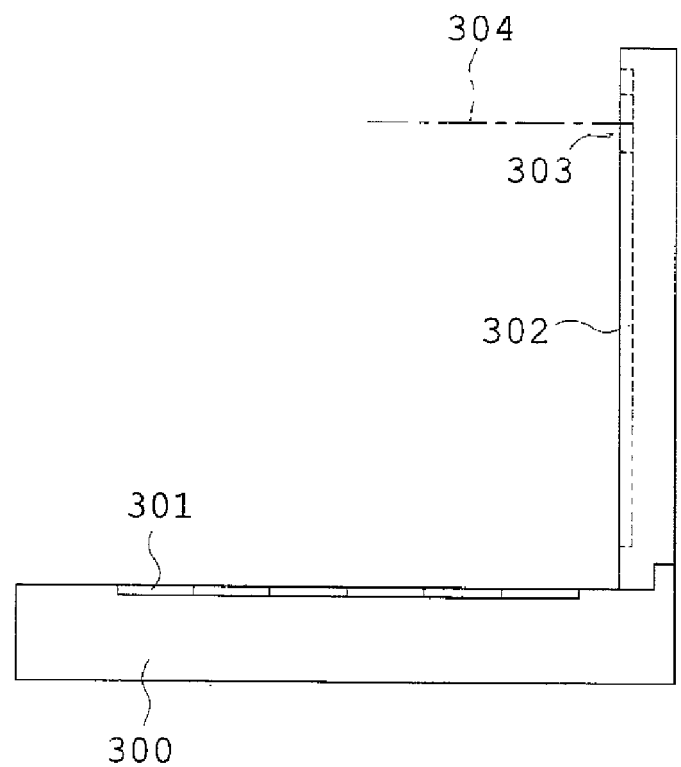
FIG. 22 is a side elevation of FIG. 20.

Subsequently, a personal computer that is an example of an information processing apparatus incorporating the path bending zoom optical system of the present invention as an objective optical system is illustrated in FIGS. 20-22. FIG. 20 is a front perspective diagram in which a cover of the personal computer 300 is opened, FIG. 21 is a sectional drawing of a photographing optical system 303 incorporated in the personal computer 300, and FIG. 22 is a side elevation of FIG. 20.

A personal computer 300, as shown in FIGS. 20-22, has a keyboard 301 provided for the purpose that an operator inputs information from the exterior, an information processing means or a recording means, (illustration not shown), a monitor 302 displaying information for the operator, and a photographing optical system 303 for photographing the operator himself or surrounding images. Here, the monitor 302 may be a transmission-type liquid crystal display element illuminated with backlight, (illustration not shown), from the back side, a reflection-type liquid crystal display element reflecting light from the front for display, or a CRT display.

In FIG. 20, the photographing optical system 303 is housed in the monitor 302 upper-right, but it is not limited to this place and may be arranged at any place, such as the periphery of the monitor 302 or of the keyboard 301. The photographing optical system 303 has an objective lens 112 including the path-bending zoom optical system, for example, of the embodiment 1 according to the present invention and an image pickup element chip 162 receiving an image, arranged on a photographing optical path 304. These are housed in the personal computer 300.

Here, the cover glass CG is additionally cemented to the image pickup element chip 162 and they are integrally constructed as an image pickup unit 160. Since the image pickup unit 160 is fitted into the rear end of a lens frame 113 of the object lens 112 and can be mounted in a single operation, the alignment of the objective lens 112 and the chip 162 and the adjustment of face-to-face spacing are not required and assembly is simplified. At the top (illustration not shown) of the lens frame 113, a cover glass 114 for protecting the objective lens 112 is placed. Also, the driving mechanism of the zoom optical system in the lens frame 113 is omitted from the figure.

An object image received by the image pickup element chip 162 is input into the processing means of the personal computer 300 through a terminal 166 and is displayed as an electronic image on the monitor 302. In FIG. 20, an image 305 photographed by the operator is shown as an example. It is also possible to display the image 305 on the personal computer of a communication mate lying at a remote place through the processing means and the internet or the telephone.

Subsequently, a telephone that is an example of an information processing apparatus incorporating the zoom optical system of the present invention as a photographing optical system, especially, a cellular phone which is convenient for carring is illustrated in FIG. 23. FIG. 23A is a front view of the cellular phone 400, FIG. 23B is a side view of the same, and FIG. 23C is a sectional drawing of a photographing optical system 405.

A mobile phone 400, as shown in FIG. 23, includes a microphone section 401 inputting an operator's voice as information; a speaker section 402 outputting the voice of a communication mate; input dials 403 that an operator inputs information; a monitor 404 displaying information, such as the photographed image of the operator himself or of the communication mate and telephone numbers; a photographing optical system 405; an antenna 406 transmitting and receiving communication waves; and a processing means (illustration not shown) processing image information, communication information, and input signals.

Here, the monitor 404 is a liquid-crystal-display element. Arrangement and position of each composition are not restricted to only these shown in the figures. This photographing optical system 405 has the objective lens 112 which is arranged on the photographing optical path 407 and consists of the light path bending zoom optical system 1 and the image pickup element chip 162 for receiving light of the object image of the embodiment 1 according to the present invention. These are built in the cellular phone 400.

Here, the cover glass CG is additionally cemented to the imaging element chip 162 and they are integrally constructed as the image pickup unit 160. Since the image pickup unit 160 is fitted into the rear end of the lens frame 113 of the objective lens 112 and can be mounted in a single operation, the alignment of the objective lens 112 and the chip 162 and the adjustment of face-to-face spacing are not required and assembly is simplified. At the top (illustration not shown) of the lens frame 113, the cover glass 114 for protecting the objective lens 112 is placed. Also, the driving mechanism of the zoom optical system in the lens frame 113 is omitted from the figure.

An object image received by the image pickup element chip 162 is input into the processing means, not shown, through the terminal 166 and is displayed as an electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. A zoom optical system comprising, in order from an object side:
    a first group having negative refracting power;
    a second group having positive refracting power;
    a third group having negative refracting power; and
    a fourth group having positive refracting power;
    wherein the first group comprises a prism component arranged on an utmost object side and comprising an entrance surface having a concave surface directed toward the object side, a reflecting surface and an exit surface; and
    wherein the second group comprises an aperture stop;
    wherein, when zooming is carried out from a wide angle end to a telephoto end, the second group and the third group are moved toward the object side respectively, an interval between the first group and the second group decreases, and an interval between the second group and the third group and an interval between the third group and the fourth group increase respectively; and
    wherein the following conditions (1) and (2) are satisfied:

$$1.4 < G23W/G34W < 3 \quad (1)$$

$$0.4 < G23T/G34T < 1.5 \quad (2)$$

where G23W is an interval between the second group and the third group at the wide angle end, G34W is an interval between the third group and the fourth group at the wide angle end, G23T is an interval between the second group and the third group at the telephoto end, and G34T is an interval between the third group and the fourth group at the telephoto end.

2. A zoom optical system comprising, in order from an object side:
    a first group having negative refracting power;
    a second group having positive refracting power;
    a third group having negative refracting power; and
    a fourth group having positive refracting power;
    wherein the first group comprises a prism component arranged on an utmost object side and comprising an entrance surface having a concave surface directed toward the object side, a reflecting surface and an exit surface;
    wherein the second group comprises an aperture stop;
    wherein, when zooming is carried out from a wide angle end to a telephoto end, the second group and the third group are moved toward the object side respectively, an interval between the first group and the second group decreases, and an interval between the second group and the third group and an interval between the third group and the fourth group increase respectively; and
    wherein focusing is carried out by changing the interval between the second group and the third group in such a manner that the second group mainly works in view of a movement amount ratio of the second group to the third group in focusing from infinity to proximity where zooming condition is fixed to a wide angle side, and that the third group mainly works in view of the movement amount ratio of the second group to the third group in focusing from infinity to proximity where zooming condition is fixed to a telephoto side.

3. A zoom optical system comprising, in order from an object side: a first group having negative refracting power;
a second group having positive refracting power;
a third group having negative refracting power; and
a fourth group having positive refracting power;
wherein the first group comprises a prism component arranged on an utmost object side and comprising an entrance surface having a concave surface directed toward the object side, a reflecting surface and an exit surface;
wherein the second group comprises an aperture stop;
wherein, when zooming is carried out from a wide angle end to a telephoto end, the second group and the third group are moved toward the object side respectively, an interval between the first group and the second group decreases, and an interval between the second group and the third group and an interval between the third group and the fourth group increase respectively; and
wherein the zoom optical system further comprises a light quantity adjustment part arranged between a lens surface arranged on an utmost image side in the second group and a lens surface arranged on an utmost object side in the third group.

4. The zoom optical system according to one of claims 1, 2 and 3, wherein the prism component has negative refracting power as a whole.

5. The zoom optical system according to one of claims 1, 2 and 3, wherein the following condition (9) is satisfied:

$$0.55 < \Phi P \cdot fw < 0 \quad (9)$$

where a refracting power of the prism component is ΦP, and a focal length of the zoom optical system at a wide angle end is fw.

6. The zoom optical system according to one of claims 1, 2 and 3 wherein the following condition (10) is satisfied:

$$-1 < (rP1 - rP2)/(rP1 + rP2) < -0.2 \quad (10)$$

where a paraxial radius of curvature of the entrance surface of the prism component is rP1, and a paraxial radius of curvature of the exit surface of the prism component is rP2.

7. The zoom optical system according to one of claims 1, 2 and 3, wherein the entrance surface and the exit surface of the prism component are aspherical surfaces, the reflecting surface of the prism component is a plane surface, and each of the aspherical surfaces of the prism component has a shape such that refracting power becomes weak as it departs from an optical axis.

8. A zoom optical system comprising, in order from an object side:
a prism component which has an entrance surface having negative refracting power, a reflecting surface, and an exit surface having positive refracting power; and
a lens group having positive refracting power;
wherein the prism component is arranged on an utmost object side among optical elements having refracting power in the zoom optical system;
wherein the lens group comprises two or more moving optical units which are moved when at least either zooming or focusing is carried out;
wherein the zoom optical system comprises, in order from the object side:
a first group comprising the prism component and having negative refracting power,
a second group comprising an aperture stop and having positive refracting power,
a third group having negative refracting power, and
a fourth group having positive refracting power;
wherein the second group and the third group are the moving optical units; and
wherein, when zooming is carried out from a wide angle end to a telephoto end, the second group and the third group are moved toward the object side respectively, an interval between the first group and the second group decreases, and an interval between the third group and the fourth group increases.

9. An image pickup apparatus comprising a zoom optical system and an image pickup element;
wherein the zoom optical system comprises:
a first group comprising a prism component, the prism component being arranged on an utmost object side in the zoom optical system and having an entrance surface with a concave surface directed toward the object side, a reflecting surface and an exit surface,
two or more moving optical units arranged on an image side of the first group and configured to be movable in zooming,
a last group arranged on an utmost image side in the zoom optical system and having positive refracting power, and
an aperture stop arranged between the first group and the last group;
wherein, when zooming is carried out from a wide angle end to a telephoto end, an entranced pupil formed of the aperture stop is moved toward the object side and an exit pupil formed of the aperture stop by an optical system arranged on the object side of the last group is moved toward the object side;
wherein the last group comprises a lens component having an object-side surface which is a first aspherical surface and an image-side surface which is a second aspherical surface, the second aspherical surface having a convex face directed toward the image side near an optical axis and having a point of inflection on a cross-section take along the optical axis;
wherein the first aspherical surface and the second aspherical surface satisfy the following conditions (3) to (5):

$$0.08 < (ha11 - ha07)/I < 0.3 \quad (3)$$

$$-011 < ha07/I < 0.07 \quad (4)$$

$$0.45 < Cb/I < 1 \quad (5)$$

where ha07 is a distance, in a direction along the optical axis, from a reference plane to the first aspherical surface at a height of 35% of an effective diagonal length of the image pickup element from the optical axis; ha11 is a distance, in the direction along the optical axis, from the reference plane to the first aspherical surface at a height of 55% of the effective diagonal length of the image pickup element from the optical axis; I is 50% of the effective diagonal length of the image pickup element; and Cb is a height from the optical axis to the point of inflection of the second aspherical surface, the reference plane being determined as normal to the optical axis and tangent to the first aspherical surface at a vortex thereof and a distance from the reference plane in a direction toward an image side being given a positive value;
wherein the zoom optical system comprises, in order from an object side:
the first group comprising the prism component, the first group having negative refracting power,
a second group comprising the aperture stop and having positive refracting power,
a third group having negative refracting power, and
a fourth group having positive refracting power;

wherein the second group and the third group are the moving optical units, and when zooming is carried out from the wide angle end to the telephoto end, the second group and the third group are moved toward the object side respectively, an interval between the first group and the second group decreases, and an interval between the third group and the fourth group increases.

10. An image pickup apparatus comprising a zoom optical system and an image pickup element;
wherein the zoom optical system comprises:
a prism component arranged on an utmost object side and comprising an entrance surface with a concave surface directed toward the object side, a reflecting surface and an exit surface, and
at least one moving optical unit having refracting power and adapted to be movable;
wherein the following conditions (6) to (8) are satisfied:

$$-4 < rp1/I < 1.8 \quad (6)$$

$$8 < L/I < 12 \quad (7)$$

$$2.5 < M/I < 7 \quad (8)$$

where $rp1$ is a radius of curvature of the entrance surface of the prism component, L is an optical path length of the zoom optical system, I is 50% of an effective diagonal length of the image pickup element, M is a total amount of movement of each moving optical unit at a wide angle end and at a telephoto end, and a focal length at the telephoto end is 2.3 times or more and 5 times or less of a focal length at the wide angle end;
wherein the zoom optical system comprises, in order from an object side:
a first group comprising the prism component and having negative refracting power,
a second group comprising an aperture stop and having positive refracting power,
a third group having negative refracting power, and
a fourth group having positive refracting power;
wherein the second group and the third group are the moving optical units; and
wherein, when zooming is carried out from the wide angle end to the telephoto end, the second group and the third group are moved toward the object side respectively, an interval between the first group and the second group decreases, and an interval between the third group and the fourth group increases.

11. The zoom optical system according to one of claims 1, 2, 3 and 8,
wherein the third group comprises one negative lens, and a total number of lens in the third group is 1.

12. The image pickup apparatus according to claim 9 or 10, wherein the third group comprises one negative lens, and a total number of lens in the third group is 1.

13. The zoom optical system according to claim 11, wherein the negative lens constituting the third group is a plastic lens.

14. The image pickup apparatus according to claim 12, wherein the negative lens constituting the third group is a plastic lens.

15. The zoom optical system according to one of claims 1, 2, 3 and 8, wherein the first group further comprises a negative lens and a positive lens which are arranged on an image side of the prism component.

16. The image pickup apparatus according to claim 9 or 10, wherein the first group further comprises a negative lens and a positive lens which are arranged on an image side of the prism component.

17. The zoom optical system according to claim 15, wherein refractive indexes of the negative lens and the positive lens of the first group are 1.7 or more, respectively.

18. The image pickup apparatus according to claim 16, wherein refractive indexes of the negative lens and the positive lens of the first group are 1.7 or more, respectively.

19. The zoom optical system according to claim 15, wherein the negative lens and the positive lens of the first group are cemented together.

20. The image pickup apparatus according to claim 16, wherein the negative lens and the positive lens of the first group are cemented together.

21. The zoom optical system according to one of claims 1, 2, 3 and 8, wherein the second group comprises, in order from an object side, a first positive lens, a second positive lens, and a negative lens, and a total number of lenses contained in the second group is 3.

22. The image pickup apparatus according to claim 9 or 10, wherein the second group comprises, in order from an object side, a first positive lens, a second positive lens, and a negative lens, and a total number of lenses contained in the second group is 3.

23. The zoom optical system according to claim 21, wherein the first positive lens of the second group is a double aspherical lens made of plastic, and refractive indexes of the second positive lens and the negative lens of the second group are 1.7 or more, respectively.

24. The image pickup apparatus according to claim 22, wherein the first positive lens of the second group is a double aspherical lens made of plastic, and refractive indexes of the second positive lens and the negative lens of the second group are 1.7 or more, respectively.

25. The zoom optical system according to one of claims 1, 2, 3 and 8, wherein the fourth group comprises a positive lens, and a total number of lens in the fourth group is 1.

26. The image pickup apparatus according to claim 9 or 10, wherein the fourth group comprises a positive lens, and a total number of lens in the fourth group is 1.

27. The zoom optical system according to one of claims 1, 2 and 3, wherein a total number of reflecting surface included in the prism component is 1.

28. The zoom optical system according to one of claims 1, 2 and 3, wherein there is no intermediate image forming surface in the prism component.

29. The zoom optical system according to one of claims 1, 2 and 3, wherein an incident light axis is deflected by a right angle as being reflected on the reflecting surface of the prism component.

30. An image pickup apparatus comprising:
the zoom optical system according to one of claims 1, 2 and 3; and
an image pickup element arranged on an image side of the zoom optical system.

* * * * *